United States Patent
Gokhale et al.

(10) Patent No.: US 11,032,567 B2
(45) Date of Patent: Jun. 8, 2021

(54) AUTOMATIC ADAPTIVE LONG TERM REFERENCE FRAME SELECTION FOR VIDEO PROCESS AND VIDEO CODING

(71) Applicant: Intel Corporation, Santa Clara, CA (US)

(72) Inventors: Neelesh Gokhale, Seattle, WA (US); Chang Kee Choi, Bellevue, WA (US); Atul Puri, Redmond, WA (US); Sebastian Possos, Sammamish, WA (US)

(73) Assignee: Intel Corporation, Santa Clara, CA (US)

( * ) Notice: Subject to any disclaimer, the term of this patent is extended or adjusted under 35 U.S.C. 154(b) by 24 days.

(21) Appl. No.: 16/146,250

(22) Filed: Sep. 28, 2018

(65) Prior Publication Data
US 2019/0045217 A1    Feb. 7, 2019

Related U.S. Application Data

(60) Provisional application No. 62/701,216, filed on Jul. 20, 2018.

(51) Int. Cl.
*H04N 19/58* (2014.01)
*H04N 19/107* (2014.01)
(Continued)

(52) U.S. Cl.
CPC ........... *H04N 19/58* (2014.11); *H04N 19/107* (2014.11); *H04N 19/109* (2014.11); *H04N 19/114* (2014.11); *H04N 19/137* (2014.11); *H04N 19/14* (2014.11); *H04N 19/142* (2014.11); *H04N 19/159* (2014.11); *H04N 19/172* (2014.11); *H04N 19/176* (2014.11)

(58) Field of Classification Search
CPC .. H04N 19/126; H04N 19/142; H04N 19/146; H04N 19/109; H04N 19/58; H04N 19/107; H04N 19/114; H04N 19/159; H04N 19/172; H04N 19/176
See application file for complete search history.

(56) References Cited

U.S. PATENT DOCUMENTS

| | | | |
|---|---|---|---|
| 2006/0098738 A1* | 5/2006 | Cosman | H04N 19/146 375/240.16 |
| 2008/0247463 A1* | 10/2008 | Buttimer | H04N 19/58 375/240.12 |

(Continued)

OTHER PUBLICATIONS

T. Wiegand et al., "Long-Term Memory Motion-Compensated Prediction", IEEE Transactions on Circuits and Systems for Video Technology, Feb. 1999, vol. 9, No. 1, 18 pages.

(Continued)

*Primary Examiner* — Rowina J Cattungal
(74) *Attorney, Agent, or Firm* — Jordan IP Law, LLC

(57) ABSTRACT

Methods, apparatuses and systems may provide for technology that provides adaptive Long Term Reference (LTR) frame techniques for video processing and/or coding. More particularly, implementations described herein may utilize fast content analysis based Adaptive Long Term Reference (LTR) methods and systems that can reliably decide when to turn LTR on/off, select LTR frames, and/or assign LTR frame quality for higher efficiency and higher quality encoding with practical video encoders.

24 Claims, 34 Drawing Sheets

(51) Int. Cl.
*H04N 19/159* (2014.01)
*H04N 19/114* (2014.01)
*H04N 19/172* (2014.01)
*H04N 19/176* (2014.01)
*H04N 19/109* (2014.01)
*H04N 19/137* (2014.01)
*H04N 19/142* (2014.01)
*H04N 19/14* (2014.01)

(56) References Cited

U.S. PATENT DOCUMENTS

| | | | | |
|---|---|---|---|---|
| 2012/0170654 | A1* | 7/2012 | Zhang | H04N 19/58 375/240.16 |
| 2016/0182916 | A1* | 6/2016 | Lee | H04N 19/159 375/240.12 |
| 2017/0214938 | A1* | 7/2017 | Zhang | H04N 19/142 |
| 2018/0152670 | A1* | 5/2018 | Zhou | H04N 21/4334 |
| 2019/0289286 | A1* | 9/2019 | Kitamura | H04N 19/11 |
| 2019/0394458 | A1* | 12/2019 | Wang | H04N 19/142 |

OTHER PUBLICATIONS

M. Tiwari et al., "Selection of Long-Term Reference Frames in Dual-Frame Video Coding Using Simulated Annealing", IEEE Signal Processing Letters, Jan. 2008, vol. 15, No. 1, pp. 249-252.
M. Paul et al., "Video Coding Using the Most Common Frame in Scene", IEEE International Conference on Acoustics, Speech and Signal Processing, Mar. 2010, 4 pages.
D. Liu et al., "Dual Frame Motion Compensation with Optimal Long-Term Reference Frame Selection and Bit Allocation", IEEE Transactions on Circuits and Systems for Video Technology, Mar. 2010, vol. 9, No. 3, pp. 325-339.
M. Paul et al., "Explore and Model Better I-Frame for Video Coding", IEEE Transactions on Circuits and Systems for Video Technology, Sep. 2011, vol. 21, No. 9, 13 pages.
M. Paul et al., "A Long-Term Reference Frame for Hierarchical B-Picture Based Video Coding", IEEE Transactions on Circuits and Systems for Video Technology, Oct. 2014, vol. 24, No. 10, pp. 1729-1742.
L. Tian et al., "Video big data in smart city: Background construction and optimization for surveillance video processing", Future Generation Computer Systems, Jan. 31, 2018, pp. 1371-1382.
"Xiph.org Video Test Media [derf's collection]", retrieved from media.xiph.org/video/derf/, retrieved on Sep. 28, 2018, 18 pages.
G. Bjøntegaard, "Calculation of Average PSNR Differences Between RD-curves", VCEG-M33 ITU-T Q6/16, Apr. 2011, 4 pages.

\* cited by examiner

FIG. 8B

AUTOMATIC ADAPTIVE LONG TERM REFERENCE FRAME SELECTION FOR VIDEO PROCESS AND VIDEO CODING

TECHNICAL FIELD

Embodiments generally relate to Long Term Reference (LTR) frames. More particularly, embodiments relate to technology that provides adaptive Long Term Reference (LTR) frame techniques for video processing and/or coding.

BACKGROUND

Numerous previous solutions for improving efficiency, quality or error resiliency using Long Term Reference (LTR) have been attempted. However, at the present time, these methods do not adequately provide a comprehensive and fast solution to the problem of correctly being able to assign, re-assign, and turn on/off LTR frames for a wide variety of content using practical encoders using rate control.

BRIEF DESCRIPTION OF THE DRAWINGS

The various advantages of the embodiments will become apparent to one skilled in the art by reading the following specification and appended claims, and by referencing the following drawings, in which:

FIGS. 8A-8B are an illustrative table 800 of an example of benefits for LTR based coding shown for a video sequence according to an embodiment;

DETAILED DESCRIPTION

Figure 1:
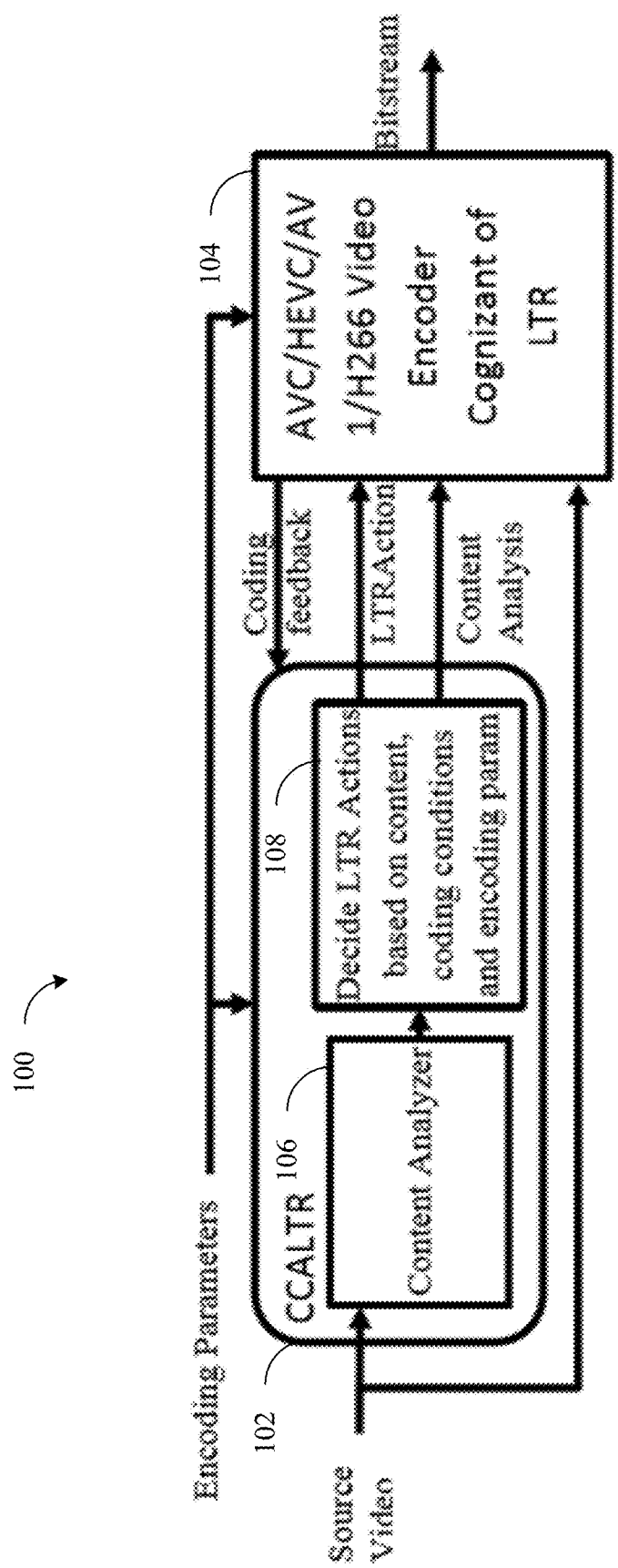
FIG. 1 is an illustrative diagram of an example Adaptive Long Term Reference (ALTR) system according to an embodiment.

As described above, numerous previous solutions for improving efficiency, quality or error resiliency using Long Term Reference (LTR) have been attempted. However, at the present time, these methods do not adequately provide a comprehensive and fast solution to the problem of correctly being able to assign, re-assign, and turn on/off LTR frames for a wide variety of content using practical encoders using rate control.

Such previous solutions may disadvantageously require: high computational complexity to determine a Long Term Reference (LTR) frame to assign or re-assign; higher delay (e.g., due to the need to buffer several frames of video for analysis of content); and/or be unable to handle all types of content.

As will be described in greater detail below, implementations described herein may provide adaptive Long Term Reference (LTR) frame techniques for highly efficient video processing and/or coding (e.g., AVC (H.264), HEVC (H.265), AV1, and/or VVC (H.266) type video coding standards). More particularly, implementations described herein may utilize fast content analysis based Adaptive Long Term Reference (LTR) methods and systems that can reliably decide when to turn LTR on/off, select LTR frames, and/or assign LTR frame quality for higher efficiency and higher quality encoding with practical video encoders.

Some implementations described herein may presents a fast, robust, and advantageous method that may be used by all applications, with Adaptive LTR providing significant quality and efficiency improvement for Video conference, Surveillance, and Game streaming applications. Additionally or alternatively, implementations described herein may be used for LTR appropriate content in general streaming applications without causing harm in other applications or content.

Such implementations described herein may advantageously support and/or permit: high robustness/reliability as decision making employs multiple basis including learning; low computational complexity to determine LTR frames as it employs highly simplified content analysis and can be used in conjunction with very high speed HW encoders; many fewer instances of incorrect decisions as bit-rate, frame-rate, buffer size, update interval are also used as a basis in addition to content basis; no delay of several frames as no need to look ahead several frames (e.g., all processing is done sequentially for each frame only utilizing the frame re-order buffer (if present) of any video codec, with no additional latency being added); low failure rates for even complex content, or noisy content due to use of all three basis (e.g., content analysis, coding conditions analysis, and/or learning based modeling); and/or a small footprint, enables software implementation that is fast, and also easy to optimize for hardware.

More generally, such implementations described herein may advantageously: be flexible and works with state-of-the-art video coding standards such as AVC and HEVC. Some implementations herein can be made to work with VP8/9, AV1 and AVS; be applicable not only to low delay video coding but also to normal or high delay video coding; have lower complexity; have lower delay; and/or be universal and work with all content not just video conference or surveillance.

FIG. 1 is an illustrative diagram of an example Adaptive LTR (ALTR) system 100, arranged in accordance with at least some implementations of the present disclosure.

In various implementations, Adaptive LTR System 100 includes a Content & Coding Adaptive LTR (CCALTR) 102 that analyses source content and decides LTR actions for an encoder 104 (e.g., an AVC/HEVC/AV1 Video Encoder cognizant of LTR). ALTR encoder 104 performs the LTR actions and also uses the content analysis for assigning frame quality.

The ALTR system 100 primarily includes content and coding adaptive LTR (CCALTR) 102 to generate all the actions (e.g., LTR Action) and content analysis meta-data to control the encoding for a given sequence and an ALTR aware encoder. FIG. 1 shows the high-level block diagram of ALTR system 100. Content and coding adaptive LTR (CCALTR) 102 uses the content analysis via a content analyzer 106, encoding parameters and the coding feedback from the encoder 104 to make LTR decisions via an LTR action decider 108 (e.g., Decide LTR Actions based on content, coding conditions and encoding parameters) for high efficiency encoding. The encoder 104 is cognizant of LTR actions as provided by the content and coding adaptive LTR (CCALTR) 102 and also has a LTR cognizant bitrate controller (BRC) to assign appropriate quality to frames based on content analysis.

Basic Principle

Adaptive LTR is a content analysis based intelligent feature which automatically turns on LTR frame prediction structure based on scene characteristics, automatically decides which frames to assign as LTR, and has an advanced bitrate controller to adaptively assign bits & quality across a scene to maximize LTR prediction efficiency.

The High level Steps in ALTR encoding may include one or more of the following operations: 1) use content analysis & coding conditions to determine whether LTR frame encoding should be used; determine the frames to assign as LTR; modify encoding & bitstreams parameters for best usage of LTR frame for MC prediction; and/or determine Quality of LTR frames.

Latest video coding standards, including AVC, HEVC, H.266 and AV1, allow multiple reference frame motion compensated prediction with at least one of the reference frames being a long term reference (LTR) frame from any time instance in the causal past or an out of order future frame or a non-displayed frame. These standards do not provide or mandate any encoding instructions on how to decide when to use or which LTR frames to use for best video coding quality or efficiency. LTR frames can provide good quality and efficiency improvement for some content under certain conditions, like scenes with stable background, but also cause loss in efficiency if the same strategy is used for lot of other content types.

The basic operations necessary for Adaptive LTR based encoding can be summarized as follows for some implementations described herein:

1. A Content & Encoding adaptive LTR Decision may decide whether to encode with LTR, based on content characteristics & coding conditions/parameters. (LTR ON/OFF decision).

2. An LTR Frame Selection may select the best frame to be assigned as LTR, if LTR is ON.

3. An LTR Frame Quality operation may correctly assign the encoding quality for the LTR frame.

The problem of deciding when to use LTR prediction, selecting a LTR frame, and assigning LTR frame quality is very compute intensive and thus prohibitive for applications where fast/real-time encoding is necessary. Thus, LTR has previously mostly been used only when application providers can be certain of their efficacy with manual settings.

Some implementations described herein may solve to the above problem by a fast and low delay, content analysis based system which can decide all LTR related actions for all content types providing higher compression efficiency and high quality for surveillance, video conference, and certain game streaming applications while doing almost no harm to non LTR friendly content. The method is extremely fast to be used with very high-speed HW encoders. It also removes the hurdle of human intervention needed for LTR parameter configuration during content authoring/encoding or transcoding content. It automates the process of all LTR decisions.

Adaptive Long Term Reference

Adaptive Long Term Reference (ALTR), as utilized in some implementations described herein, includes an intelligent encoding feature which significantly improves compression efficiency and video quality (e.g., by 20-24%) of AVC (H.264) & HEVC (H.265) encodes for video conference, surveillance and certain graphics/game streaming applications. The application space of video conference, and internet connected cameras/surveillance and game streaming, need more bandwidth and storage efficient technologies to handle the huge growth they are experiencing. Adaptive LTR is fast and low complexity encoder side technology, which can used to improve existing HW and SW codecs and produces compatible bit-streams.

Background

Some implementations described herein relate to fast and efficient coding of video by encoder side improvements in state-of-the art video coding standards such as ITU-T H.264/ISO MPEG AVC and ITU-T H.265/ISO MPEG HEVC as well as standards currently in development such as ITU-T H.266 and AOM AV1 standard. ISO and ITU-T video coding standards standardize bitstream description and decoding semantics, which while they define an encoding framework, they leave many aspects of encoder algorithmic design open to innovation; the only consideration is that the encoding process generate encoded bitstreams that are compliant to the standard. The resulting bitstreams are then assumed to be decodable by any device or application claiming to be compliant to the standard.

Bitstreams resulting from the codec modifications described herein, as well as typical bitstreams from other codecs, are both compliant to the standard and can be stored or transmitted prior to being received, decoded and displayed by an application, player or device. Before getting into the specific technology described herein, a general background in video coding as well as specific context of a standard (such as AVC or HEVC) is necessary and is introduced next.

Interframe Video Coding Overview

The key idea in modern interframe coding is to combine temporally predictive coding that adapts to motion of objects between frames of video and is used to compute motion compensated differential residual signal, and spatial transform coding that converts spatial blocks of pixels to blocks of frequency coefficients typically by DCT (of block size such as 8×8) followed by reduction in precision of these DCT coefficients by quantization to adapt video quality to available bit-rate.

Since the resulting transform coefficients have energy redistributed in lower frequencies, some of the small valued coefficients after quantization turn to zero, as well as some high frequency coefficients can be coded with higher quantization errors, or even skipped altogether. These and other characteristics of transform coefficients such as frequency location, as well as that some quantized levels occur more frequently than others, allows for using frequency domain scanning of coefficients and entropy coding (e.g., in its most basic form, variable word length coding) to achieve additional compression gains.

Figure 2:
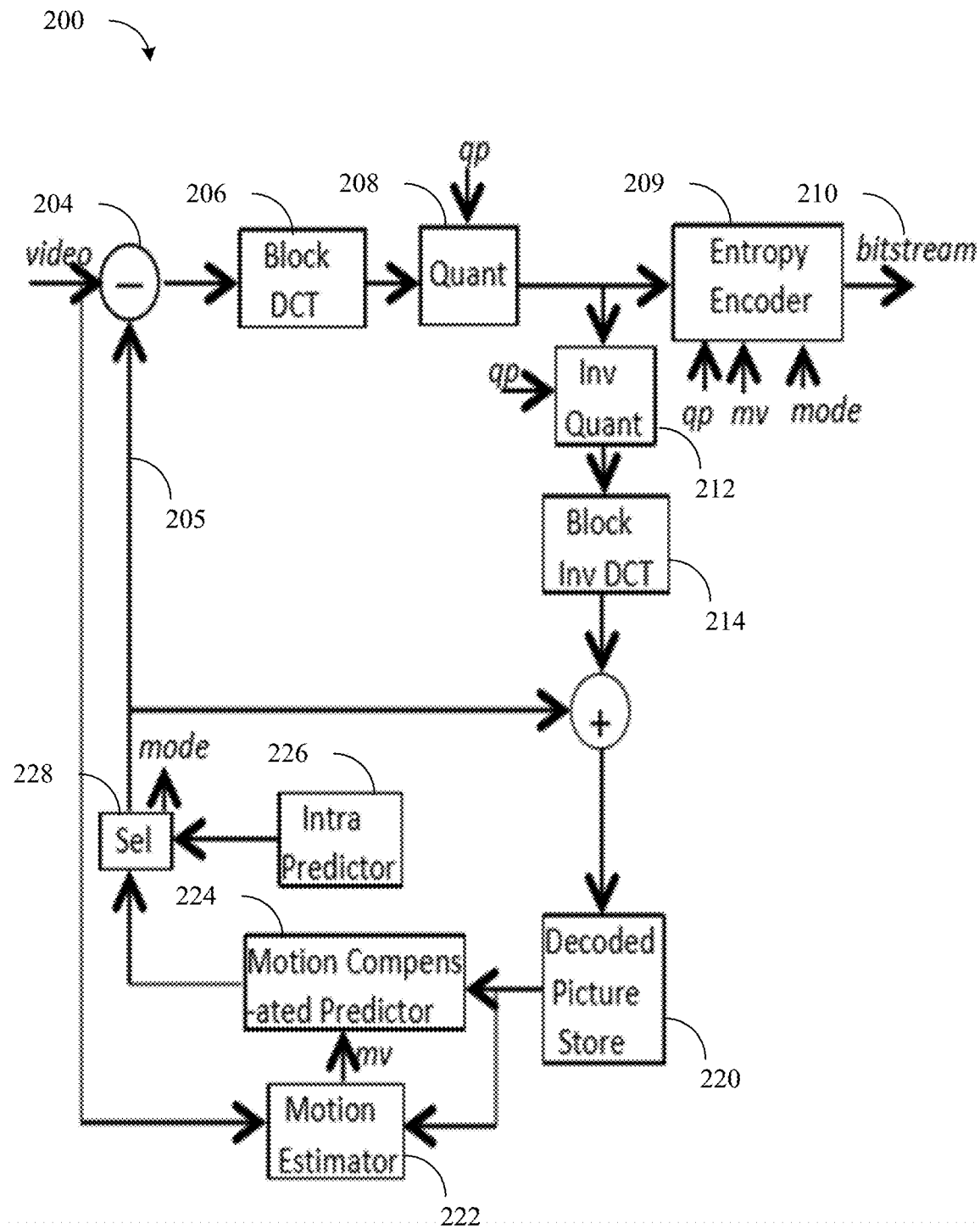
FIG. 2 is an illustrative diagram of an example inter-frame video encoder according to an embodiment.

FIG. 2 is an illustrative diagram of an example inter-frame video encoder 200, arranged in accordance with at least some implementations of the present disclosure.

In the illustrated example, FIG. 2 shows a block diagram showing the general principle of inter-frame coding, or specifically, motion-compensated (DCT) transform coding that all modern standards are based on (although some details are different for each standard). For example, in various implementations, video encoder 200 may be configured to undertake video coding and/or implement video codecs according to one or more advanced video codec standards, such as, for example, the Advanced Video Coding (e.g., AVC/H.264) video compression standard or the High Efficiency Video Coding (e.g., HEVC/H.265) video compression standard, but is not limited in this regard. Further, in various embodiments, video encoder 200 may be implemented as part of an image processor, video processor, and/or media processor.

As used herein, the term "coder" may refer to an encoder and/or a decoder. Similarly, as used herein, the term "coding" may refer to encoding via an encoder and/or decoding via a decoder. For example, video encoder 200 may include a video encoder with an internal video decoder, as illustrated in FIG. 2, while a companion coder may only include a video decoder (not illustrated independently here), and both are examples of a "coder" capable of coding.

In some examples, video encoder 200 may include additional items that have not been shown in FIG. 2 for the sake of clarity. For example, video encoder 200 may include a processor, a radio frequency-type (RF) transceiver a display, an antenna, and/or the like. Further, video encoder 200 may include additional items such as a speaker, a microphone, an accelerometer, memory, a router, network interface logic, and/or the like that have not been shown in FIG. 2 for the sake of clarity.

As illustrated, the video content may be differenced at operation 204 with the output from the internal decoding loop 205 to form residual video content.

The residual content may be subjected to video transform operations at transform module (e.g., "block DCT") 206 and subjected to video quantization processes at quantizer (e.g., "quant") 208.

The output of transform module (e.g., "block DCT") 206 and quantizer (e.g., "quant") 208 may be provided to an entropy encoder 209 and to an inverse transform module (e.g., "inv quant") 212 and a de-quantization module (e.g., "block inv DCT") 214. Entropy encoder 209 may output an entropy encoded bitstream 210 for communication to a corresponding decoder.

Within an internal decoding loop of video encoder 200, inverse transform module (e.g., "inv quant") 212 and de-quantization module (e.g., "block inv DCT") 214 may implement the inverse of the operations undertaken transform module (e.g., "block DCT") 206 and quantizer (e.g., "quant") 208 to provide reconstituted residual content. The reconstituted residual content may be added to the output from the internal decoding loop to form reconstructed decoded video content. Those skilled in the art may recognize that transform and quantization modules and de-quantization and inverse transform modules as described herein may employ scaling techniques. The decoded video content may be provided to a decoded picture store 220, a motion estimator 222, a motion compensated predictor 224 and an intra predictor 226. A selector 228 (e.g., "Sel") may send out mode information (e.g., intra-mode, inter-mode, etc.) based on the intra-prediction output of intra predictor 226 and the inter-prediction output of motion compensated predictor 224. It will be understood that the same and/or similar operations as described above may be performed in decoder-exclusive implementations of Video encoder 200.

Figure 3:
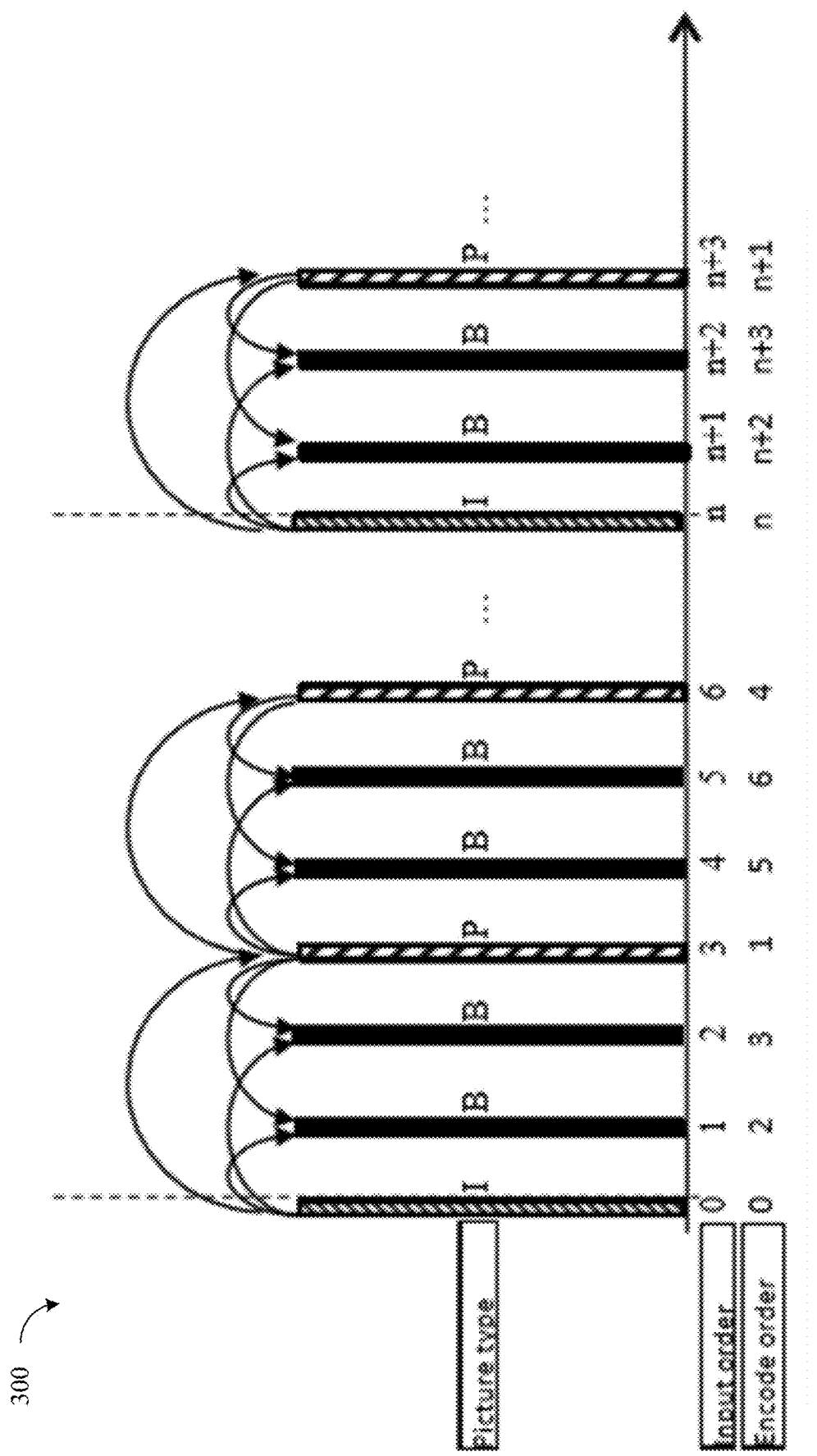
FIG. 3 is an illustrative diagram of an example of a typical IPBB coding sequence according to an embodiment.

FIG. 3 is an illustrative diagram of an example of a typical IPBB coding sequence 300, arranged in accordance with at least some implementations of the present disclosure.

In the illustrated example, FIG. 3 shows an example of a typical IPBB coding with sequence start at I (IDR) at 0 & n. Inter-frame coding includes coding using up to three types picture types (I-pictures, P-Pictures, and B-pictures) arranged in a fixed or adaptive picture structure that is repeated a few times and collectively referred to as a group-of-pictures. I-pictures are used to provide clean refresh for random access (or channel switching) at frequent intervals. P-pictures are used for basic inter-frame coding using motion compensation and may be used successively or intertwined with an arrangement of B-pictures; P-pictures provide moderate compression. B-pictures that are bi-directionally motion compensated and coded inter-frame pictures provide the highest level of compression. Low delay encoding or IPPP encoding arrangement is frequently used to describe the ALTR method here, however IPBB (FIG. 3) and B-Pyramid coding are also popular encoding arrangement in most codecs and ALTR method can be applied to any such arrangement.

Since motion compensation is difficult to perform in the transform domain, the first step in an interframe coder is to create a motion compensated prediction error in the pixel domain. For each block of current frame, a prediction block in the reference frame is found using motion vector computed during motion estimation and differenced to generate prediction error signal. The resulting error signal is transformed using 2D DCT, quantized by an adaptive quantizer, and encoded using an entropy coder (such as Variable Length Coder (VLC) or arithmetic entropy coder) and buffered for transmission over a channel.

The entire interframe coding process involves bitrate/coding error (distortion) tradeoffs with the goal of keeping video quality as good as possible subject to needed random access and within the context of available bandwidth.

Multiple Reference Frame Motion Compensated Video Coding Overview

Figure 4:
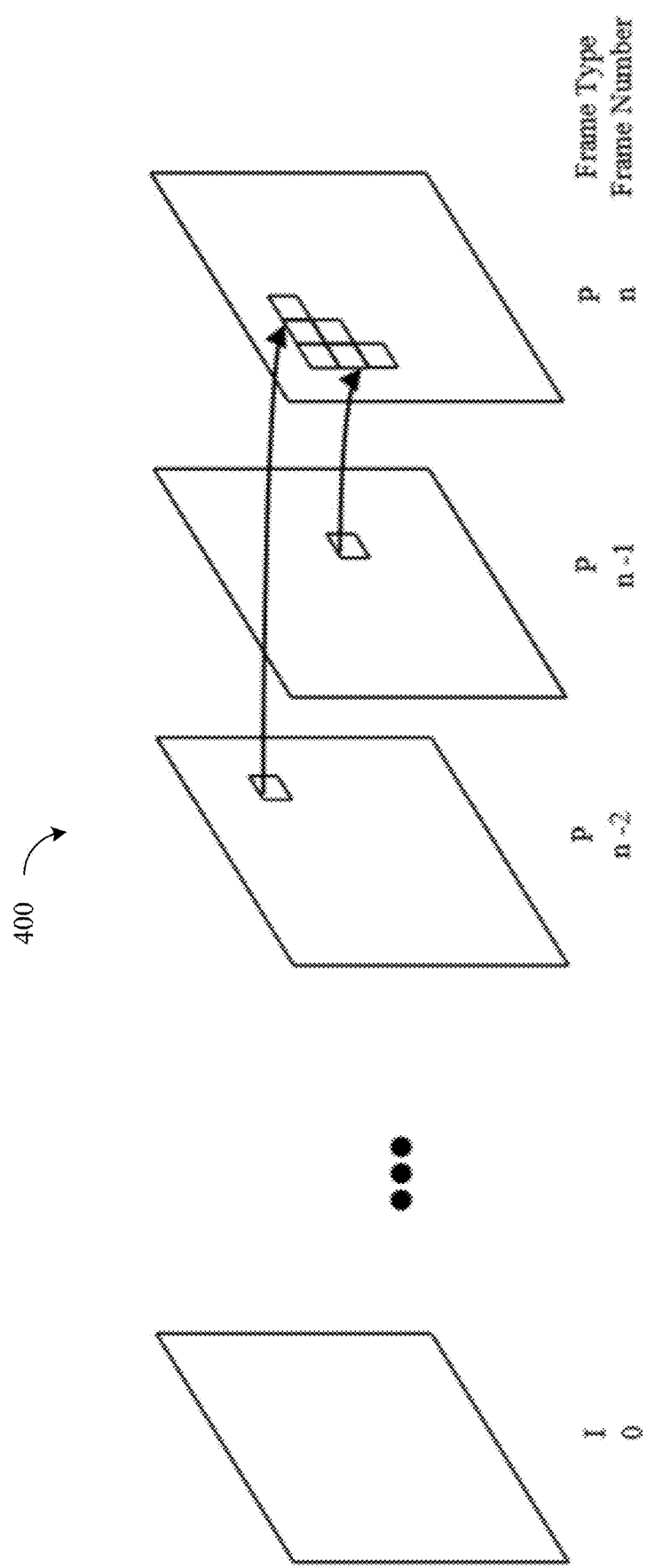
FIG. 4 is an illustrative diagram of an example of multiple reference frame based block motion compensation coding sequence according to an embodiment.

FIG. 4 is an illustrative diagram of an example of multiple reference frame based block motion compensation coding sequence 400, arranged in accordance with at least some implementations of the present disclosure.

Multiple reference frame encoding, introduced in standards like AVC/H.264, allows use of more than one reference frames for inter frame prediction in one direction. Multiple reference encoding usually uses a small number of reference frames from a window of previously decoded frames. Each block in a frame can select a frame from that window to predict from as shown in FIG. 4.

Long Term Reference (LTR) Overview

Figure 5:
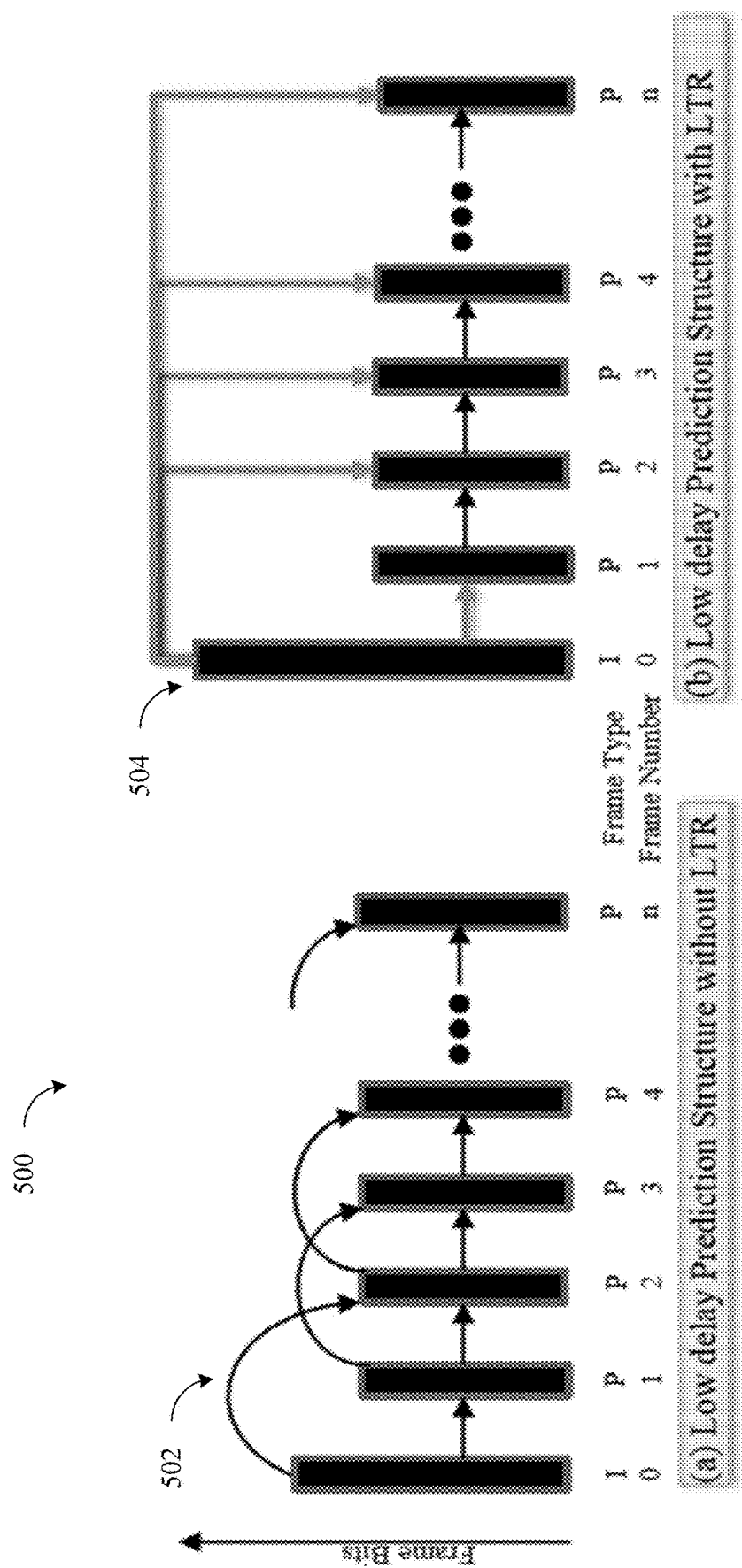
FIG. 5 is an illustrative diagram of an example of typical low delay inter frame prediction structures without LTR and low delay inter frame prediction structure with LTR according to an embodiment.

FIG. 5 is an illustrative diagram of an example of inter frame prediction structures 500, arranged in accordance with at least some implementations of the present disclosure.

In the illustrated example, low delay encoding inter frame prediction structures 500 may use two references: (a) without LTR and/or (b) with LTR.

Long Term Reference (LTR) frames were introduced in AVC/H.264 standard to store a decoded reference frame until explicitly removed. A Long Term Reference allows e.g. encoding scene background with high quality for better motion compensated prediction in many future frames. Effective use of LTR frames requires detecting such stable content, finding the correct frame for LTR assignment, encoding the LTR frame with high quality and turning off LTR for unsuitable content.

FIG. 5 shows low delay encoding inter frame prediction structures without using LTR 502 and with using LTR 504. Each block in a frame can select a frame from short term window or LTR to predict from as shown below in FIG. 6.

Figure 6:
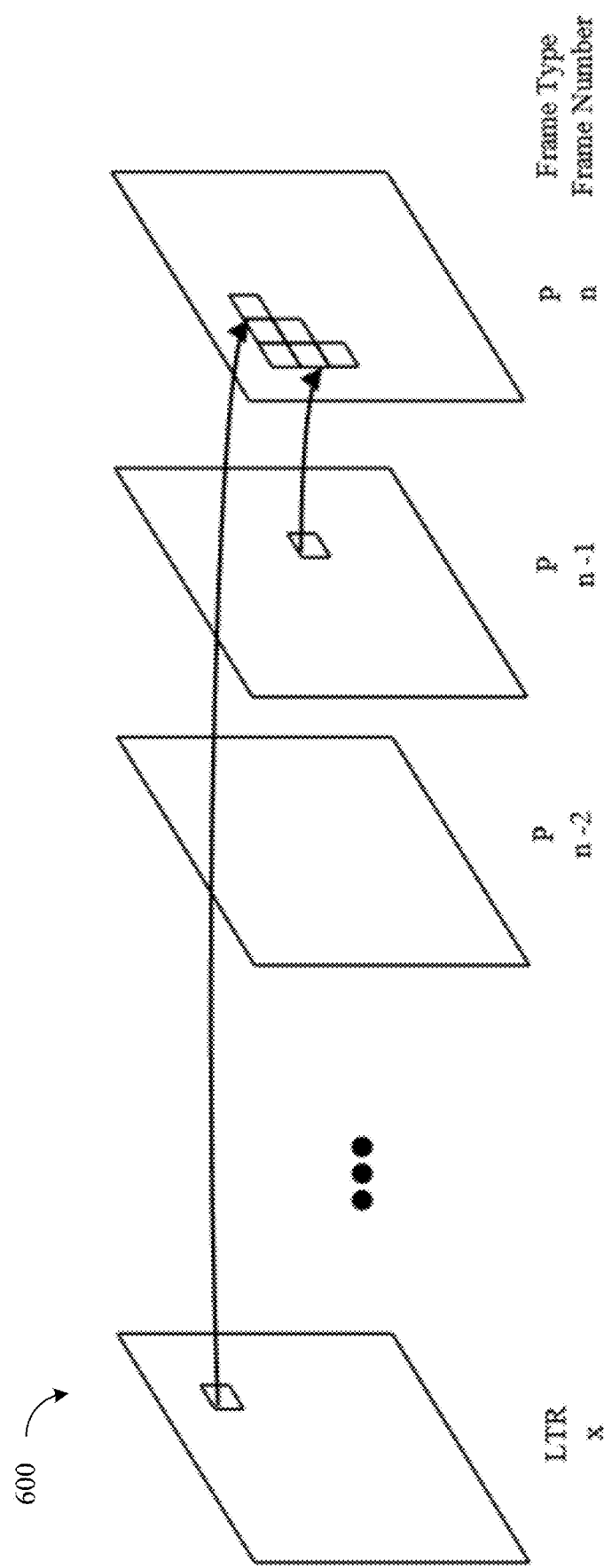
FIG. 6 is an illustrative diagram of an example LTR based block motion compensation sequence according to an embodiment.

FIG. 6 is an illustrative diagram of an example LTR based block motion compensation sequence 600, arranged in accordance with at least some implementations of the present disclosure.

Decoded Picture Buffer and Memory Management Overview

LTR & Multiple reference frame encoding inherently requires a larger (e.g., a>1 for P or >2 for B Pictures) decoded picture buffer (DPB) and standardized management of the DPB.

In H.264, a sliding window operation is defined to fill DPB with decoded pictures marked as reference pictures. The filling process is standardized simply as filling the DPB in reverse temporal decoding order with reference pictures followed by LTR pictures. Pictures marked as long term reference pictures are held in DPB till explicitly removed. The actual set of pictures in DPB can thus be controlled by correctly marking or unmarking of pictures. The H.264 standard defines a set of methods to control the marking and unmarking of pictures as LTR or ref pic called memory management and control operations (MMCO). The operations (in Table 1) are defined in the headers of each picture and executed after decoding of each picture. I-Picture, which is always a reference picture can be directly marked as LTR using a syntax element long_term_reference_flag without using MMCO syntax.

TABLE 1

Memory management control operations defined in H.264

| memory_<br>management_<br>control_operation | Memory<br>Management<br>Control Operation |
|---|---|
| 0 | End memory_management_control_operation syntax element loop |
| 1 | Mark a short-term reference picture as "unused for reference" |
| 2 | Mark a long-term reference picture as "unused for reference" |
| 3 | Mark a short-term reference picture as "used for long-term reference" and assign a long-term frame index to it |
| 4 | Specify the maximum long-term frame index and mark all long-term reference pictures having long-term frame indices greater than the maximum value as "unused for reference" |
| 5 | Mark all reference pictures as "unused for reference" and set the MaxLongTermFrameIdx variable to "no long-term frame indices" |
| 6 | Mark the current picture as "used for long-term reference" and assign a long-term frame index to it. |

Figure 7:
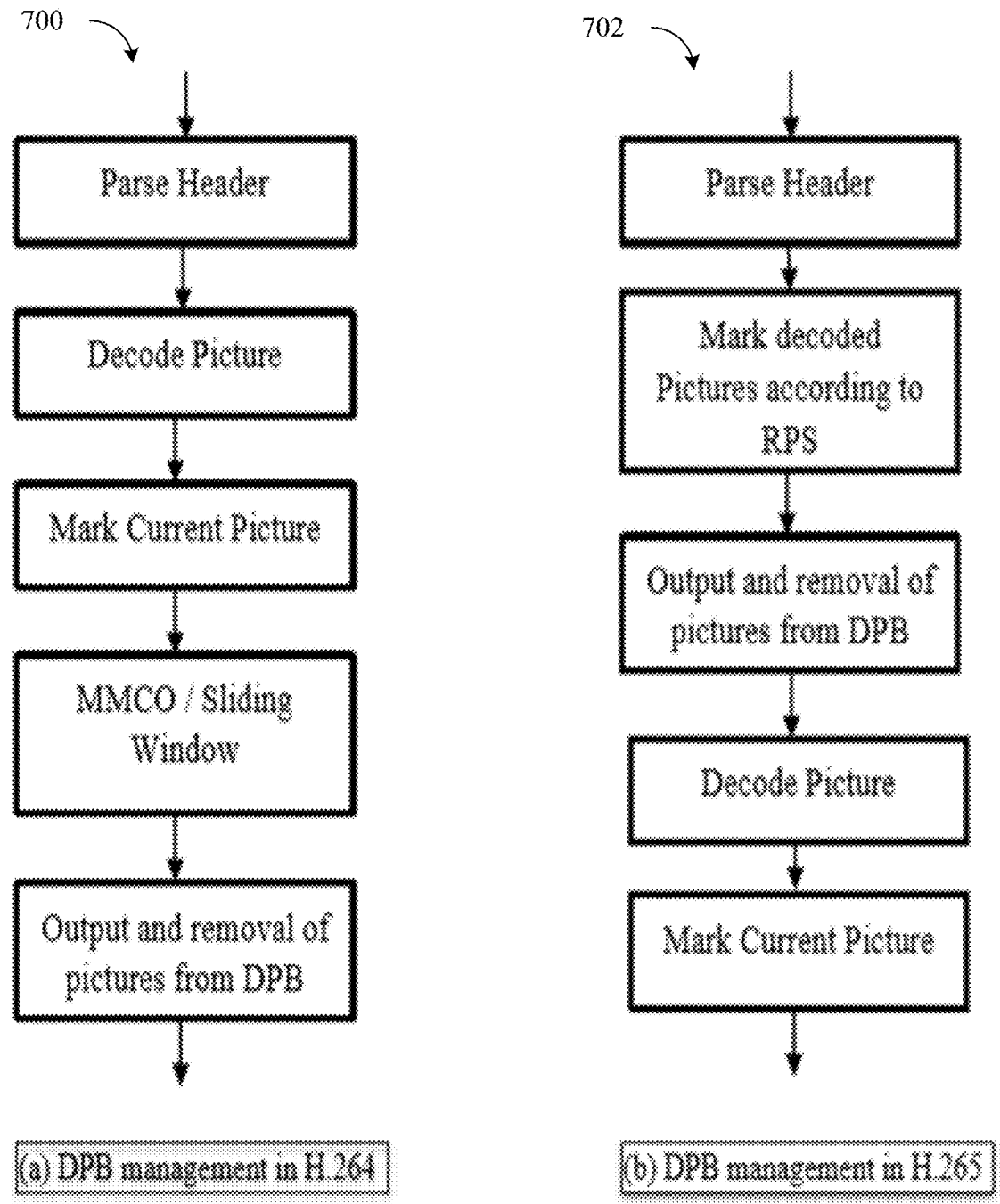
FIG. 7 is an illustrative diagram of an example decoded picture buffer (DPB) management method according to an embodiment.

FIG. 7 is an illustrative diagram of an example decoded picture buffer (DPB) management method 700 in (a) H.264 and method 702 (b) H.265, arranged in accordance with at least some implementations of the present disclosure. As illustrated, decoded picture buffer (DPB) management method 700 in (a) H.264 may include operations to: parse headers, decode picture, mark current picture, perform memory management control operation (MMCO) sliding window operations, and output and removal of pictures from the decoded picture buffer (DPB).

Similarly, as illustrated, decoded picture buffer (DPB) management method 702 (b) H.265 may include operations to: parse headers, mark decoded pictures according to a reference picture set (RPS), output and removal of pictures from the decoded picture buffer (DPB), decode the picture, and mark the current picture.

H.265 uses an alternate control mechanism called Reference Picture Set (RPS). RPS differs from H.264 such that no implicit DPB filling process (like sliding window) is defined whereas all DPB filling operations are explicitly transmitted and executed at the beginning of the decoding process. FIG. 7 shows the DPB management in H.264 and H.265.

Reference Pic List Management Overview

Multiple Reference Frames, LTR and Large DPBs also inherently require a mechanism to select reference frames for motion compensation. In H.264 and H.265, the reference pictures used for motion compensation are arranged in two lists. A reference picture is selected by selecting a list and then using an index to specify the position in the list. P Pictures uses a single reference list called L0 in both H.264 and H.265. B Pictures used two reference list; List 0 and List 1. H.265 also allows a Generalized P and B (GPB) picture configuration, which while having only past reference frames like P pictures can use both List 0 and List 1. Both codecs provide initialization of Lists and allow modification of Lists using Ref Pic List Modification syntax.

Illustration of Benefits of ALTR Based Encoding

Figure 8A:
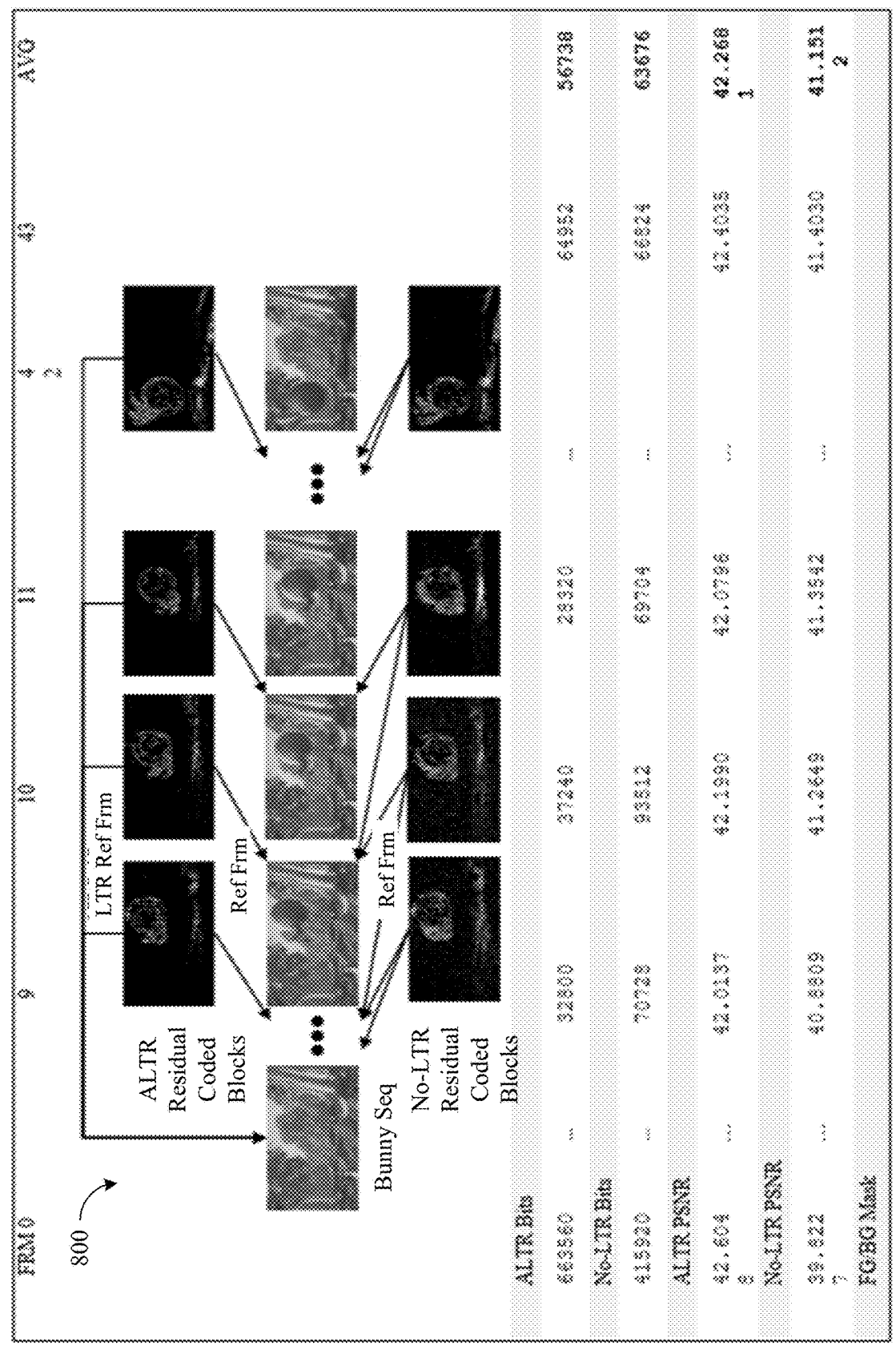
Figure 8B:
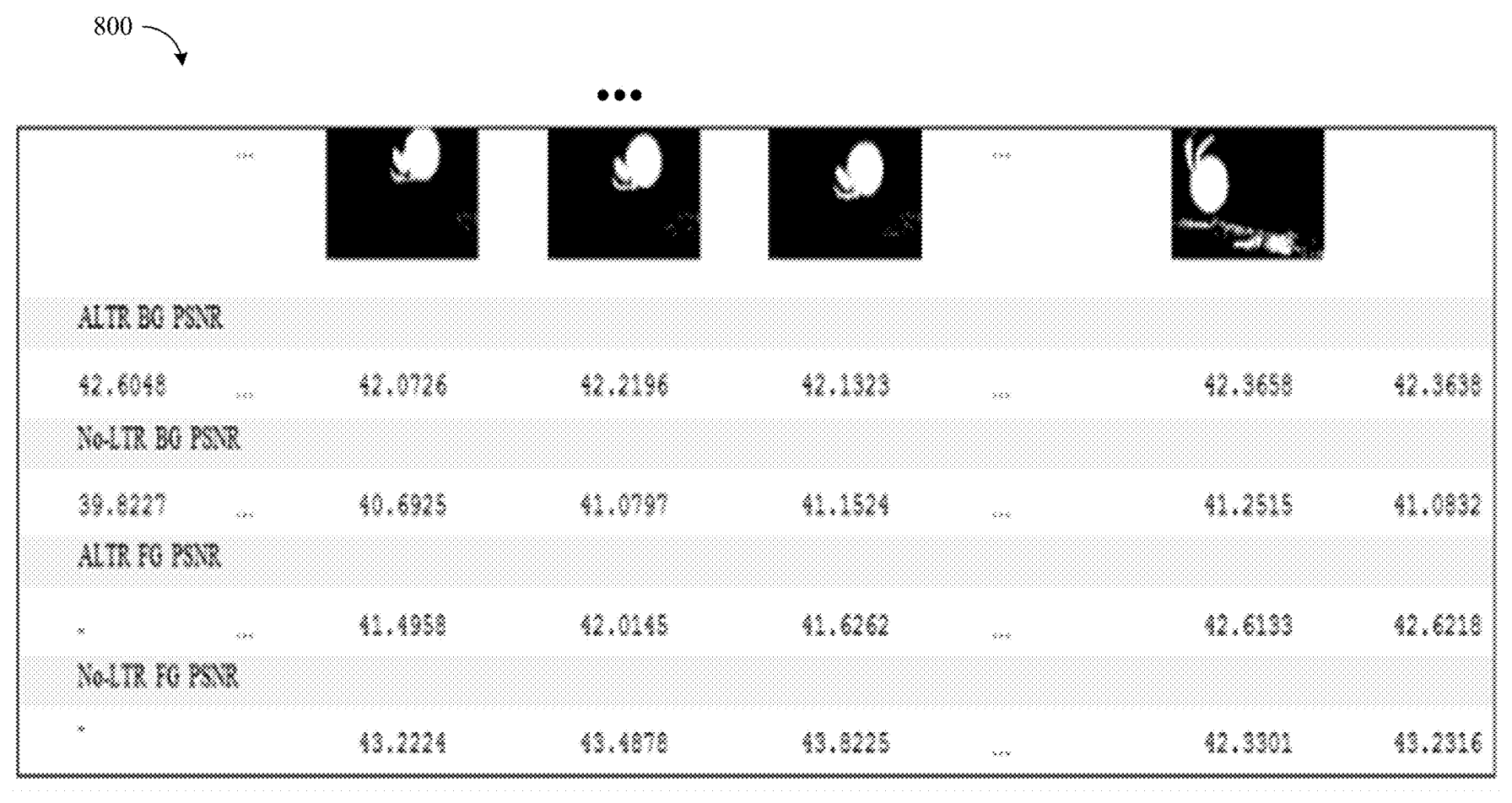

FIGS. 8A-8B are an illustrative table 800 of an example of benefits for LTR based coding shown for a video sequence, arranged in accordance with at least some implementations of the present disclosure.

In the illustrated example, table 800 shows the benefits for LTR based coding for a "big buck bunny" sequence. Table 800 shows show the benefits of LTR based coding by comparing an implementation of a MSDK H.264 encoder with and without an ALTR implementation and analyzing the compression efficiency (e.g., bits and PSNR) improvement for CBR 1.5 Mbps encoding of a "big buck bunny" sequence. The ALTR encoder produces lower bits and has higher PSNR (e.g., Bits 56738, PSNR 42.46) compared to No-LTR case (63676, 41.15).

More specifically, the LTR Frame is coded with higher quality (e.g., Higher bits and High PSNR) reducing the residual-coded blocks in inter frames. Using the high quality LTR frame propagates the high quality background (e.g., has high BG PSNR) throughout the sequence. No-LTR encoding has higher residual-coded blocks and low BG PSNR. No-LTR encoding produces higher bits and lower overall PSNR showing poor compression efficiency compared to ALTR encoding. Both encodes use IPPP 2 References CBR encoding at 1500 kbps using MSDK TU4 encoder.

System Description

Figure 9:
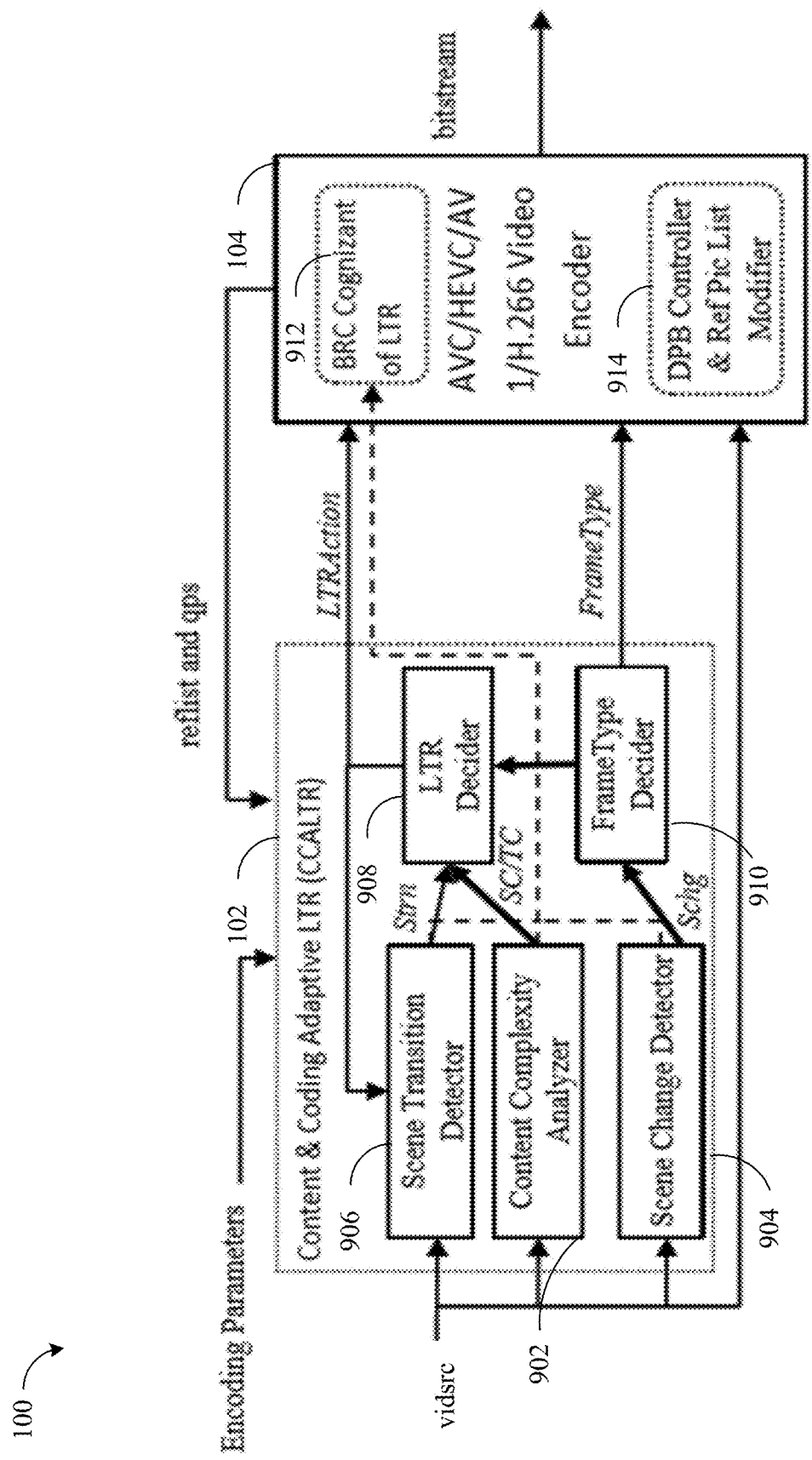
FIG. 9 is an illustrative diagram of an example detailed block diagram of the Adaptive Long Term Reference (ALTR) system according to an embodiment.

FIG. 9 is an illustrative diagram of an example detailed block diagram of the Adaptive Long Term Reference (ALTR) system 100, arranged in accordance with at least some implementations of the present disclosure.

In the illustrated example, the ALTR system 100 details and sub modules are shown in FIG. 9. The CCALTR module may include a Content Complexity Analyzer 902, Scene Change Detector 904, and Scene Transition Detector 906. Content Complexity Analyzer 902, Scene Change Detector 904, and Scene Transition Detector 906 generate spatial & temporal complexity (SC/TC), Scene Change (Schg), Scene Transition (Strn) information per frame respectively.

The content analysis information, encoding parameters, and coding feedback (e.g., reflist, qps) is used by the LTR Decider 908 to generate all the actions (e.g., LTRAction) to control the encoder 104 for ALTR encoding. The LTR Decider 908 generates 5 actions which appropriately turn LTR prediction ON or OFF, and when ON provides the information for LTR assignment, LTR quality, and re-assignment.

Figure 23:
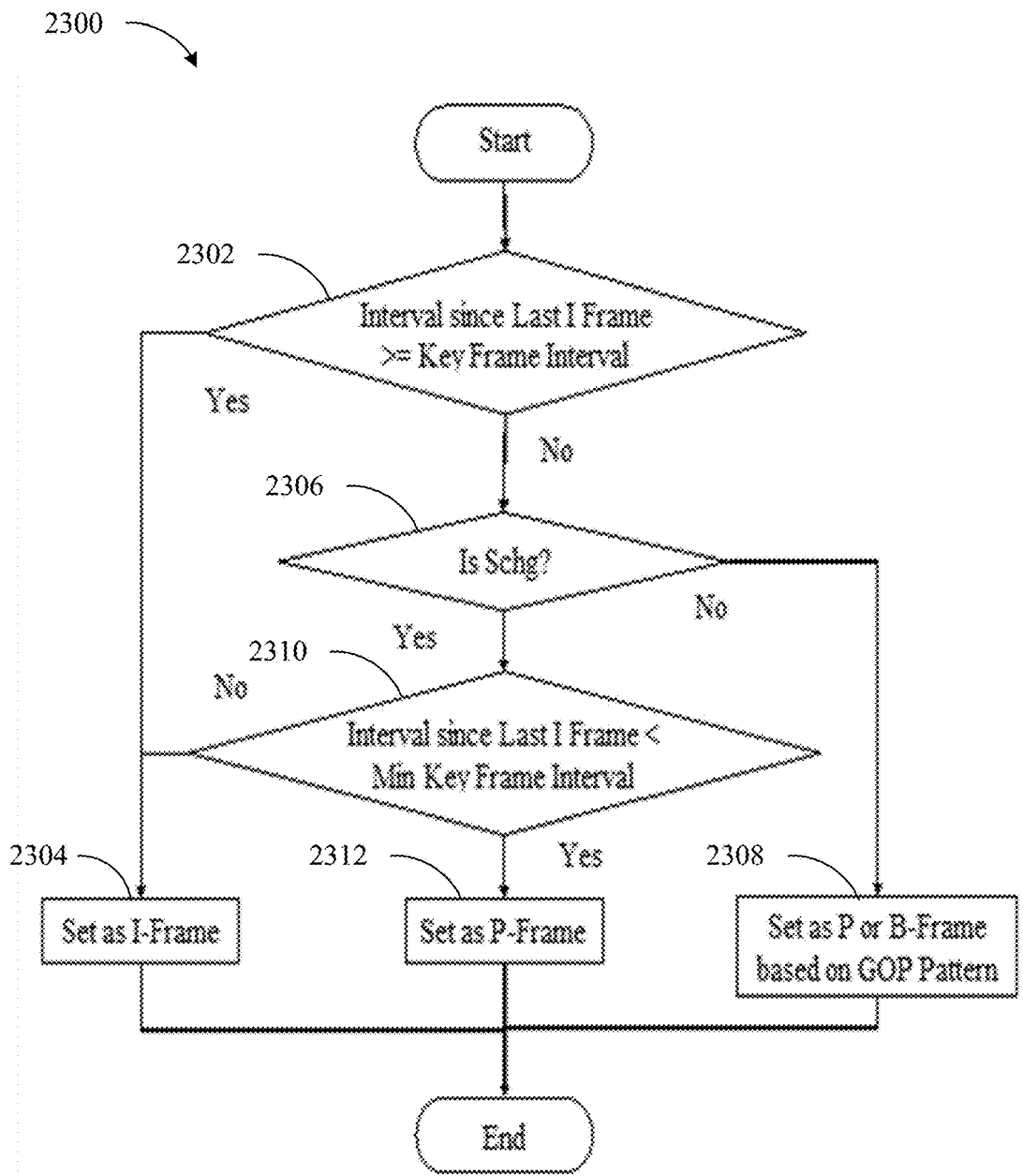
FIG. 23 is an illustrative diagram of an example frame type decision method according to an embodiment.

The Frame Type decider 910 also uses the Scene Change (Schg) information from content analysis along with encoding parameters such as Key frame interval, number of B-frames & B-pyramid settings, to determine Intra frame insertion and frame type assignment. An additional encoding parameter (Min Key Frame interval) controls how often scene change frames can be converted to I Frames. FIG. 23 below shows the logic of assigning Frame Type using Scene Change (Schg) information and encoding parameters.

The video encoder uses a bit rate controller 912 (BRC cognizant of LTR), which is aware of LTR Picture marking/assignment and uses content complexity (STC) to set the correct quality to LTR frames and also sets quality of non LTR frames for achieving the required bitrate.

The decoded picture buffer controller 914 (DPB Controller & Ref Pic List Modifier) converts the LTR Actions to bitstream syntax. The default initialized ref list in H.264 and H.265 does not provide the highest compression efficiency when LTR is used or may not even use LTR frames for prediction depending on other encoding parameters. The ALTR system 100 thus uses a Ref Pic List Modifier to correctly arrange the LTR frame in the Ref Pic Lists for highest compression efficiency.

LTR Actions

At the core of some of the implementations herein is Content and Coding Adaptive LTR, which controls the encoder's usage of LTR prediction structure. The control signal LTRAction has 5 operations (e.g., as shown below in Table 2A), which the codec has to perform. The basis of when these 5 operations need to be performed can be varied and below (e.g., as shown below in Table 2B) some of the high level conditions that ALTR system detects to generate the signals are listed.

TABLE 2A

Description of codec operations associated with each LTR Action

| LTRAction | Description |
| --- | --- |
| LTR_Off | Unmark all LTR pictures |
| LTR_Assign | Mark decoded Ref Picture as LTR. |
| LTR_Re-AssignRef (poc) | Unmark current LTR. Mark Reference (poc) in Reflist as LTR. |
| LTR_Re-AssignDec | Unmark current LTR. Mark decoded Ref Picture as LTR. |
| LTR_Continue | No Action needed |

TABLE 2B

Description of conditions which trigger LTR Action

| High level Conditions | LTRAction |
| --- | --- |
| Scene is stable and I frame was inserted. | LTRAssign |
| A scene change was detected and I frame was inserted. | LTRAssign |
| Scene is unstable. | LTROff |
| Scene is stable and Scene transition was detected. | LTRReAssign-Dec |
| Scene is stable and quality of ref pic is higher than LTR. | LTRReAssign-Ref (poc) |
| A scene change was detected, I frame was not inserted. | LTRReAssign-Dec |
| Scene is stable, no key frame or Schg or Strn | LTRContinue |

Figure 10:
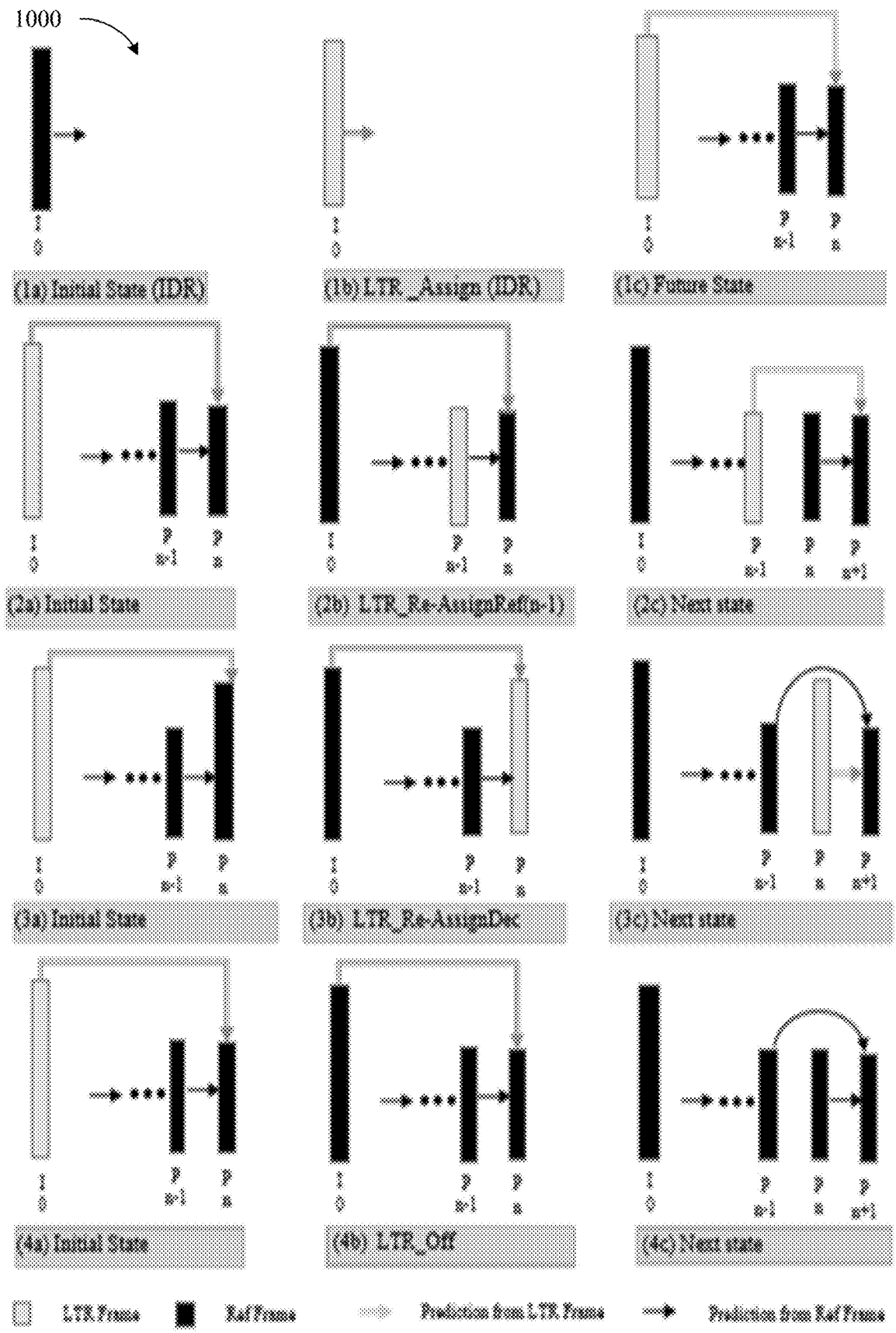
FIG. 10 is an illustrative diagram of an example of state changes 1000 due to LTR actions according to an embodiment.

FIG. 10 is an illustrative diagram of an example of state changes 1000 due to LTR actions, arranged in accordance with at least some implementations of the present disclosure.

In the illustrated example, The ALTR encoder has the ability to perform these LTR operations. FIG. 10 illustrates the state changes due to LTR actions low delay H.264 encoding with 2 ref frames; LTR_Assign in sub fig [1-a,b,c]; LTR_Re-AssignRef (poc) in sub fig [2-a,b,c,]; LTR_Re-AssignDec in sub fig [3-a,b,c] and LTR_OFF in sub fig [4-a,b,c]. The 'a' state is the initial decode or encode state where the decision of LTR actions are made. The 'b' state is the LTR action operation performed by the codec after encode or decode of 'a' state. The 'c' state is resulting state due to codec LTR action available for the next encode or decode.

Content Analyzer

Content Analyzer Example 1 (Used for AVC Encoder)

In some implementations, CA pre-analyzer performs analysis of content to compute spatial and temporal features of the content and some additional metrics at small resolution. Downsample resolution depends on codec and speed settings and can range from 1/16 size to adaptive sampling to 128×64 image size. Spatial complexity (SC) & Temporal complexity (TC) is computed for each frame.

$$SC = \sum_{k=0}^{\frac{W}{4}-1} \sum_{l=0}^{\frac{H}{4}-1} \left[ \frac{\left| \sum_{i=0}^{3} \sum_{j=0}^{3} \frac{|P[k*4+i][l*4+j] - P[k*4+i-1][l*4+j]|^2}{4} \right|}{128} \right] +$$

$$\sum_{k=0}^{\frac{W}{4}-1} \sum_{l=0}^{\frac{H}{4}-1} \left[ \frac{\left| \sum_{i=0}^{3} \sum_{j=0}^{3} \frac{|P[k*4+i][l*4+j] - P[k*4+i][l*4+j+1]|^2}{4} \right|}{128} \right]$$

TC: Temporal complexity measure is based on Motion compensated Sum of Abs Difference computed on down sampled image.

SAD of N×N block is:

$$SAD = \sum_{i=0}^{N} \sum_{j=0}^{N} |S(i,j) - P(i,j)|$$

$$TC = \sum_{k=0}^{\frac{W}{N}-1} \sum_{l=0}^{\frac{H}{N}-1} \left\lfloor \frac{SAD(k,l,N)}{256} \right\rfloor$$

Content Analyzer Example 2 (Used for HEVC Encoder)

In some examples, CA pre-analyzer performs analysis of content to compute spatial and temporal features of the content and some additional metrics at full resolution. Spatial complexity (SC), Temporal complexity (TC) and the ratio TC to SC (TSR) are computed for each frame s follows.

Specifically, for a 4×4 block of a given Picture P, where a pixel is referenced as P[i][j], $$r_{s4} = \left\lfloor \frac{\sum_{i=0}^{3} \sum_{j=0}^{3} (P[i][j] - P[i-1][j])^2}{16} \right\rfloor$$

$$c_{s4} = \left\lfloor \frac{\sum_{i=0}^{3} \sum_{j=0}^{3} (P[i][j] - P[i][j-1])^2}{16} \right\rfloor$$

$$s_4 = \sqrt{r_{s4} + c_{s4}}$$

Picture complexity (SC) is computed as (where picture width is W and picture height is H):

$$R_s = \frac{\sum_{k=0}^{\frac{W}{4}-1} \sum_{l=0}^{\frac{H}{4}-1} r_{s4}[k][l]}{\frac{WH}{16}}$$

$$C_s = \frac{\sum_{k=0}^{\frac{W}{4}-1} \sum_{l=0}^{\frac{H}{4}-1} c_{s4}[k][l]}{\frac{WH}{16}}$$

$$SC = \sqrt{R_s + C_s}$$

TC: Temporal complexity measure is based on Motion compensated Sum of Abs Difference.

SAD of N×N block is $$SAD = \sum_{i=0}^{N-1} \sum_{j=0}^{N-1} |S(i,j) - P(i,j)|$$

$$TC = \frac{1}{W*H} \sum_{k=0}^{\frac{W}{N}-1} \sum_{l=0}^{\frac{H}{N}-1} \lfloor SAD(k,l,N) \rfloor$$

$$TSR = 8 * \sqrt{\frac{TC}{SC}}$$

To reduce random variations of TSR among neighbor frames, moving average of TSR (avgTSR) is used.

$$avgTSR(t) = \begin{cases} \frac{1}{t} \sum_{i=0}^{t} TSR[i] & \text{if } t < 8 \\ avgTSR(t-1) + (TSR(t) - avgTSR(t-1))/9 & \text{else} \end{cases}$$

Scene variation at frame t can be estimated by avgTSR(t).

Scene Change Detector

Figure 11:
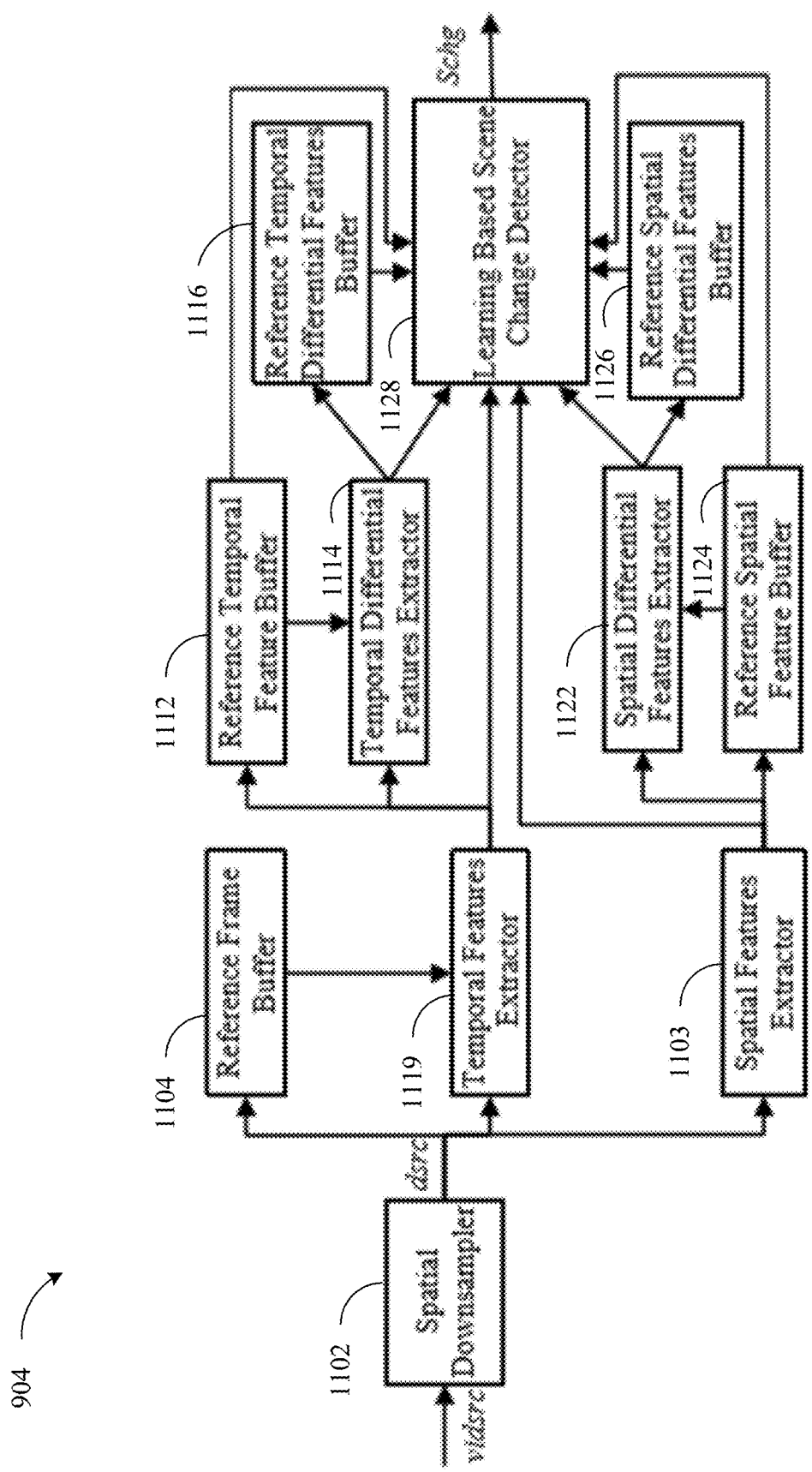
FIG. 11 is an illustrative diagram of an example high level block diagram of a Scene Change Detector according to an embodiment.

FIG. 11 is an illustrative diagram of an example high level block diagram of a Scene Change Detector 904, arranged in accordance with at least some implementations of the present disclosure.

In some examples, spatial downsampler 1102 may operate via box filtering. Box filtering resizing may take the pixel array and divides it into blocks of size stepw×steph and then computes the average value of each block and returns it as the pixel value for that specific position. In the illustrated example, the scene change detector (SCD) 904 may use content analysis and machine learning to determine scene changes. Scene change detector (SCD) 904 may compare current frame features with reference features (previous frame features) to determine any abrupt change due to scene change. FIG. 11 shows the high level block diagram of scene change detector (SCD) 904.

In various implementations, scene change detector 904 may include a variety of components. For example, scene change detector 904 may include a spatial downsampler 1102. Spatial downsampler 1102 may downsample luma of the current frame based at least in part on point sampling or box filtering. For example, luma frames (or fields) may undergo downsampling (e.g., via point sampling or via box filtering) to generate reference pictures (e.g., of 128×64 size) that undergoes further evaluation.

In other examples, spatial downsampler 1102 may operate via point subsampling. In point subsampling each pixel value of the resized image may be grabbed directly from the original picture, without any modification.

A spatial features extractor 1103 may to determine spatial features values from the downsampled luma of the current frame without reference to other frames. The spatial features values may be determined from one or more spatial features including a picture based average of a row wise block gradient array (Rs), a picture based average of a column wise gradient array (Cs), a picture based sum and then an average of a block-wise spatial complexity (SC), a spatial complexity index that maps picture spatial complexity ranges to a single value (SCindex) an average luma value of the current frame (ssDCval), and an average luma value of the previous reference frame (refDCval).

A reference frame buffer 1104 may store a luma array of the previous reference frame.

A temporal features extractor 1110 may determine temporal features values from the downsampled luma of the current frame, the downsampled luma of the previous reference frame, and the determined spatial feature values. As will be described in greater detail below, these temporal features values may include or more of the following feature types: one or more temporal differentials of the spatial features of the current frame as compared with spatial features of the previous reference frame, one or more basic temporal features of the current frame as compared to the previous reference frame, one or more temporal differentials of the temporal features of the current frame as compared to the previous reference frame, and at least one temporal differential of the temporal differentials of the spatial features of the current frame as compared to the previous reference frame.

For example, the one or more basic temporal features of the current frame as compared to the previous reference frame may include one or more of the following temporal features: a count of a number of positive frame difference pixels in the current frame (posBalance), a count of a number of negative frame difference pixels in the current frame (negBalance), an absolute frame difference of the current frame with respect to the previous reference frame (AFD), an average value of motion compensated frame difference between the current frame with respect to the previous reference frame (TSC), and a mapped value of a range of values associated with the average value of motion compensated frame difference between the current frame with respect to the previous reference frame that is mapped to a single value (TSCindex).

Likewise, the one or more temporal differentials of the spatial features of the current frame as compared to the previous reference frame may include one or more of the following temporal features: a gain change temporal difference between the average luma value of the current frame and the previous reference frame (gchDC), a temporal difference of picture spatial complexities based on block rows of the current frame and the previous reference frame (RsDiff), a temporal difference of picture spatial complexities based on block columns of the current frame and the previous reference frame (CsDiff), and a temporal difference of picture spatial complexities based on block rows and block columns of the current frame and the previous reference frame (RsCsDiff).

Additionally, the one or more temporal differentials of the spatial features of the current frame as compared with spatial features of the previous reference frame may include one or more of the following temporal features: a temporal difference of the absolute frame difference of the current frame with respect to the previous reference frame (DiffAFD), a motion vector difference of the current frame with respect to the previous reference frame including an average of picture of a square of difference of current frame minus previous reference frame x component of motion vector and of square of difference of the current frame minus the previous reference frame y component of motion vector (MVDiff), a temporal difference of the temporal difference of the motion vector difference of the current frame with respect to the previous reference frame (DiffMVDiffVal), and a temporal difference of the average value of motion compensated frame difference between the current frame with respect to the previous reference frame (DiffTSC).

Lastly, the temporal differential of the temporal differentials of the spatial features of the current frame as compared to the previous reference frame may include the following temporal feature: a temporal difference of the temporal difference of picture spatial complexities based on block rows and block columns of the current frame and the previous reference frame (DiffRsCsDiff).

A temporal features buffer 1112 may store the determined temporal feature values of the previous reference frame.

A temporal differential features extractor 1114 may difference the determined temporal feature values of the current frame from the determined temporal feature values of the previous reference frame and store those values in a reference temporal differential features buffer 1116.

A spatial features buffer 1122 may store the determined spatial features values of the previous reference frame.

A spatial differential features extractor 1124 may difference the determined spatial feature values of the current frame from the determined spatial feature values of the previous reference frame and store those values in a reference spatial differential features buffer 1126.

A learning based scene change detector 1128 may perform the determination of whether a scene change has occurred. For example, learning based scene change detector 1128 may perform the determination of whether a scene change has occurred based at least in part on the determined spatial features values of the current frame, the determined temporal feature values of the current frame, the determined spatial features values of the previous reference frame and the determined temporal feature values of the previous reference frame.

Scene Transition Detector

Figure 12:
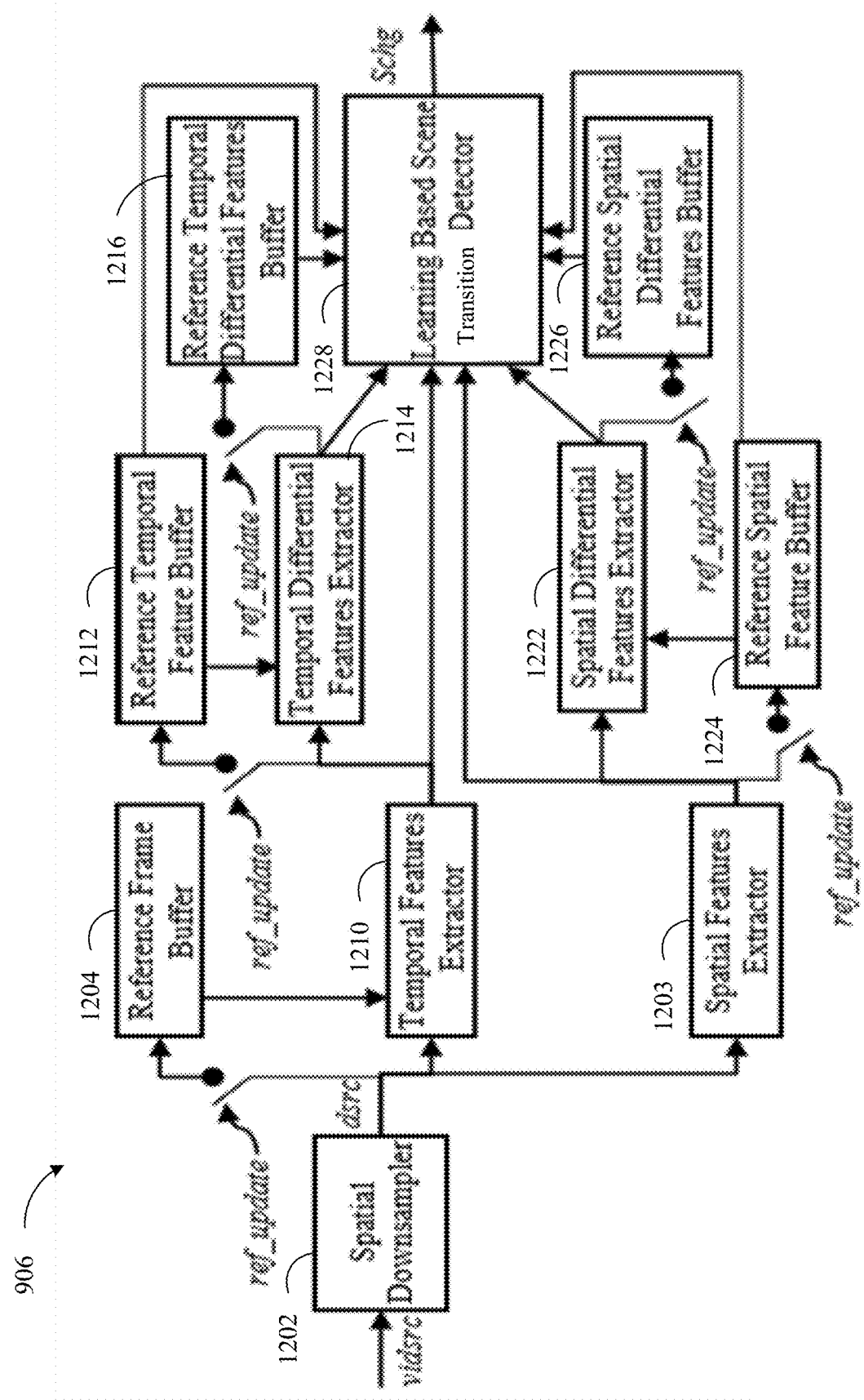
FIG. 12 is an illustrative diagram of an example high level block diagram of a scene transition detector according to an embodiment.

FIG. 12 is an illustrative diagram of an example high level block diagram of a scene transition detector 906, arranged in accordance with at least some implementations of the present disclosure.

In the illustrated example, the scene transition detector (STD) 906 uses content analysis and machine learning to determine scene transitions. The STD 906 is similar to SCD 904 but compares the current frame features with the reference LTR frame instead of the previous frame. FIG. 12 shows the high level block diagram of STD 906. The ref_update signal shown in FIG. 12 controls the update of reference buffers and features in STD 906. The ref_update control is turned off after LTR_Assign+2 sequential frames so that the current frame can be compared with the LTR frame for a detecting scene transition.

In some examples, spatial downsampler 1202 may operate via box filtering. Box filtering resizing may take the pixel array and divides it into blocks of size stepw×steph and then computes the average value of each block and returns it as the pixel value for that specific position. In the illustrated example, the scene transition detector (STD) 906 may use content analysis and machine learning to determine scene changes. Scene transition detector (STD) 906 may compare current frame features with reference features (reference LTR frame features) to determine any abrupt change due to scene change. FIG. 12 shows the high level block diagram of scene transition detector (STD) 906.

In various implementations, scene transition detector 906 may include a variety of components. For example, scene transition detector 906 may include a spatial downsampler 1202. Spatial downsampler 1202 may downsample luma of the current frame based at least in part on point sampling or box filtering. For example, luma frames (or fields) may undergo downsampling (e.g., via point sampling or via box filtering) to generate reference pictures (e.g., of 128×64 size) that undergoes further evaluation.

In other examples, spatial downsampler 1202 may operate via point subsampling. In point subsampling each pixel value of the resized image may be grabbed directly from the original picture, without any modification.

A spatial features extractor 1203 may to determine spatial features values from the downsampled luma of the current frame without reference to other frames. The spatial features values may be determined from one or more spatial features including a picture based average of a row wise block gradient array (Rs), a picture based average of a column wise gradient array (Cs), a picture based sum and then an average of a block-wise spatial complexity (SC), a spatial complexity index that maps picture spatial complexity ranges to a single value (SCindex) an average luma value of the current frame (ssDCval), and an average luma value of the reference LTR frame (refDCval).

A reference frame buffer 1204 may store a luma array of the reference LTR frame.

A temporal features extractor 1210 may determine temporal features values from the downsampled luma of the current frame, the downsampled luma of the reference LTR frame, and the determined spatial feature values. As will be described in greater detail below, these temporal features values may include or more of the following feature types: one or more temporal differentials of the spatial features of the current frame as compared with spatial features of the reference LTR frame, one or more basic temporal features of the current frame as compared to the reference LTR frame, one or more temporal differentials of the temporal features of the current frame as compared to the reference LTR frame, and at least one temporal differential of the temporal differentials of the spatial features of the current frame as compared to the reference LTR frame.

For example, the one or more basic temporal features of the current frame as compared to the reference LTR frame may include one or more of the following temporal features: a count of a number of positive frame difference pixels in the current frame (posBalance), a count of a number of negative frame difference pixels in the current frame (negBalance), an absolute frame difference of the current frame with respect to the reference LTR frame (AFD), an average value of motion compensated frame difference between the current frame with respect to the reference LTR frame (TSC), and a mapped value of a range of values associated with the average value of motion compensated frame difference between the current frame with respect to the reference LTR frame that is mapped to a single value (TSCindex).

Likewise, the one or more temporal differentials of the spatial features of the current frame as compared to the reference LTR frame may include one or more of the following temporal features: a gain change temporal difference between the average luma value of the current frame and the reference LTR frame (gchDC), a temporal difference of picture spatial complexities based on block rows of the current frame and the reference LTR frame (RsDiff), a temporal difference of picture spatial complexities based on block columns of the current frame and the reference LTR frame (CsDiff), and a temporal difference of picture spatial complexities based on block rows and block columns of the current frame and the reference LTR frame (RsCsDiff).

Additionally, the one or more temporal differentials of the spatial features of the current frame as compared with spatial features of the reference LTR frame may include one or more of the following temporal features: a temporal difference of the absolute frame difference of the current frame with respect to the reference LTR frame (DiffAFD), a motion vector difference of the current frame with respect to the reference LTR frame including an average of picture of a square of difference of current frame minus reference LTR frame x component of motion vector and of square of difference of the current frame minus the reference LTR frame y component of motion vector (MVDiff), a temporal difference of the temporal difference of the motion vector difference of the current frame with respect to the reference LTR frame (DiffMVDiffVal), and a temporal difference of the average value of motion compensated frame difference between the current frame with respect to the reference LTR frame (DiffTSC).

Lastly, the temporal differential of the temporal differentials of the spatial features of the current frame as compared to the reference LTR frame may include the following temporal feature: a temporal difference of the temporal difference of picture spatial complexities based on block rows and block columns of the current frame and the reference LTR frame (DiffRsCsDiff).

A temporal features buffer 1212 may store the determined temporal feature values of the reference LTR frame.

A temporal differential features extractor 1214 may difference the determined temporal feature values of the current frame from the determined temporal feature values of the reference LTR frame and store those values in a reference temporal differential features buffer 1216.

A spatial features buffer 1222 may store the determined spatial features values of the reference LTR frame.

A spatial differential features extractor 1224 may difference the determined spatial feature values of the current frame from the determined spatial feature values of the reference LTR frame and store those values in a reference spatial differential features buffer 1226.

A learning based scene transition detector 1228 may perform the determination of whether a scene transition has occurred. For example, learning based scene transition detector 1228 may perform the determination of whether a scene transition has occurred based at least in part on the determined spatial features values of the current frame, the determined temporal feature values of the current frame, the determined spatial features values of the reference LTR frame and the determined temporal feature values of the reference LTR frame.

Figure 13:
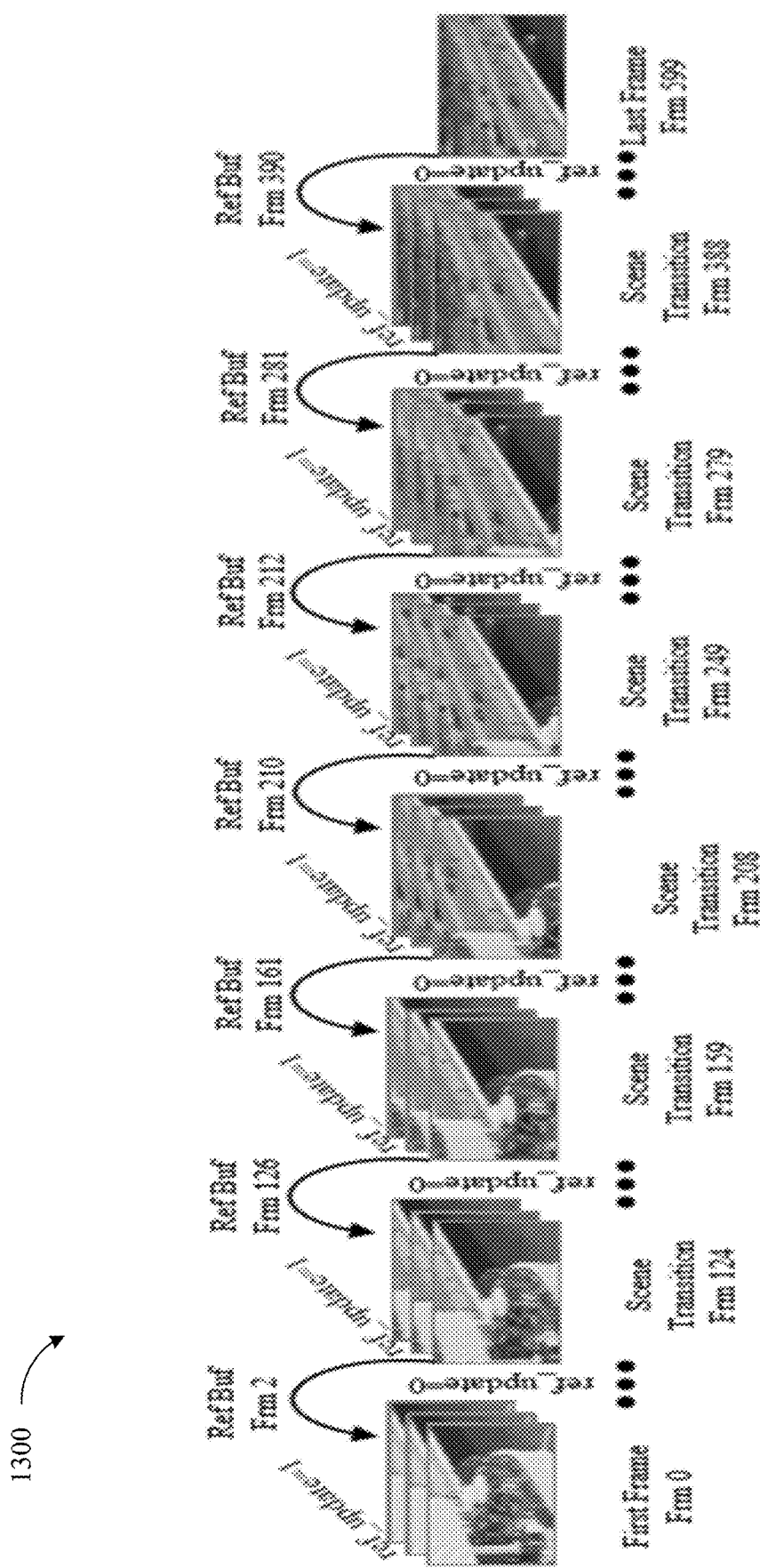
FIG. 13 is an illustrative diagram of an example of results and operation of the scene transition detector on a video sequence according to an embodiment.

FIG. 13 is an illustrative diagram of an example of results 1300 and operation of scene transition detector 1200 on a video sequence, arranged in accordance with at least some implementations of the present disclosure.

In the illustrated example, FIG. 13 shows the results and operation of the scene transition detector (STD) 1200 on a "BQTerrace" video sequence.

LTR Decider

LTR Decider Example 1 (Used for AVC Encoder)

Figure 14:
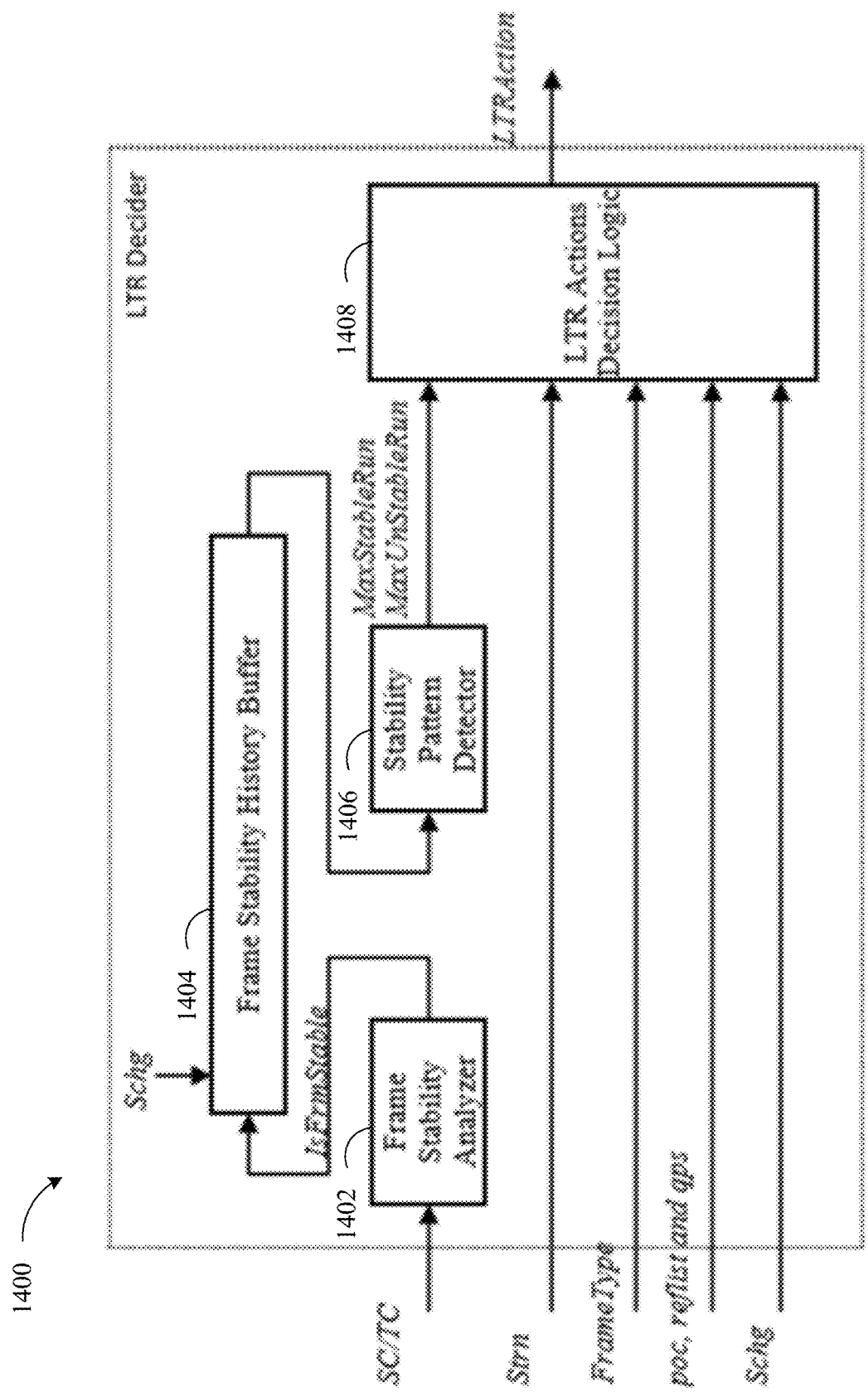
FIG. 14 is an illustrative diagram of an example of an LTR decider adapted for an AVC Encoder according to an embodiment.

FIG. 14 is an illustrative diagram of an example of LTR decider 1400 adapted for an AVC Encoder, arranged in accordance with at least some implementations of the present disclosure.

In some examples, LTR decider 1400 implements the detections of the high level conditions listed in Table 2B to generate their corresponding LTR Actions. FIG. 14 shows the example block diagram of the LTR Decider 1400 for the AVC Encoder. Flowchart (e.g., see FIG. 24 below) shows the decision logic used by LTR decider 1400 for generating the LTR Actions.

For example, LTR decider 1400 may include a frame stability analyzer 1402, a frame stability history buffer 1404, a stability pattern detector 1406, and an LTR Actions decision logic 1408.

Frame stability analyzer 1402 may use spatial & temporal complexity (SC/TC) to generate a determination as to whether a frame is stable.

Frame stability history buffer 1404 may store information from frame stability analyzer 1402 regarding the history of frame stability and the history of scene changes.

Stability pattern detector 1406 may utilize the history of frame stability and the history of scene changes to determine a maximum stable run value and/or a maximum unstable run value.

LTR Actions decision logic 1408 may implement the detections of the high level conditions listed in Table 2B to generate their corresponding LTR Actions based on the maximum stable run value and/or the maximum unstable run value determined by the stability pattern detector 1406. As illustrated LTR Actions decision logic 1408 may also consider scene transition determinations (Strn), the frame type, the picture order and reference list and quantization parameter of the picture (poc, reflist and qps), and scene change determinations (Schg).

LTR Decider Example 2 (Used for HEVC Encoder)

Figure 15:
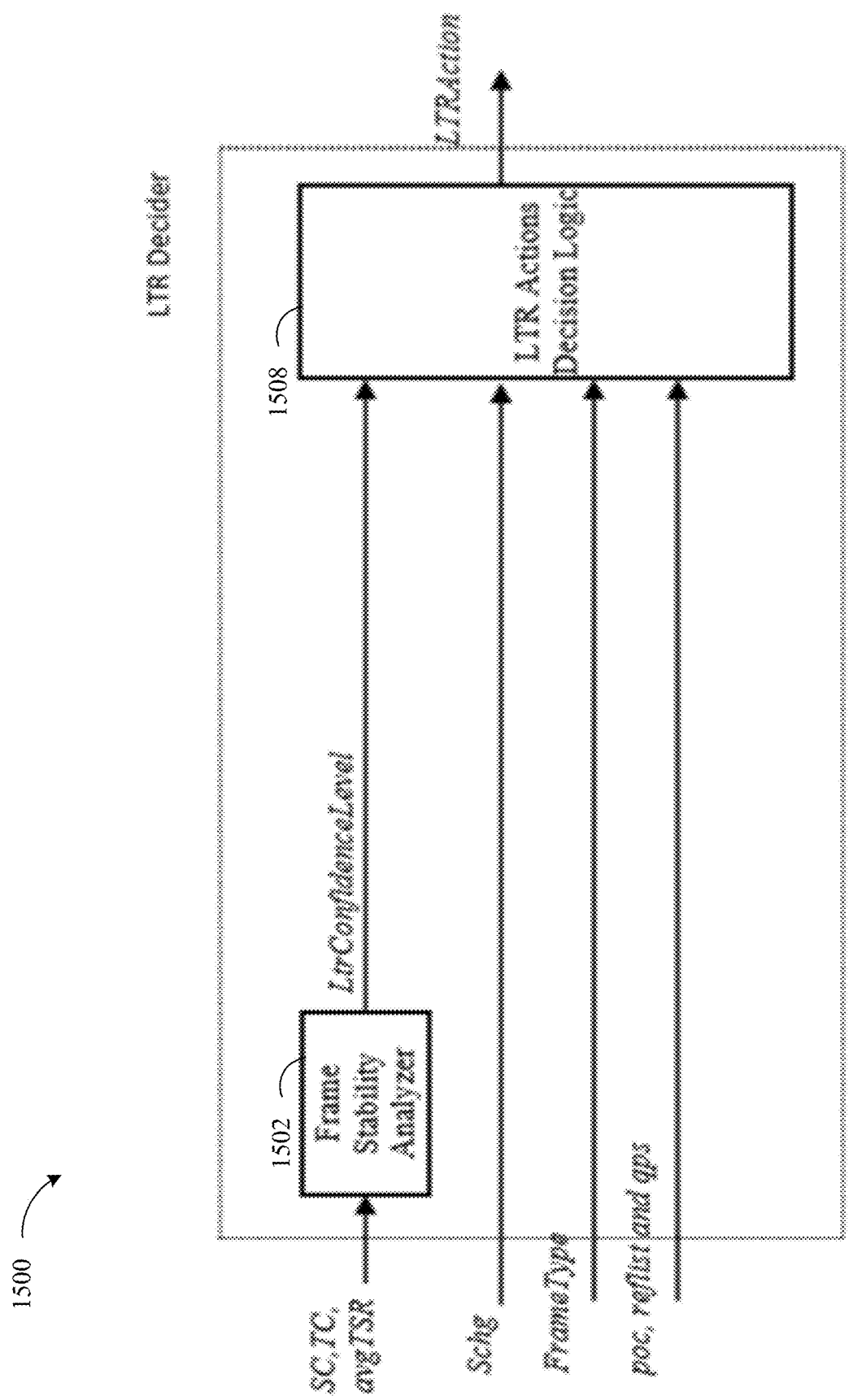
FIG. 15 is an illustrative diagram of an example of an LTR decider adapted for an HEVC Encoder according to an embodiment.

FIG. 15 is an illustrative diagram of an example of LTR decider 1500 adapted for an HEVC Encoder, arranged in accordance with at least some implementations of the present disclosure.

In some examples, LTR decider 1500 implements the detections of LtrConfidenceLevel to generate their corresponding LTR Actions. FIG. 15 shows the example block diagram of the LTR Decider for HEVC Encoder.

For example, LTR decider 1500 may include a frame stability analyzer 1502 and an LTR Actions decision logic 1508.

Frame stability analyzer 1502 may use spatial complexity (SC), temporal complexity (TC), as well as the average ratio of temporal complexity to spatial complexity (avgTSR) to generate a LTR confidence level as to whether a frame is stable for use as an LTR reference frame.

LTR Actions decision logic 1508 may implement the detections of the high level conditions to generate the corresponding LTR Actions based on the LTR confidence level value determined by the frame stability analyzer 1502. As illustrated LTR Actions decision logic 1508 may also consider the frame type, the picture order and reference list and quantization parameter of the picture (poc, reflist and qps), and scene change determinations (Schg).

Scene Stability and LTR Off

Scene Stability and LTR Off Example 1 (Used for AVC Encoder)

The LTR decider uses a pattern based scene stability analysis, along with Schg and Strn information, to decide the LTRActions.

For scene stability analysis, each frame is marked a stable frame or unstable frame based on spatial and temporal complexity of the frame. Stable frames have low temporal complexity for their spatial complexity, which means that motion compensated prediction with low residual coding is the dominant coding method in such frames. Unstable frames with high temporal complexity may be encoded with motion compensation with residual correction or with intra blocks.

$$IsFrmStable = TC^2 < \frac{\text{Max}(SC, 64)}{12}$$

Based on the pattern of stable and unstable frames in a past FramePatternHistory frames, the decision of SceneStability is made for the current frame. FIG. 23 shows the pattern analysis logic to determine the two values, MaxRunStable and MaxRunUnstable, for scene stability analysis.

SceneStabliity=(MaxRunStable>=FramePatternLen && MaxRunUnstable<FramePatternLen)? 1:0

FramePatternLen=5

FramePatternHistory=50

Stable scenes have long runs of stable frames that means motion compensated prediction from long term references should work. A run of unstable frames means the scene is continuously changing and long term prediction may not be useful. Table 3 shows spatial complexity, temporal complexity, frame stability and scene stability for foreman sequence.

If the SceneStabilty is 0, that means the scene is unstable, then (LTRAction=LTR_Off) is signaled.

If the SceneStability is 1, then LTR Assignment, Re-Assignment & continuations actions are further evaluated.

Figure 16:
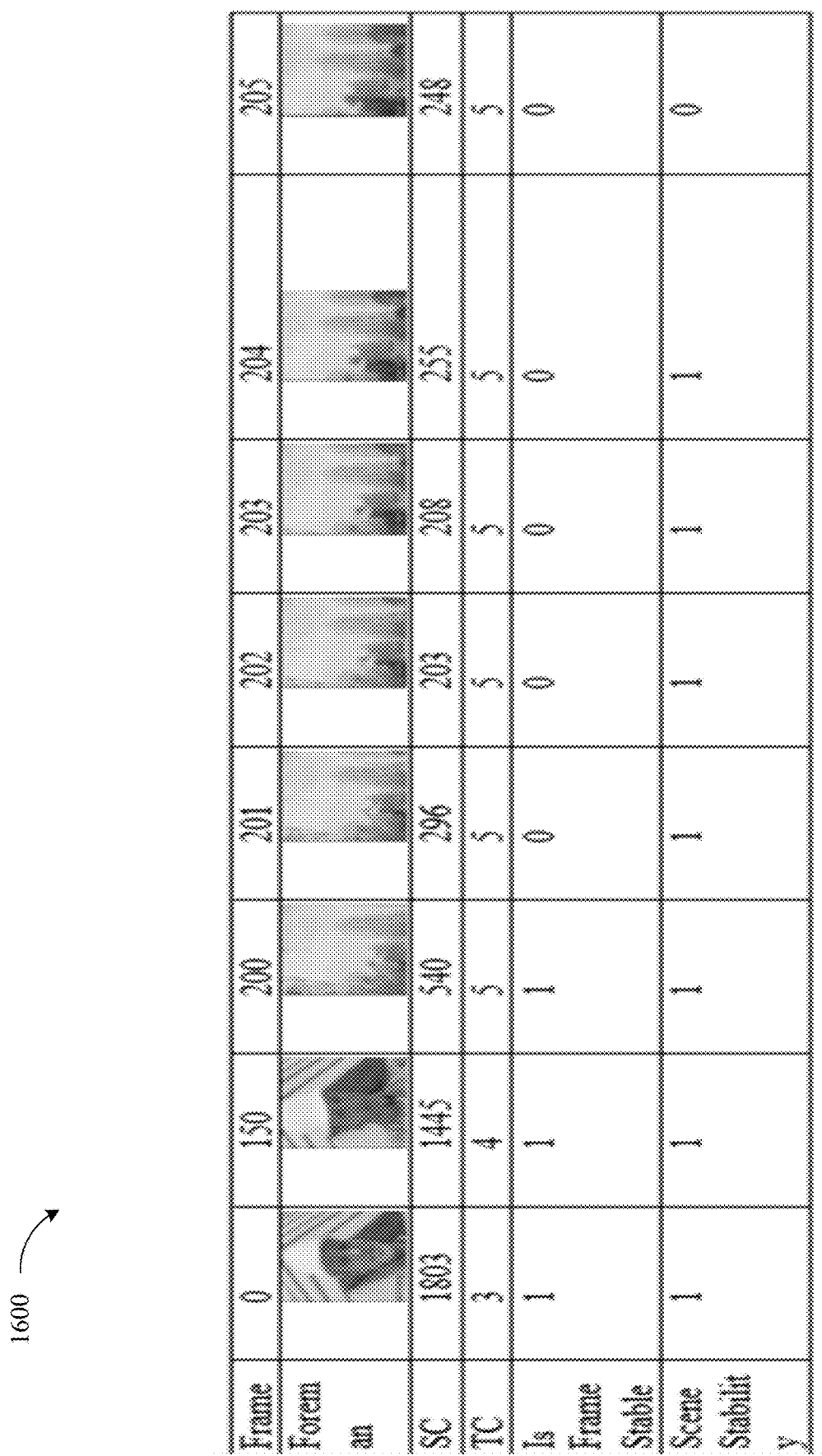
FIG. 16 is an illustrative table of an example of a scene stability analysis for a video sequence according to an embodiment.

FIG. 16 is an illustrative table 1600 of an example of a scene stability analysis for a video sequence, arranged in accordance with at least some implementations of the present disclosure.

In the illustrated example, table 1600 shows a scene stability analysis for a "Foreman" video sequence.

Scene Stability and LTR Off Example 2 (Used for HEVC Encoder)

In some examples, the LTR decider uses scene stability analysis, along with Schg, to decide the LTRActions.

For scene stability analysis, each frame is marked a stable frame or unstable frame based on spatial and temporal complexity of the frame. Stable frames have low temporal complexity for their spatial complexity, which means that motion compensated prediction with low residual coding is the dominant coding method in such frames. Unstable frames with high temporal complexity may be encoded with motion compensation with residual correction or with intra blocks. Here moving average of temporal and spatial complexity ratios avgTSR is used instead of pattern based analysis.

LtrConfidenceLevel sets the groups, which will have same confidence level of LTR, and it is computed for each frame.

if avgTSR>$Th_2$, LtrConfidenceLevel=0
else avgTSR>$Th_1$, LtrConfidenceLevel=1
else avgTSR>$Th_0$, LtrConfidenceLevel=2
else LtrConfidenceLevel=3

Where $Th_0$, $Th_1$, $Th_2$ are thresholds applied on avgTSR for deciding confidence levels.

Based on the ltrConfidenceLevel the decision of SceneStability is made for the current frame.

SceneStablity=(Schg==0 && LtrConfidenceLevel>0)? 1:0

If the SceneStabilty is 0, that means the scene is unstable, then (LTRAction=LTR_Off) is signaled.

If the SceneStability is 1, then LTR Assignment is maintained. When LTR was already turned off, next intra frame will be assigned to LTR frame.

LTR Assignment

The most common way to assign LTR is to make every key frame an LTR frame. Key frame are added to provide ability to seek into the video without decoding every frame since the last I-frame. Key Frames in multiple reference frame encoding scenarios are I-frames with restrictions on predictions from references frame prior to the I-frame. Key frames can be instantaneous decoder refresh frames (IDR) or clean random access frames (CRA in H.265). A typical encoder will encode every key frame with High Quality and assign it as LTR. Key frames simply based on regular interval are not chosen based on video content and do not always make good LTR frame.

Interval based LTR Assignment uses encoding parameter "LTR update interval" to assign LTR frames at fixed given intervals. Such LTR frames may not always be the best LTR frames as they are not chosen based on video content. When LTR is off, interval based assignment is not done. LTR on/off acts as a control to prevent bad frames from being assigned as LTR. Content analysis based LTR assignment such as, scene transition detection based assignment and reference frame quality analysis based assignment, is better than LTR update interval based assignment.

Ref Frame Quality Example 1 (Used for AVC Encoder)

ALTR encoder uses Key frame interval to insert key frames, but only Key frames in stable scenes are allowed as LTR frames. An interval based key frame assigned as LTR in a stable scene can be coded at very good quality by the ALTR BRC as scene statistics and complexity trends are available.

Ref Frame Quality Example 2 (Used for HEVC Encoder)

For the stable sequence, overall coding efficiency is improved by additional increase of the quality of LTR frame. LtrConfidenceLevel is used to determine the amount of quality enhancement for LTR frame.

When $Q_P$ is the quantization parameter that rate controller sets initially, new quantization parameter QP' for LTR frame is determined by:

if LtrConfidenceLevel=0, $Q_P'=Q_P-dQ_{P0}$
else LtrConfidenceLevel=1, $Q_P'=Q_P-dQ_{P1}$
else LtrConfidenceLevel=2, $Q_P'=Q_P-dQ_{P2}$
else $Q_P'=Q_P-dQ_{P3}$ Typically, $dQ_{P0}$ is 0, $dQ_{P1}$ is 2, $dQ_{P2}$ is 5, and $dQ_{P3}$ is 6.

Scene Change and First Frame

It is known that encoding a scene change frame as an I-frame produces better visual quality since it prevents motion compensation from a different scene which could cause visual artifacts (bleeding of scenes) if there are not enough bits for residual update. A scene change I-frame also necessitates a LTR decision. The scene change I-frame cannot use past scene stability metrics. The first frame of a video sequence also has a similar problem as it does not have any scene stability statistics.

LTR Decider always assigns the scene change I-frames and first frame as a LTR frame but since scene stability statistics are not available the BRC uses conservative quality settings due to the uncertainty.

Figure 17:
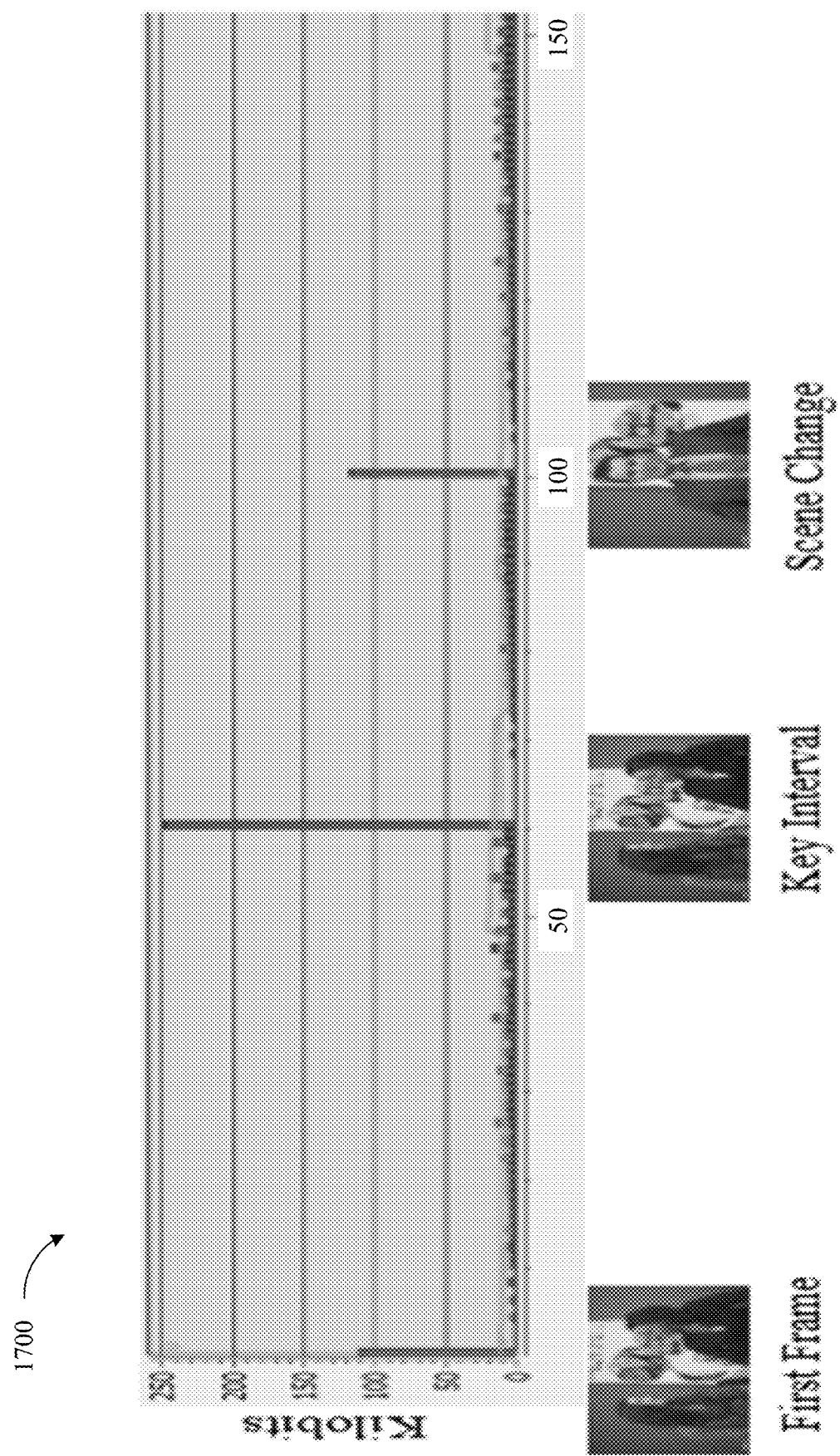
FIG. 17 is an illustrative chart of an example of bits assigned for first frame, forced I-frame due to key frame interval and scene change according to an embodiment.

FIG. 17 is an illustrative chart 1700 of an example of bits assigned for first frame, forced I-frame due to key frame interval and scene change, arranged in accordance with at least some implementations of the present disclosure.

In the illustrated example, FIG. 17 shows bits assigned for first frame, forced I-frame due to key frame interval and scene change. More specifically, FIG. 17 shows an example of 3 possible ALTR I-Frame conditions, First I-Frame LTR, Interval based I-Frame LTR and Scene Change based I-Frame LTR. (CBR 750 kbps H.264 encode of KirstenSaraAndJonny sequence with 60 frame key frame interval and SCD). It also shows the encoded bits (in kbits) for each frame, where frame 0, 60 and 100 are I-Frame assigned as LTR. Frame 60 an I-Frame inserted based on key frame interval is a LTR in a Stable Scene and is thus coded at quality (& high bits).

LTR Re-Assignment

Typical LTR schemes only use key frame interval based LTR assignment. Some also use a LTR update interval, which if smaller than key frame interval, re-assigns a P frame as an LTR frame. However, this selection is not optimal as it is not based on the video content. It may be unnecessary to update the LTR and thus such update will cause loss in efficiency or the frame may not be a good reference frame or LTR prediction structure itself should not be used in that scene, again causing loss in efficiency.

Scene Transition Frame

Instead of using interval to update LTR frames it best to track the LTR frame effectiveness. The STD detects when the current frame is significantly different from the LTR frame. This happens when the scene changes slowly or pans slowly such that there is no scene change but the current frame can no longer effectively predict from the LTR frame.

When Strn is detected LTR_ReAssignDec action is signaled which unmarks the previous LTR frame and mark the current decoded frame as LTR. LTR re-assignment will assign a P-Frame (or GPB frames) as an LTR frame. If the current frame is a B-Frame the assignment is delayed to next P-Frame. Since Strn is known before encoding the frame ALTR BRC can choose to code it with higher quality if buffer constraints allow. FIG. 13 shows the scene transitions detected in BQTerrace sequence. BQTerrace has a slow pan, followed by a fast pan and a still camera at the end. STD is able detect the Scene transition effectively and the Scene Transition Frames corresponds to points where the LTR frame would no longer be an effective predictor and are Re-Assigned.

It may be possible that encoding parameters do not allow insertion of I-frames for scene changes. In such cases P-frames are inserted at scene changes and marked as LTR using LTR_ReAssignDec.

Ref Frame Quality

Typical video encoding is targeted to meet a certain bitrate. The Bitrate controller assigns Qp's per frame or per block such that encoding bitrate target is met. Inter frames can best predict from reference frames only when the Qp of reference frames is similar or lower than the frame being coded. With BRC encoding to meet target bitrates the inter frame Qp's may be lowered, and the LTR frame Qp may be thus higher than the near reference frame Qp's. In this case the LTR frame cannot provide good prediction and need to be unmarked.

When a scene is stable and the reference frame Qp is lower than LTR Qp, the reference is marked as LTR using LTR_ReAssignRef(ref_poc). Where ref_poc is the picture order of the reference picture with lower Qp.

Figure 18:
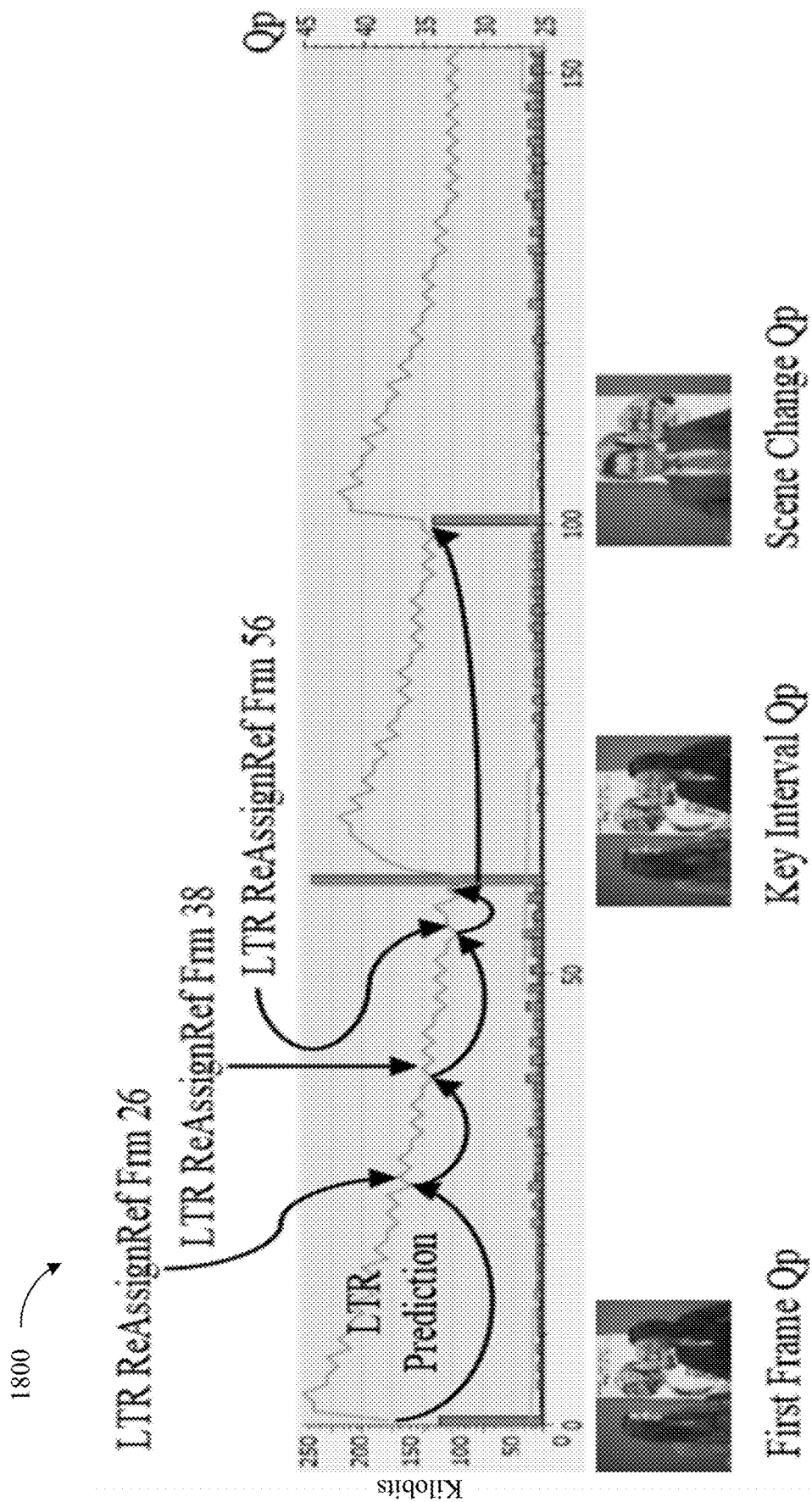
FIG. 18 is an illustrative chart of an example for LTR assignment with Constant Bit Rate (CBR) encoding according to an embodiment.

FIG. 18 is an illustrative chart 1800 of an example for Constant Bit Rate (CBR) encoding, arranged in accordance with at least some implementations of the present disclosure.

In the illustrated example, FIG. 18 shows an example for CBR encoding where the BRC has to reduce Qp for meeting the bitrate constraints triggering LTR re-assignment. More specifically, FIG. 18 shows an example of LTR_RefAssignRef(poc) based on Ref Frame Quality for CBR 750 kbps H.264 encode of KirstenSaraAndJonny sequence with 60 frame key frame intervals and Scene change detection. It shows the Qp for each frame on secondary axis and the LTR reassignments.

LTR Continue

This signal is generated to continue the use of assigned LTR and perform the necessary codec operations (DPB & reflist) to maintain the LTR frame and to use it in motion compensated prediction.

Ref Pic List Modification

All LTRActions need DPB operations to ensure that LTR is available as reference frame. Most codecs have a mechanism to choose and order the reference frames for motion compensation and another mechanism for reference selection per block. Both H.264 and H.265 provide the mechanism of reflists to select and order the DPB frames for motion compensated prediction. Reflists are initialized according to specification and can be re-arranged using ref pic list modification syntax. Typically to select a frame for block motion compensation, a list is selected first and then an index into the list is transmitted to select the reference frame per block.

H264 has 1 reference list for P-Frames (L0) and 2 reflists for B-Frames (L0 & L1). The standard initializes the list L0 using reverse temporal order of decoded frames. That means that LTR frames which usually farthest away are always the last frames in the list. The typical coding costs of the index to select the frame is higher for larger indices, which penalizes LTR frame usage. Most encoder also do not allow using all the frames in the list using another syntax element called 'Active References'. Thus, if the count of reference frames & LTR is larger than active references the index for LTR frame won't be allowed to be selected using the unmodified list.

ALTR for H.264 modifies the reflist L0 such that LTR is assigned to index 1. (e.g., see FIG. 19 below)

Figure 19:
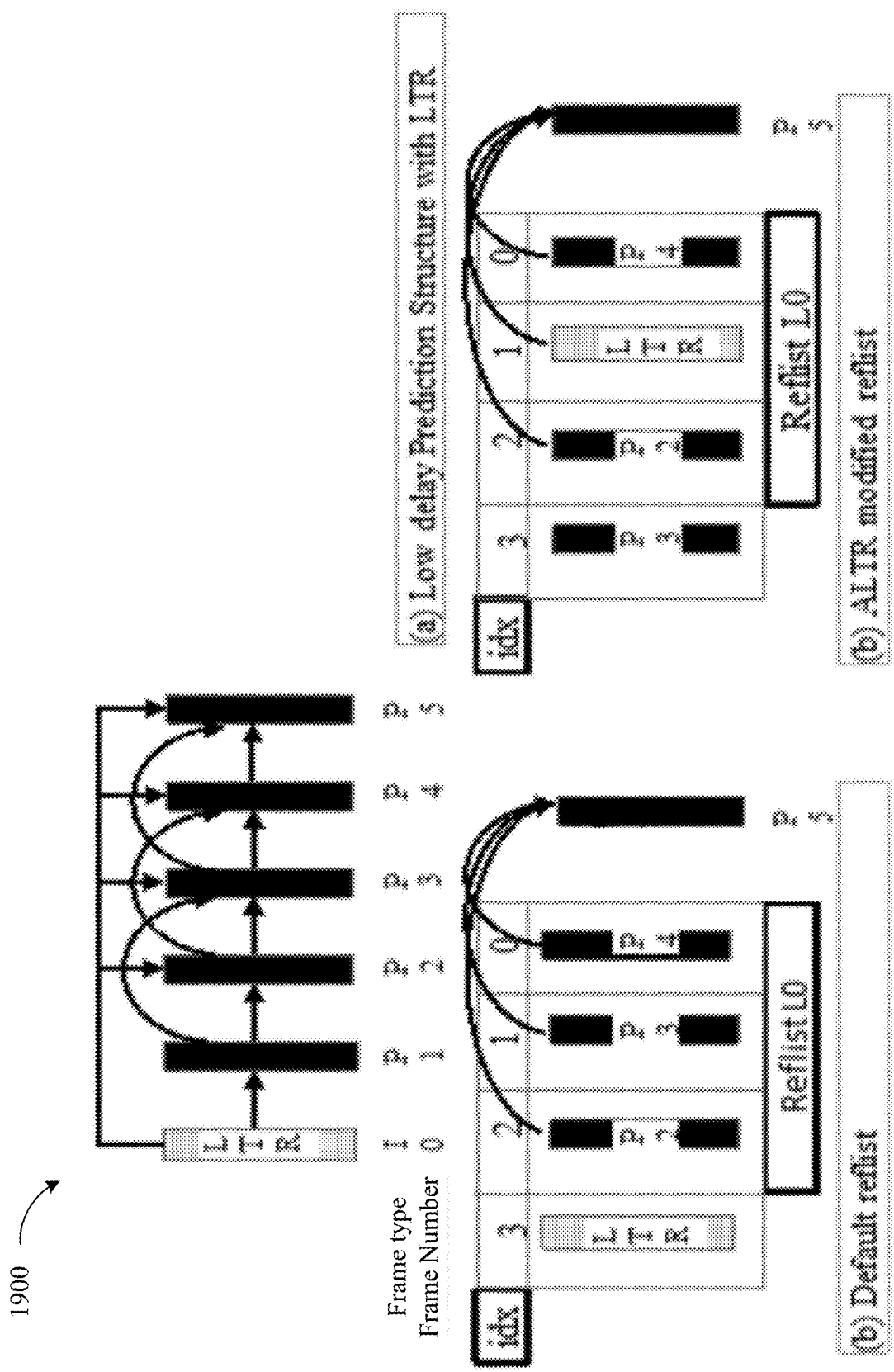
FIG. 19 is an illustrative diagram of an example of ALTR reflist modification for H.264 according to an embodiment.

FIG. 19 is an illustrative diagram 1900 of an example of ALTR for H.264, arranged in accordance with at least some implementations of the present disclosure.

In the illustrated example, FIG. 19 shows H.264 (or H.265 using P-Frames) Low delay encoding using 4 DPB Refs and 3 Active Refs (a) intended prediction structure (b) default reflist for P-frame (b) modified reflist for ALTR.

Index 0 is occupied by the nearest frame. For multiple reference encoding active references have to $>=2$, thus ensuring that LTR is always allowed to be selected and that the cost of choosing LTR is the cost of index 1 not the last index in the list.

H.265 allows using generalized P & B frames, such that a P frame can also have 2 reflists (L0 & L1). H.265 suffers from the same initialization issues as H264 and LTR frames are usually the last indices in the list. H.265 also has the same 'Active References' syntax element, which may prevent LTR usage.

ALTR for H.265 modifies the reflist L1 such that LTR frame is assigned to index 0. (e.g., see FIG. 20 below)

Figure 20:
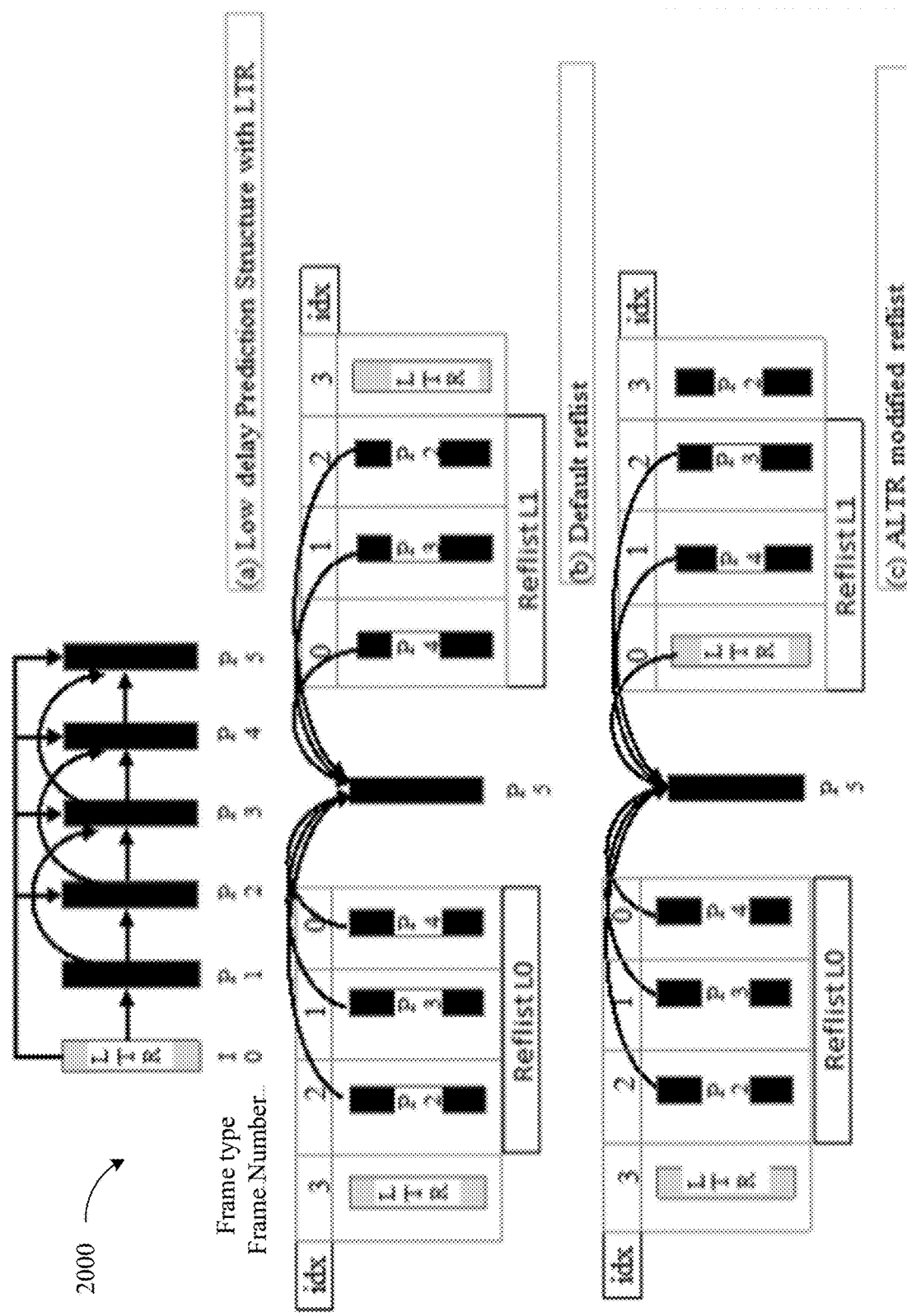
FIG. 20 is an illustrative diagram of an example of ALTR reflist modification for H.265 according to an embodiment.

FIG. 20 is an illustrative diagram 2000 of an example of ALTR for H.265, arranged in accordance with at least some implementations of the present disclosure.

In the illustrated example, FIG. 20 shows H.265 GPB Frame Low delay encoding using 4 DPB Refs and 3 Active Refs (a) intended prediction structure (b) default reflist for P-frame (c) modified reflist for ALTR. (MSDK HEVC TU4 SW and TU7 GAcc Low delay encoder uses 3 active refs and 4 dpb refs).

L0 index 0 is occupied by the nearest frame. The cost of choosing LTR is the cost of selecting list L1 and index 0 and not the last index in the L0.

BRC Cognizant of LTR

Bitrate controllers (BRC) assign Qp's to frames or blocks such the encoding of a video sequence results in the target bitrate. There are many types of BRC for the common applications and their constraints. The common types of bitrate control methods include; Constant Bitrate Control (CBR), Variable Bitrate Control (VBR), Average Bitrate Control (ABR). All bitrate controllers have to achieve a target bitrate.

Here the common steps are detailed for most BRC's and ALTR encoding. The details of every type of BRC are beyond the scope of this document.

All BRC's have to assign an initial quantizer for the video sequence, which will be used by the first frame, and I-Frame. All BRC's have to estimate a bit budget for each frame and compute a Qp for each frame.

ALTR BRC uses a new intra complexity measure and Rate-Complexity-Qp model to determine the Qp of an Intra Frame given a bit budget for the frame.

Content Analysis for BRC

ALTR BRC computes a L2 norm of mean pixel row abs diff and mean pixel column abs diff to determine the complexity of the I-Frame to be coded.

$$I\text{-Complexity}= \sqrt{\left(\frac{16}{WH}\sum_{k=0}^{\frac{W}{4}-1}\sum_{l=0}^{\frac{H}{4}-1}\left[\frac{\sum_{i=0}^{3}\sum_{j=0}^{3}|P[k*4+i][l*4+j]-P[k*4+i-1][l*4+j]|}{16}\right]\right)^2 + \left(\frac{16}{WH}\sum_{k=0}^{\frac{W}{4}-1}\sum_{l=0}^{\frac{H}{4}-1}\left[\frac{\sum_{i=0}^{3}\sum_{j=0}^{3}|P[k*4+i][l*4+j]-P[k*4+i][l*4+j-1]|}{16}\right]\right)^2}$$

Rate-Complexity-Qp Models

Relationship between rate (in bits per pixel) and Qp is modeled as follows:

$\widehat{bpp}$ (C, Q)=$C^k$ α $e^{\beta \ Q}$

Q: Qp
C: I-Complexity
Where $\widehat{bpp}$ (C, Q) is the estimated bits per pixel for given Q and C.

To compute Qp of any I-frame given complexity C and required bpp is:

$$\hat{Q}(bpp, C) = \left(\ln\left(\frac{bpp}{C^k}\right) - \ln(\alpha)\right) / \beta$$

bpp: bits/(W*H*Sc)
Size factor, $S_c$=1.5 (4:2:0), 2.0 (4:2:2), 3.0 (4:4:4)
ln(α), β: 0.694515, −0.107510 (model coefficients)
k: 0.752 (complexity constant)

I-Frame Qp Assignment

Frame Bit budgets are dependent on encoding parameter, complexity of the video & HRD (hypothetical reference decoder) buffer sizes. The basic idea is to allocate bit budgets for each frame type such that the average bitrate is equal to the target bitrate while compression efficiency is maximized.

Typically, I-frame bit ratio for H.264 and H.265 encoding is assumed to 6× of average bitrate. In ALTR encoding 3 conditions of I-frame encoding can occur which require different assignment of quality to I-frames. Below, Table 4 shows bit budgets for various ALTR I-Frame coding conditions. Using the bit budgets, I-Complexity and the RCQ model, an I-Frame Qp can be computed. Different BRCs, codecs and encoding condition require different modeling, however the following relationship always holds.

Default *I*-Frame Bit budget<Conservative LTR Bit Budget<LTR Bit budget

Another possible implementation includes using the default BRC bit budget for computing the I-frame Qp using the RCQ model and then changing the computed Qp by dQp amount based on ALTR conditions.

TABLE 4

Example of LTRAction, Schg, & First-Frame based I-Frame bit budget or dQP.

| LTRAction | Schg or First Frame | Bit budget or Qp | Example Bit Budget | Example dQp |
|---|---|---|---|---|
| LTR_Off | X | Default I-Frame Bit budget | 6x Bits per Frame | 0 |
| LTR_Assign | Yes | Conservative LTR Bit Budget | 8x Bits per Frame | −1 |
| LTR_Assign | No | LTR Bit budget | 12x Bits per Frame | −4 |

FIG. 17, described above, also shows the LTR I-Frame bits for all 3 conditions for an example encode, and it can be seen that First Frame and Scene Change bits are lower than a Stable Scene Key Interval based LTR.

P-Frame Qp Assignment

Typically, P-Frame Qps are computed using a BRC feedback mechanism, where a linear model is computed to provide Qp estimates for P-frame bits using past P-frame bits. In ALTR encoding 4 conditions of P-frame encoding can occur which require different assignment of quality to P-frames. P-Frame Qp's can be computed from bit budgets of using dQp.

TABLE 5

Example of LTRAction, Schg, & Strn based P-Frame bit budget or dQP for low delay encoding.

| LTRAction | LTR | Schg | Strn | P-Frame Bit budget | Example Bit budget | Example dQP |
|---|---|---|---|---|---|---|
| LTR_Off | X | X | X | Default P-Frame Bit budget | 1x Bits per Frame | 0 |
| LTR_On | Yes | No | No | LTR P-Frame Bit budget | 1.40x Bits per frames | −3 |
| LTR_ReAssignDec | Yes | Yes | X | LTR Schg P-Frame Bit budget | 1.25x Bits per Frame | −2 |
| LTR_ReAssignDec | Yes | No | Yes | Conservative LTR Bit budget | 1.12x Bits per Frame | −1 |

In Table 5, bit budgets are shown for various ALTR P-Frame coding conditions. Another possible implementation includes using the default BRC bit budget for computing the P-frame Qp using the linear model and then changing the computed Qp by dQp amount based on ALTR conditions.

Figure 21:
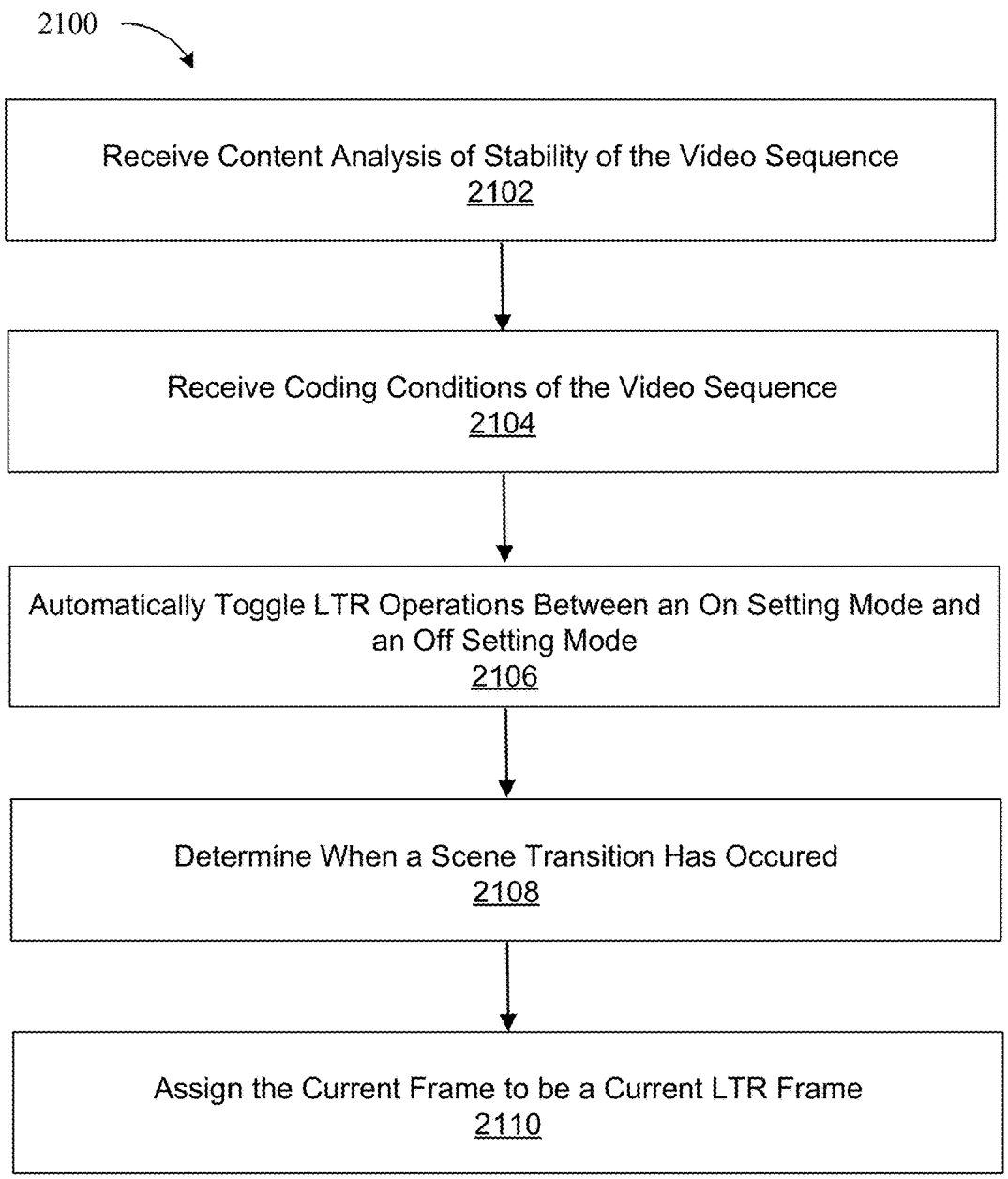
FIG. 21 is an illustrative diagram of an example ALTR method according to an embodiment.

FIG. 21 is an illustrative diagram of an example ALTR method 2100, arranged in accordance with at least some implementations of the present disclosure. The process 2100 may generally be implemented via one or more of the components of the Adaptive LTR system 100 (FIGS. 1 and 9), already discussed.

At operation 2102 (e.g., "receive content analysis of stability of the video sequence"), content analysis of stability of the video sequence may be received.

As described in more detail above, such content analysis may include operations to determine a spatial complexity, a temporal complexity, and/or a ratio of temporal complexity to spatial complexity for each frame of the video sequence. Further, such content analysis may include the generation of content analysis of the stability of the video sequence the based on the spatial complexity, the temporal complexity, and the ratio of temporal complexity to spatial complexity.

At operation 2104 (e.g., "receive coding condition of the video sequence"), coding condition of the video sequence may be received.

At operation 2106 (e.g., "automatically toggle Long Term Reference operations between an on setting mode and an off setting mode"), Long Term Reference operations may be automatically toggled between an on setting mode and an off setting mode. For example, Long Term Reference operations may be automatically toggled between an on setting mode and an off setting mode based at least in part on the received content analysis and coding condition information. For example, no frames of the video sequence may be assigned as Long Term Reference frames and any previously assigned Long Term Reference frames may be unmarked when in the off setting mode.

In one implementation, the operations to automatically toggle Long Term Reference operations between the on setting mode and the off setting mode may be implemented in an AVC encoder. In another implementation, the operations to automatically toggle Long Term Reference operations between the on setting mode and the off setting mode may be implemented in a HEVC encoder.

At operation 2108 (e.g., "determine when a scene transition has occurred"), a determination may be made as to whether a scene transition has occurred with respect to a current frame and a previous frame of the video sequence.

At operation 2110 (e.g., "assign the current frame to be a current Long Term Reference frame"), the current frame may be assigned to be a current Long Term Reference frame based on the determination of the scene transition In one implementation, the assignment of the Long Term Reference frame may include operations to: receive a fixed default interval between assignments of Long Term Reference frames; assign the current frame to be a current Long Term Reference frame based on the fixed default interval; determine when a scene transition has occurred with respect to the current frame and a previous frame of the video sequence; and assign the current frame to be the current Long Term Reference frame based on the determination of the scene transition.

In another implementation, the assignment of the Long Term Reference frame may include operations to: determine an ongoing prediction quality with respect to a current frame and a previous frame of the video sequence; and assign the previous frame to be a current Long Term Reference frame based on the determination of the ongoing prediction quality exceeding a prediction quality with respect to the current frame and a previous Long Term Reference frame.

In a further implementation, the assignment of the Long Term Reference frame may include operations to: receive a fixed default interval between assignments of Long Term Reference frames; assign the current frame to be a current Long Term Reference frame based on the fixed default interval; determine an ongoing prediction quality with respect to the current frame and a previous frame of the video sequence; and assign the previous frame to be the current Long Term Reference frame based on the determination of the ongoing prediction quality exceeding a prediction quality with respect to the current frame and a previous Long Term Reference frame.

In a still further implementation, the assignment of the Long Term Reference frame may include operations to: determine an ongoing prediction quality with respect to the current frame and the previous frame of the video sequence; assign the previous frame to be a current Long Term Reference frame based on the determination of the ongoing prediction quality falling under a threshold value; determine when a scene transition has occurred with respect to the current frame and a previous frame of the video sequence; and assign the current frame to be a current Long Term Reference frame based on the determination of the scene transition.

In a yet further implementation, the assignment of the Long Term Reference frame may include operations to: receive a fixed default interval between assignments of Long Term Reference frames; assign the current frame to be a current Long Term Reference frame based on the fixed default interval; determine an ongoing prediction quality with respect to the current frame and the previous frame of the video sequence; assign the previous frame to be the current Long Term Reference frame based on the based on the determination of the ongoing prediction quality falling under a threshold value; determine when a scene transition has occurred with respect to the current frame and a previous frame of the video sequence; and assign the current frame to be the current Long Term Reference frame based on the determination of the scene transition.

In a yet another implementation, the assignment of the Long Term Reference frame may include operations to: determine when a scene change has occurred with respect to a current frame and a previous frame of the video sequence; and assign the current frame to be a Long Term Reference based on the determination of the scene change.

For example, a quantization parameter may be based on a type of I-Frame instance of a reference frame of the video sequence; where the type of I-Frame instance is one of a Long Term Reference frame type, a scene change detection reference frame type, and a regular I-frame reference frame type; and where the scene change detection reference frame type is a frame that has been be determined to be the beginning frame from a scene change of the video sequence.

In one example, process 2100 may include bringing a current Long Term Reference frame to an index one position two of a reference list zero in an AVC encoder.

In another example, process 2100 may include bringing a current Long Term Reference frame to an index zero position one of a reference list one in an HEVC encoder.

Additional and/or alternative details of process 2100 are described below with regard to FIGS. 22-26.

Figure 22:
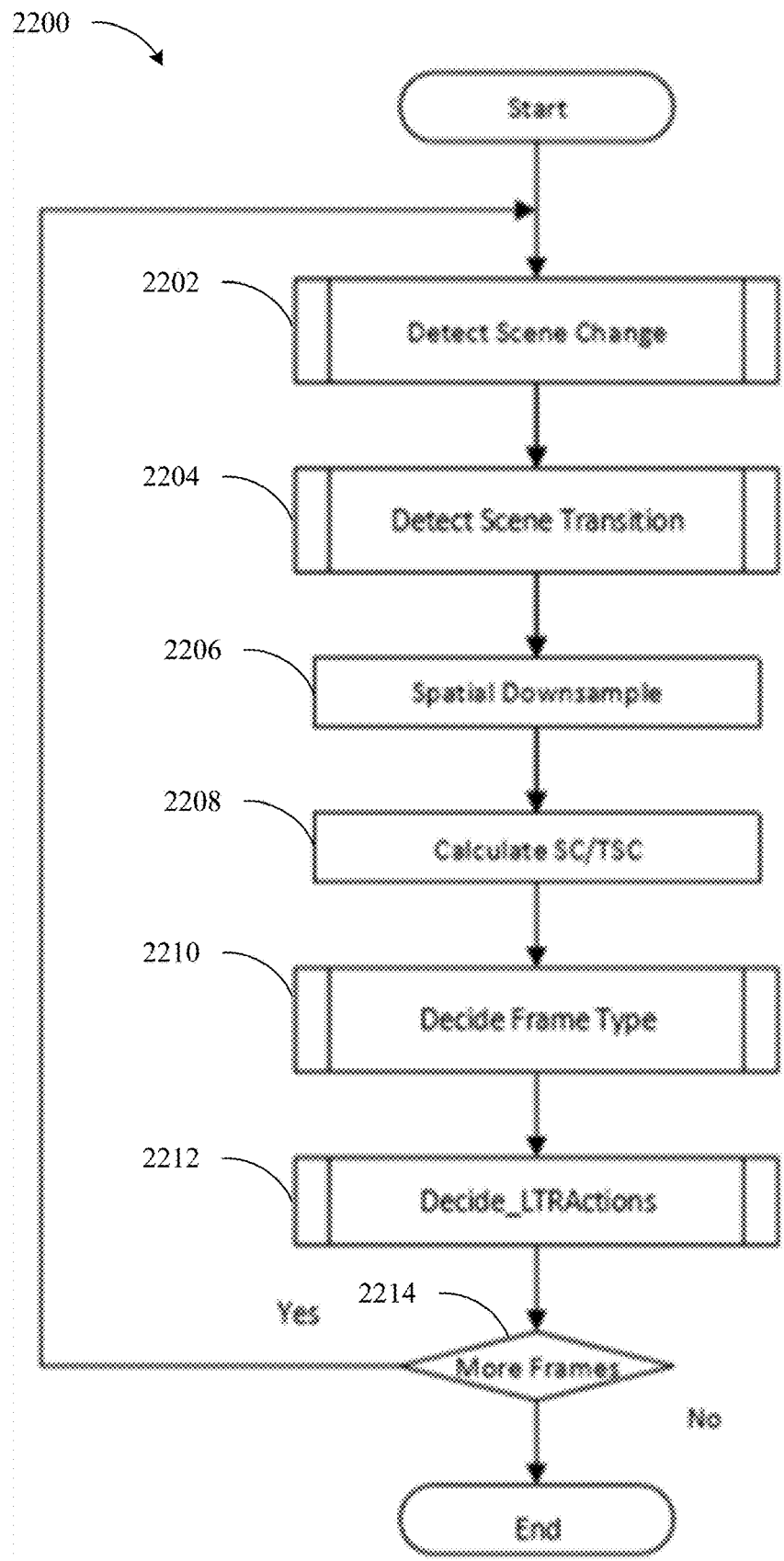
FIG. 22 is an illustrative diagram of an example ALTR method according to an embodiment.

FIG. 22 is an illustrative diagram of an example ALTR method 2200, arranged in accordance with at least some implementations of the present disclosure. The process 2200 may generally be implemented via one or more of the components of the Adaptive LTR system 100 (FIGS. 1 and 9), already discussed.

At operation 2202 (e.g., "detect scene change"), a determination may be made as to whether a scene change has occurred.

At operation 2204 (e.g., "detect scene transition"), a determination may be made as to whether a scene transition has occurred. For example, scene transition may be detected according to the operations of FIG. 12, as was discussed in further detail above.

At operation 2206 (e.g., "spatial downsample"), spatial downsampling may be performed. For example, scene change may be detected according to the operations of FIG. 11, as was discussed in further detail above.

At operation 2208 (e.g., "calculate SC/TSC"), calculation may be made regarding spatial complexity (SC), temporal complexity (TC), average value of motion compensated frame difference between the current frame with respect to the previous reference frame (TSC), and/or other spatial and/or temporal features described herein.

At operation 2210 (e.g., "decide frame type"), a decision may be made regarding frame type. For example, a quantization parameter may be based on a type of I-Frame instance of a reference frame of the video sequence. In such an example, the type of I-Frame instance may be determined to be one of a Long Term Reference frame type, a scene change detection reference frame type, and a regular I-frame reference frame type. The scene change detection reference frame type is a frame that has been be determined to be the beginning frame from a scene change of the video sequence. For example, a frame type may be decided according to process 2300 of FIG. 23, as will be discussed in further detail below.

At operation 2212 (e.g., "Decide_LTRActions"), LTR Actions may be decided. For example, LTR Actions may be decided according to process 2400 of FIG. 24, as will be discussed in further detail below.

At operation 2214 (e.g., "more frames"), process 2200 may repeat until all the frames of a video sequence have been processed.

FIG. 23 is an illustrative diagram of an example frame type decision method 2300, arranged in accordance with at least some implementations of the present disclosure. The process 2300 may generally be implemented via one or more of the components of the Adaptive LTR system 100 (FIGS. 1 and 9), already discussed.

As discussed above, the Frame Type decider 910 of FIG. 9 may use the Scene Change (Schg) information from content analysis along with encoding parameters such as Key frame interval, number of B-frames & B-pyramid settings, to determine Intra frame insertion and frame type assignment. An additional encoding parameter (Min Key Frame interval) may control how often scene change frames can be converted to I Frames. Process 2300 shows the logic of assigning Frame Type using Scene Change (Schg) information and encoding parameters.

At operation 2302 (e.g., "Interval since Last I Frame>=Key Frame Interval"), a determination may be made as to whether the interval since the last I Frame is greater than or equal to the key fame interval.

At operation 2304 (e.g., "Set as I-Frame"), the frame type may be set as an I Frame when a determination is made that the interval since the last I Frame is greater than or equal to the key fame interval.

At operation 2306 (e.g., "Is Schg?"), when a determination is made that the interval since the last I Frame is not greater than or equal to the key fame interval, a determination may be made as to whether there has been a scene change.

At operation 2308 (e.g., "Set as P or B-Frame based on GOP Pattern"), the frame type may be set as a P or B Frame when a determination is made that there has not been a scene change. For example, the frame type may be set as a P or B Frame based on the (Group of Pictures) Pattern.

At operation 2310 (e.g., "Interval since Last I Frame<Min Key Frame Interval"), when a determination is made that there has been a scene change, process 2300 may proceed to operation 2310 to determine whether the interval since the last I Frame is less than the minimum key frame interval. If not, process 2300 proceeds to operation 2304.

At operation 2312 (e.g., "Set as P-Frame"), the frame type may be set as a P Frame when a determination is made that the interval since the last I Frame is less than the minimum key frame interval.

Figure 24:
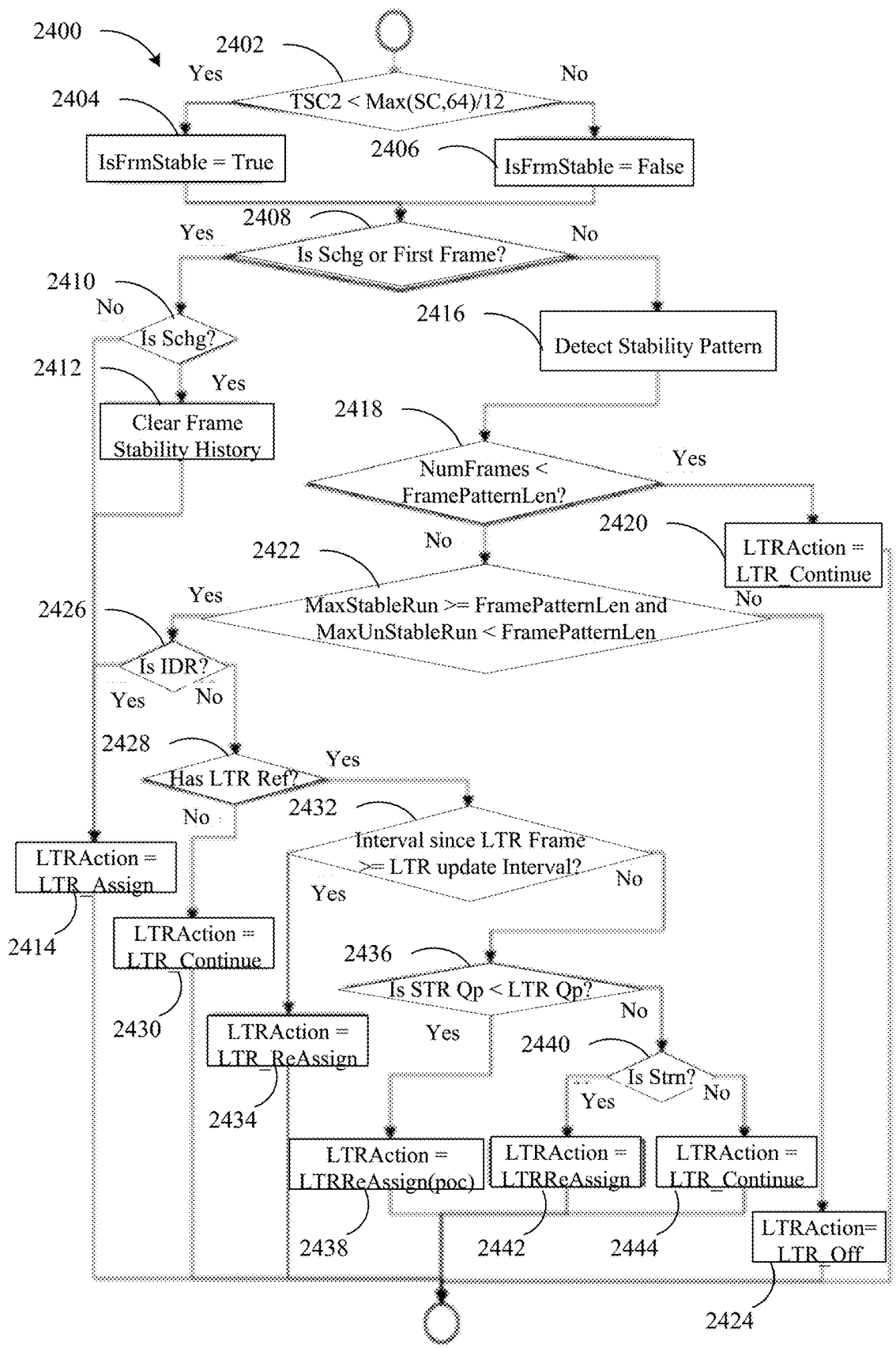
FIG. 24 is an illustrative diagram of an example LTR Actions decision method according to an embodiment.

FIG. 24 is an illustrative diagram of an example LTR Actions decision method 2400, arranged in accordance with at least some implementations of the present disclosure. The process 2400 may generally be implemented via one or more of the components of the Adaptive LTR system 100 (FIGS. 1 and 9), already discussed.

At operations 2402 (e.g., "TSC<Max(SC,64)/12"), 2404 (e.g., "IsFrmStable=True"), and 2406 (e.g., "IsFrmStable=False"), a determination may be made as to whether a frame is stable based on spatial complexity (SC) and the average value of motion compensated frame difference between the current frame with respect to the previous reference frame (TSC).

At operation 2408 (e.g., "Is Schg or First Frame"), a determination may be made as to whether a frame is a first frame or a scene change frame.

At operation 2410 (e.g., "Is Schg?"), a determination may be made as to whether a frame is a scene change frame in response to the determination at operation 2408 that a frame is a first frame or a scene change frame.

At operation 2412 (e.g., "Clear Frame Stability History"), a frame stability history may be cleared in response to the determination at operation 2410 that frame is a scene change frame.

At operation 2414 (e.g., "LTR Action=LTR Assign"), an LTR Action may be taken to assign the frame as an LTR frame either in response to a determination at operation 2410 that frame is not a scene change frame or in response to operation 2412 clearing the frame stability history.

At operation 2416 (e.g., "Detect Stability Pattern"), a stability pattern may be detected in response to the determination at operation 2408 that a frame is not a first frame and not a scene change frame.

At operation 2418 (e.g., "NumFrames<FramePatternLen"), a determination may be made as to whether a number of frames is less than a frame pattern "len" determined from the stability pattern of operation 2416.

At operation 2420 (e.g., "LTR Action=LTR Continue"), an LTR Action may be taken to continue with the current LTR frame in response to a determination at operation 2418 that the number of frames is less than the frame pattern "len".

At operation 2422 (e.g., "MaxStableRun>=FramePatternLen and MaxUnstableRun<FramePatternLen"), where a determination may be made as to whether a maximum stable run is greater or equal to the frame pattern "len" determined from the stability pattern of operation 2416 and whether a maximum unstable run is less than the frame pattern "len".

Based on the pattern of stable and unstable frames in a past FramePatternHistory frames, the decision of SceneStability is made for the current frame. FIG. 23 shows the pattern analysis logic to determine the two values, MaxRunStable and MaxRunUnstable, for scene stability analysis.

At operation 2424 (e.g., "LTR Action=LTR Off"), an LTR Action may be taken to toggle LTR operations into an off setting mode in response to a determination at operation 2422 that the maximum stable run is not greater or equal to the frame pattern "len" determined from the stability pattern of operation 2416 and/or that a maximum unstable run is not less than the frame pattern "len".

At operation 2426 (e.g., "Is IDR?"), a determination may be made as to whether the frame is a key frame of an instantaneous decoder refresh frame (IDR) type. When the frame is determined to be an instantaneous decoder refresh frame (IDR) type, process 2400 may proceed to operation 2414, described above.

At operation 2428 (e.g., "Has LTR Ref?"), where a determination may be made as to whether an LTR reference frame has previously been set in response to a determination at operation 2426 that the frame is not a key frame of an instantaneous decoder refresh frame (IDR) type.

At operation 2430 (e.g., "LTR Action=LTR Continue"), an LTR Action may be taken to continue using the current LTR reference frame in response to a determination at operation 2428 that an LTR reference frame has not previously been set.

At operation 2432 (e.g., "Interval since LTR Frame>=LTR update Interval?"), a determination may be made as to whether the interval since assigning an LTR Frame is greater or equal to an LTR update interval.

At operation 2434 (e.g., "LTR Action=LTR ReAssign"), an LTR Action may be taken to reassign a frame as a new current LTR frame in response to the determination at operation 2432 that the interval since assigning an LTR Frame is greater or equal to an LTR update interval.

At operation 2436 (e.g., "Is STR Qp<LTR Qp?"), a determination may be made as to whether a scene transition based Qp is less than the current LTR frame Qp in response to the determination at operation 2432 that that the interval since assigning an LTR Frame is not greater or equal to an LTR update interval.

At operation 2438 (e.g., "LTR Action=LTR ReAssign (poc)"), an LTR Action may be taken to reassign a frame in a reference list as a new current LTR frame in response to the determination at operation 2436 that a scene transition based Qp is less than the current LTR frame Qp.

At operation 2440 (e.g., "Is Strn?"), a determination may be made as to whether there is a scene transition in response to a determination at operation 2436 that a scene transition based Qp is not less than the current LTR frame Qp.

At operation 2442 (e.g., "LTR Action=LTR ReAssign"), an LTR Action may be taken to reassign a frame as a new current LTR frame in response to the determination at operation 2440 that there is a scene transition.

At operation 2444 (e.g., "LTR Action=LTR Continue"), an LTR Action may be taken to continue using the current LTR reference frame in response to a determination at operation 2440 that there is not a scene transition.

Figure 25:
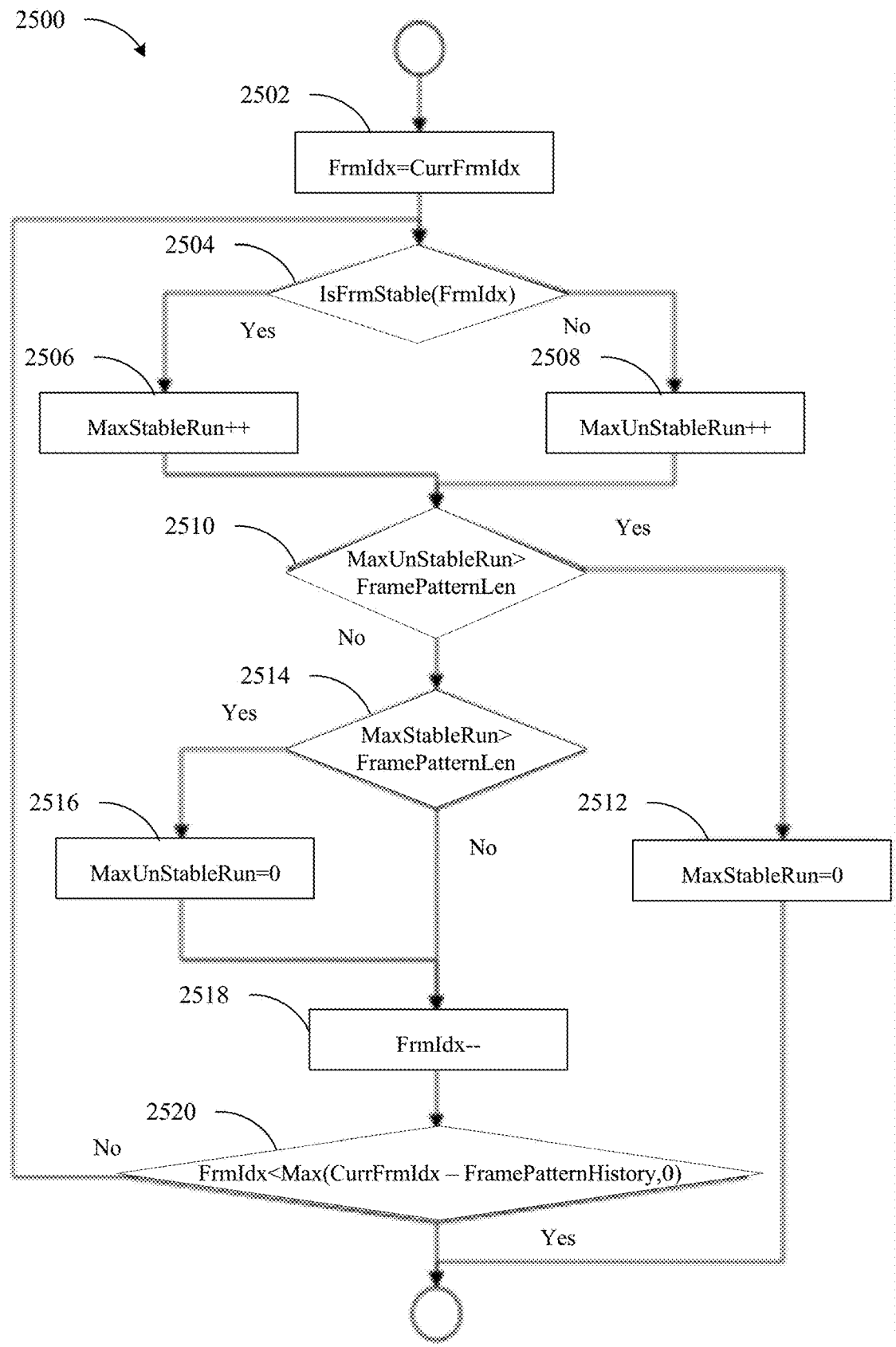
FIG. 25 is an illustrative diagram of an example Stability Pattern Detector method according to an embodiment.

FIG. 25 is an illustrative diagram of an example Stability Pattern Detector method 2500, arranged in accordance with at least some implementations of the present disclosure. The process 2500 may generally be implemented via one or more of the components of the Adaptive LTR system 100 (FIGS. 1 and 9), already discussed.

At operation 2502 (e.g., "FrmIdx=CurFrmIdx"), a current frame index may be set as a frame index.

At operation 2504 (e.g., "IsFrmStable(FrmIdx)"), a determination may be made as to whether the frame is stable.

At operation 2506 (e.g., "MaxStableRun++"), a maximum unstable run may be determined in response to a determination at operation 2504 that the frame is unstable.

At operation 2508 (e.g., "MaxUnStableRun++"), a maximum stable run may be determined in response to a determination at operation 2504 that the frame is stable.

At operation 2510 (e.g., "MaxUnStableRun>FramePatternLen"), a determination may be made as to whether the maximum unstable run is greater than the frame pattern "len".

At operation 2512 (e.g., "MaxStableRun=0"), the maximum stable run may be set to zero in response to a determination at operation 2510 that the maximum unstable run is greater than the frame pattern "len".

At operation 2514 (e.g., "MaxStableRun>FramePatternLen"), a determination may be made as to whether the maximum stable run is greater than the frame pattern "len".

At operation 2516 (e.g., "MaxUnStableRun=0"), the maximum unstable run may be set to zero in response to a determination at operation 2514 that the maximum stable run is greater than the frame pattern "len".

At operation 2518 (e.g., "FrmIdx--"), the frame index may be updated in response to a determination at operation 2514 that the maximum stable run is not greater than the frame pattern "len".

At operation 2520 (e.g., "FrmIdx<Max(CurrFrmIdx-FramePatternHistory,0)"), process 2500 will repeat until the frame index is less than a maximum of the current frame index minus a frame pattern history.

Figure 26:
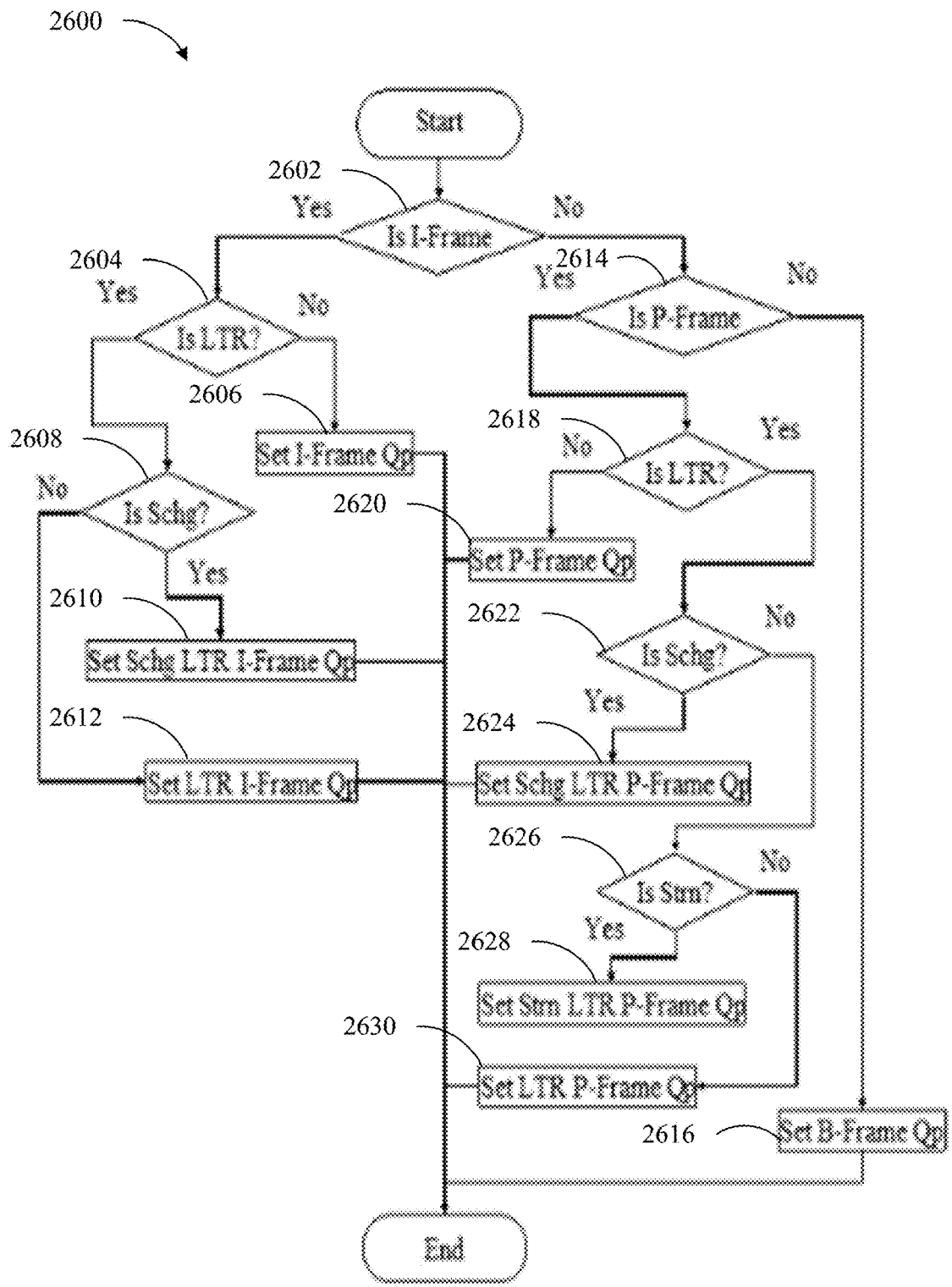
FIG. 26 is an illustrative diagram of an example quantization parameter (Qp) assignment method according to an embodiment.

FIG. 26 is an illustrative diagram of an example quantization parameter (Qp) assignment method 2600, arranged in accordance with at least some implementations of the present disclosure. The process 2600 may generally be implemented via one or more of the components of the Adaptive LTR system 100 (FIGS. 1 and 9), already discussed.

At operation 2602 (e.g., "Is I-Frame"), a determination may be made as to whether the frame is an I frame.

At operation 2604 (e.g., "Is LTR?"), a determination may be made as to whether the frame is an LTR frame.

At operation 2606 (e.g., "Set I-Frame Qp"), an I frame Qp may be set.

At operation 2608 (e.g., "Is Schg?"), a determination may be made as to whether a scene change has occurred.

At operation 2610 (e.g., "Set Schg LTR I-Frame Qp"), a scene change LTR I frame Qp may be set.

At operation 2612 (e.g., "Set LTR I-Frame Qp"), an LTR I frame Qp may be set.

At operation 2614 (e.g., "Is P-Frame?"), a determination may be made as to whether the frame is a P frame.

At operation 2616 (e.g., "Set B-Frame Qp"), a B frame Qp may be set.

At operation 2618 (e.g., "Is LTR?"), a determination may be made as to whether the frame is an LTR frame.

At operation 2620 (e.g., "Set P-Frame Qp"), a P frame Qp may be set.

At operation 2622 (e.g., "Is Schg?"), a determination may be made as to whether a scene change has occurred.

At operation 2624 (e.g., "Set Schg LTR P-Frame Qp"), a scene change LTR P frame Qp may be set.

At operation 2626 (e.g., "Is Strn?"), a determination may be made as to whether a scene transition has occurred.

At operation 2628 (e.g., "Set Strn LTR P-Frame Qp"), a scene transition LTR P frame Qp may be set.

At operation 2630 (e.g., "Set LTR P-Frame Qp"), an LTR P frame Qp may be set.

Embodiments of the methods of FIG. 21, FIG. 22, FIG. 23, FIG. 24, FIG. 26 and/or FIG. 26 (and other methods herein) may be implemented in a system, apparatus, processor, reconfigurable device, etc., for example, such as those described herein. More particularly, hardware implementations of the method may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method of FIG. 21, FIG. 22, FIG. 23, FIG. 24, FIG. 26 and/or FIG. 26 (and other methods herein) may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, embodiments or portions of the method of FIG. 21, FIG. 22, FIG. 23, FIG. 24, FIG. 26 and/or FIG. 26 (and other methods herein) may be implemented in applications (e.g., through an application programming interface/API) or driver software running on an OS. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Below in FIGS. 27 and 28, visual quality improvements are shown for a surveillance and video conference test sequence. Adaptive LTR encoding is 20-24% more efficient as shown in FIG. 29 and BDRate analysis of these sequences in Table 6.

Figure 27:
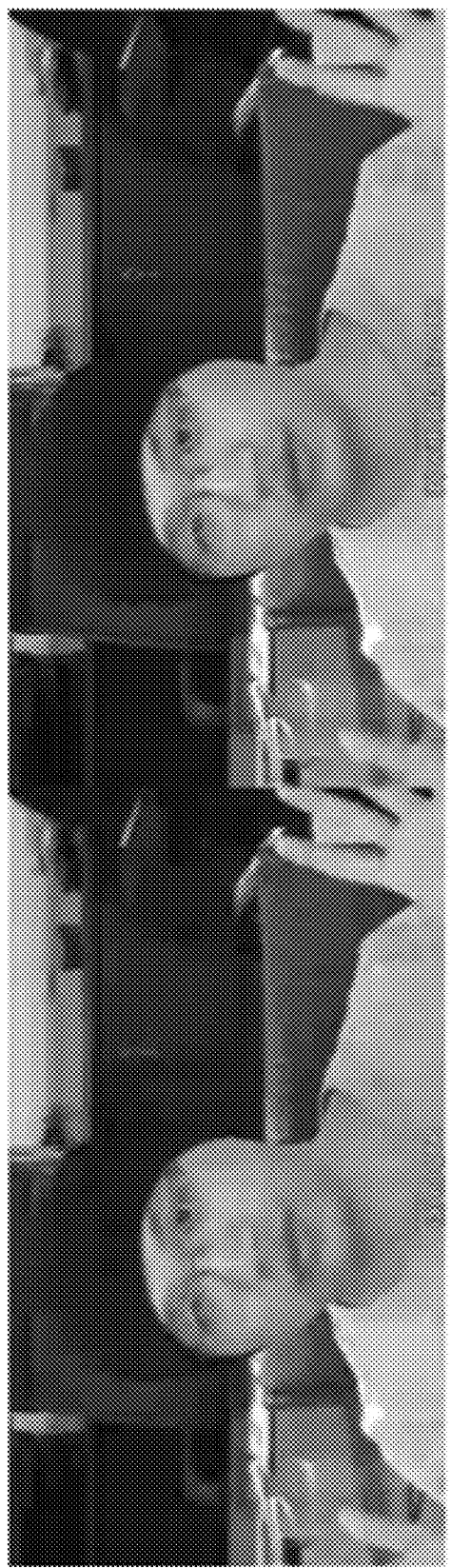
FIG. 27 is an illustrative diagram of an example video sequence encoded at 500 kbps without LTR and with LTR according to an embodiment.

FIG. 27 is an illustrative diagram of an example video sequence 2700 encoded at 500 kbps, arranged in accordance with at least some implementations of the present disclosure.

FIG. 27 shows Frame 250 of "Vidyo4" sequence encoded at 500 kbps using Low delay, CBR & 2 second GOP and AVC balanced preset settings. (a) encoded without LTR (b) encoded with Adaptive LTR. The center of the video (640× 360) has been enlarged to show quality differences.

Figure 28:
FIG. 28 is an illustrative diagram of an example video sequence encoded at 1000 kbps without LTR and with LTR according to an embodiment.
Figure 29:
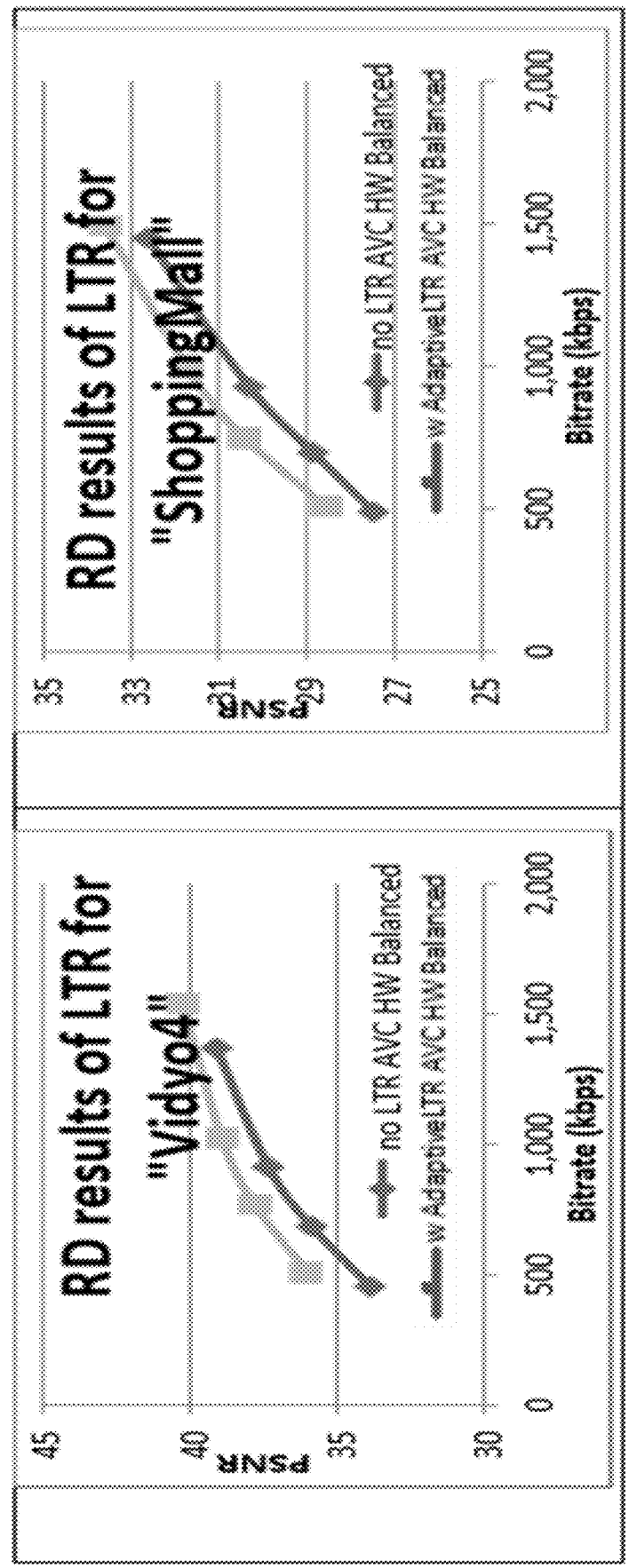
FIG. 29 is an illustrative chart of an example of rate distortion curves according to an embodiment.

FIG. 28 is an illustrative diagram of an example video sequence 2800 encoded at 1000 kbps, arranged in accordance with at least some implementations of the present disclosure.

FIG. 28 shows Frame 50 of "ShoppingMall" sequence encoded at 1000 kbps using Low delay, CBR & 2 second GOP settings with AVC balanced preset. (a) encoded without LTR (b) encoded with Adaptive LTR. The center of the video (640×360) has been enlarged to show quality differences.

FIG. 29 is an illustrative chart 2900 of an example of rate distortion curves, arranged in accordance with at least some implementations of the present disclosure.

FIG. 29 shows rate distortion curves showing bitrate & psnr for 4 encodes using low delay CBR 2 second GOP and balanced preset settings for Vidyo4 & Shopping Mall sequences, encoded with Adaptive LTR and without LTR.

TABLE 6

BDRate of Adaptive LTR w.r.t. No LTR encodes.

| Sequence | Resolution | FPS | Bitrates (kbps) | BDRate[10] |
|---|---|---|---|---|
| Vidyo4_720p_60fps[1] | 1280 × 720 | 60 | 1500, 1000, 750, 500 | −24% |
| ShoppingMall_02[2] | 1920 × 1080 | 30 | 1500, 1000, 750, 500 | −20% |

Figure 30:
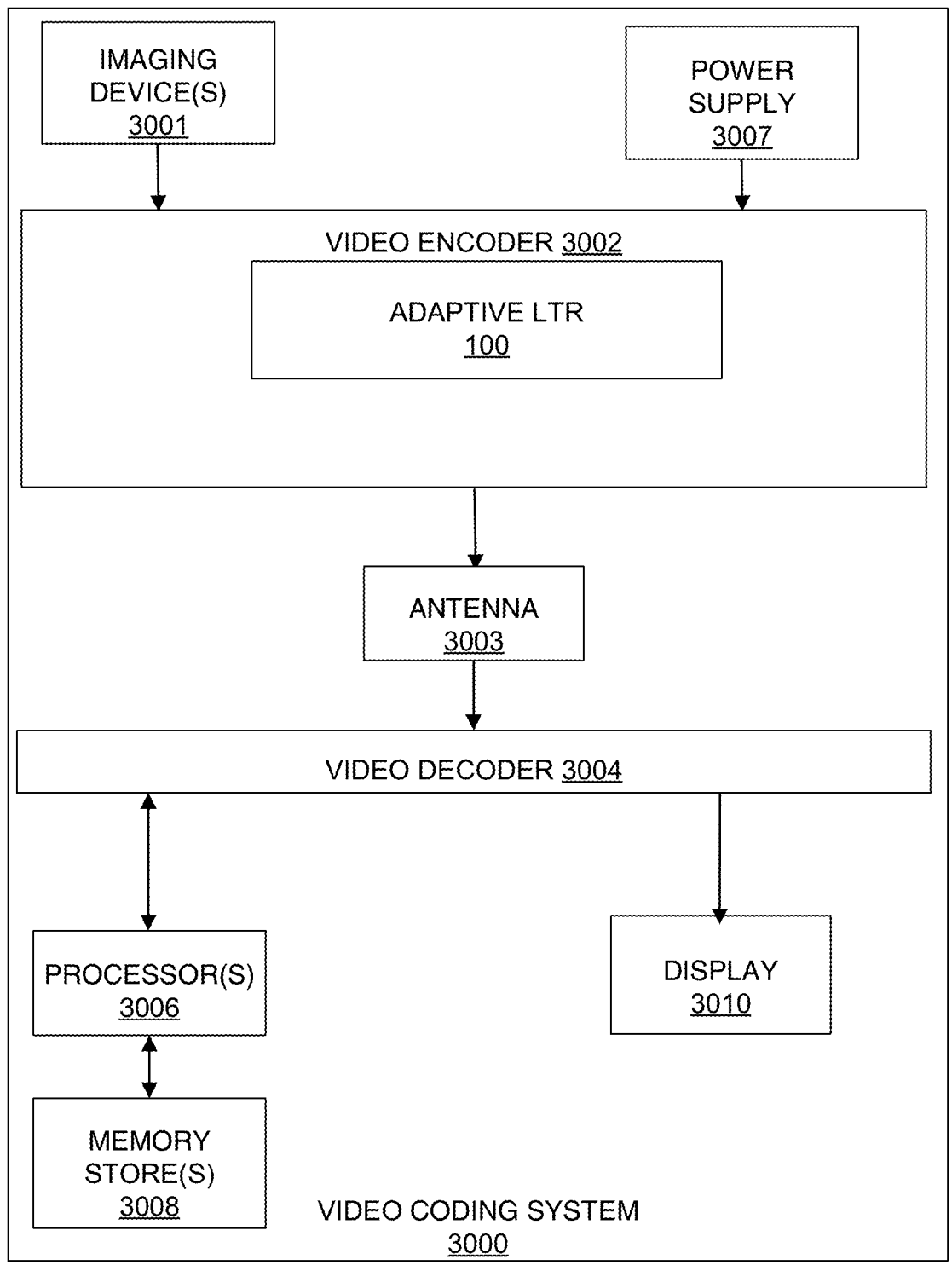
FIG. 30 is an illustrative block diagram of an example video coding system according to an embodiment.

FIG. 30 is an illustrative diagram of example video coding system 3000, arranged in accordance with at least some implementations of the present disclosure. In the illustrated implementation, video coding system 3000, although illustrated with both video encoder 3002 and video decoder 3004, video coding system 3000 may include only video encoder 3002 or only video decoder 3004 in various examples. Video coding system 3000 may include imaging device(s) 3001, an antenna 3003, one or more processor(s) 3006, one or more memory store(s) 3008, a power supply 3007, and/or a display device 3010. As illustrated, imaging device(s) 3001, antenna 3003, video encoder 3002, video decoder 3004, processor(s) 3006, memory store(s) 3008, and/or display device 3010 may be capable of communication with one another.

In some examples, video coding system 3000 may include an Adaptive LTR (ALTR) system 100 (e.g., Adaptive LTR (ALTR) system 100 of FIG. 1) associated with video encoder 3002 and/or video decoder 3004. Further, antenna 3003 may be configured to transmit or receive an encoded bitstream of video data, for example. Processor(s) 3006 may be any type of processor and/or processing unit. For example, processor(s) 3006 may include distinct central processing units, distinct graphic processing units, integrated system-on-a-chip (SoC) architectures, the like, and/or combinations thereof. In addition, memory store(s) 3008 may be any type of memory. For example, memory store(s) 3008 may be volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 3008 may be implemented by cache memory. Further, in some implementations, video coding system 3000 may include display device 3010. Display device 3010 may be configured to present video data.

Figure 31:
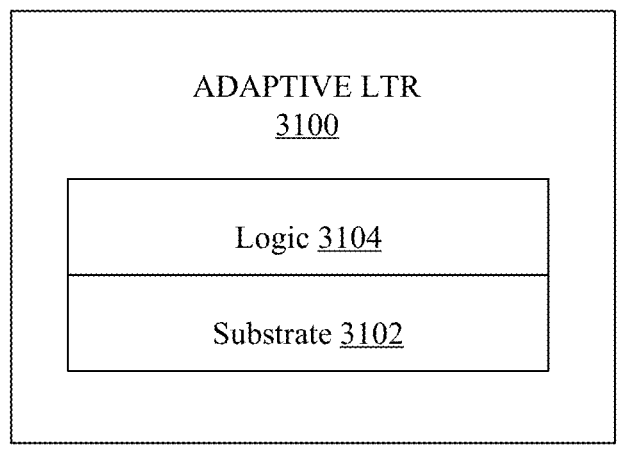
FIG. 31 is an illustrative block diagram of an example of a logic architecture according to an embodiment.

FIG. 31 shows an Adaptive LTR (ALTR) system 3100 (e.g., semiconductor package, chip, and die). The apparatus 3100 may implement one or more aspects of Adaptive LTR (ALTR) system 100 (e.g., Adaptive LTR (ALTR) system 100 of FIG. 1). The apparatus 3100 may be readily substituted for some or all of the Adaptive LTR (ALTR) system 100 (e.g., Adaptive LTR (ALTR) system 100 of FIG. 1), already discussed.

The illustrated apparatus 3100 includes one or more substrates 3102 (e.g., silicon, sapphire, gallium arsenide) and logic 3104 (e.g., transistor array and other integrated circuit/IC components) coupled to the substrate(s) 3102. The logic 3104 may be implemented at least partly in configurable logic or fixed-functionality logic hardware. In one example, the logic 3104 includes transistor channel regions that are positioned (e.g., embedded) within the substrate(s) 3102. Thus, the interface between the logic 3104 and the substrate(s) 3102 may not be an abrupt junction. The logic 3104 may also be considered to include an epitaxial layer that is grown on an initial wafer of the substrate(s) 3102.

Moreover, the logic 3104 may configure one or more first logical cores associated with a first virtual machine of a cloud server platform, where the configuration of the one or more first logical cores is based at least in part on one or more first feature settings. The logic 3104 may also configure one or more active logical cores associated with an active virtual machine of the cloud server platform, where the configuration of the one or more active logical cores is based at least in part on one or more active feature settings, and where the active feature settings are different than the first feature settings.

Figure 32:
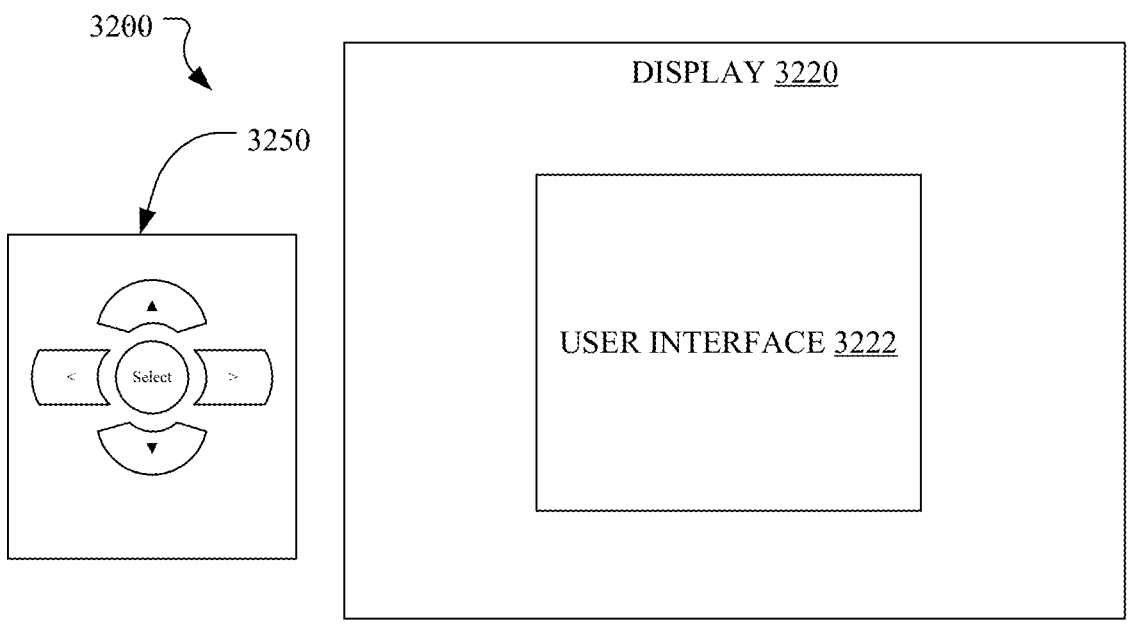
FIG. 32 is an illustrative block diagram of an example system according to an embodiment.
Figure 32:
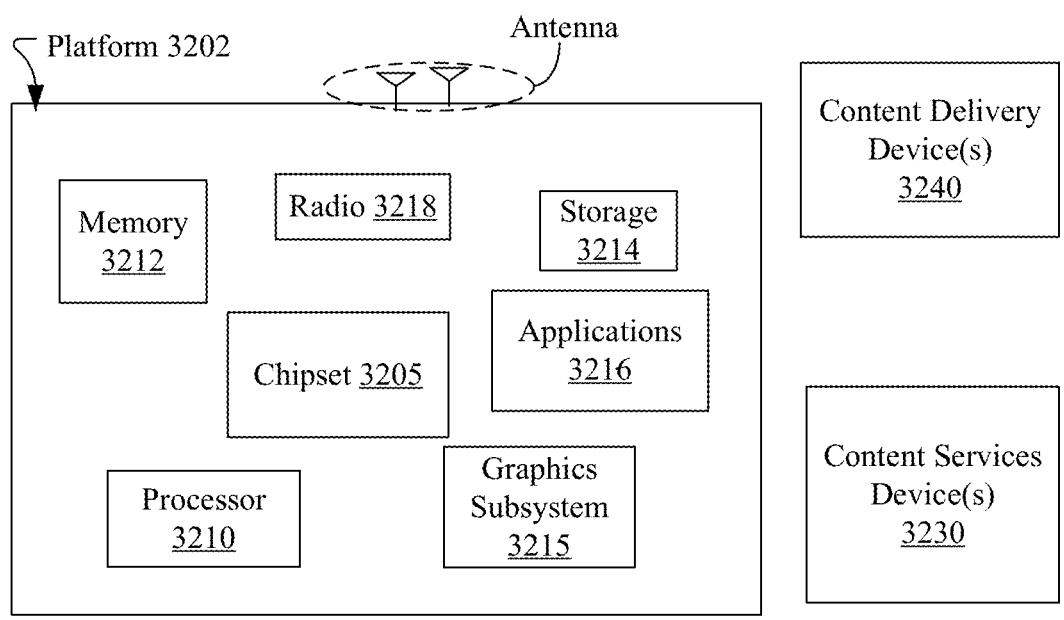
Figure 32:
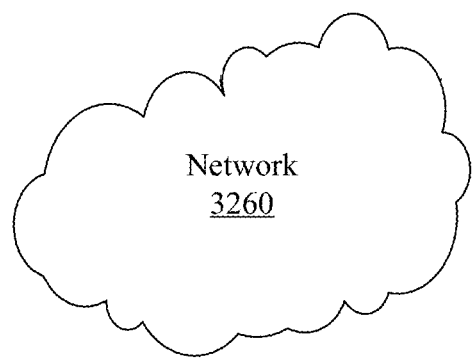

FIG. 32 illustrates an embodiment of a system 3200. In embodiments, system 3200 may include a media system although system 3200 is not limited to this context. For example, system 3200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 3200 comprises a platform 3202 coupled to a display 3220 that presents visual content. The platform 3202 may receive video bitstream content from a content device such as content services device(s) 3230 or content delivery device(s) 3240 or other similar content sources. A navigation controller 3250 comprising one or more navigation features may be used to interact with, for example, platform 3202 and/or display 3220. Each of these components is described in more detail below.

In embodiments, the platform 3202 may comprise any combination of a chipset 3205, processor 3210, memory 3212, storage 3214, graphics subsystem 3215, applications 3216 and/or radio 3218 (e.g., network controller). The chipset 3205 may provide intercommunication among the processor 3210, memory 3212, storage 3214, graphics subsystem 3215, applications 3216 and/or radio 3218. For example, the chipset 3205 may include a storage adapter (not depicted) capable of providing intercommunication with the storage 3214.

The processor 3210 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 3210 may comprise dual-core processor(s), dual-core mobile processor(s), and so forth.

The memory 3212 may be implemented as a volatile memory device such as, but not limited to, a Random Access Memory (RAM), Dynamic Random Access Memory (DRAM), or Static RAM (SRAM).

The storage 3214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 3214 may comprise technology to increase the storage performance enhanced protection for valuable digital media when multiple hard drives are included, for example.

The graphics subsystem 3215 may perform processing of images such as still or video for display. The graphics subsystem 3215 may be a graphics processing unit (GPU) or a visual processing unit (VPU), for example. An analog or digital interface may be used to communicatively couple the graphics subsystem 3215 and display 3220. For example, the interface may be any of a High-Definition Multimedia Interface (HDMI), DisplayPort, wireless HDMI, and/or wireless HD compliant techniques. The graphics subsystem 3215 could be integrated into processor 3210 or chipset 3205. The graphics subsystem 3215 could be a stand-alone card communicatively coupled to the chipset 3205. In one example, the graphics subsystem 3215 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 3218 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 3218 may operate in accordance with one or more applicable standards in any version.

In embodiments, the display 3220 may comprise any television type monitor or display. The display 3220 may comprise, for example, a computer display screen, touch screen display, video monitor, television-like device, and/or a television. The display 3220 may be digital and/or analog. In embodiments, the display 3220 may be a holographic display. Also, the display 3220 may be a transparent surface that may receive a visual projection. Such projections may convey various forms of information, images, and/or objects. For example, such projections may be a visual overlay for a mobile augmented reality (MAR) application. Under the control of one or more software applications 3216, the platform 3202 may display user interface 3222 on the display 3220.

In embodiments, content services device(s) 3230 may be hosted by any national, international and/or independent service and thus accessible to the platform 3202 via the Internet, for example. The content services device(s) 3230 may be coupled to the platform 3202 and/or to the display 3220. The platform 3202 and/or content services device(s) 3230 may be coupled to a network 3260 to communicate (e.g., send and/or receive) media information to and from network 3260. The content delivery device(s) 3240 also may be coupled to the platform 3202 and/or to the display 3220.

In embodiments, the content services device(s) 3230 may comprise a cable television box, personal computer, network, telephone, Internet enabled devices or appliance capable of delivering digital information and/or content, and any other similar device capable of unidirectionally or bidirectionally communicating content between content providers and platform 3202 and/display 3220, via network 3260 or directly. It will be appreciated that the content may be communicated unidirectionally and/or bidirectionally to and from any one of the components in system 3200 and a content provider via network 3260. Examples of content may include any media information including, for example, video, music, medical and gaming information, and so forth.

The content services device(s) 3230 receives content such as cable television programming including media information, digital information, and/or other content. Examples of content providers may include any cable or satellite television or radio or Internet content providers. The provided examples are not meant to limit embodiments.

In embodiments, the platform 3202 may receive control signals from a navigation controller 3250 having one or more navigation features. The navigation features of the controller 3250 may be used to interact with the user interface 3222, for example. In embodiments, the navigation controller 3250 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 3250 may be echoed on a display (e.g., display 3220) by movements of a pointer, cursor, focus ring, or other visual indicators displayed on the display. For example, under the control of software applications 3216, the navigation features located on the navigation controller 3250 may be mapped to virtual navigation features displayed on the user interface 3222, for example. In embodiments, the controller 3250 may not be a separate component but integrated into the platform 3202 and/or the display 3220. Embodiments, however, are not limited to the elements or in the context shown or described herein.

In embodiments, drivers (not shown) may comprise technology to enable users to instantly turn on and off the platform 3202 like a television with the touch of a button after initial boot-up, when enabled, for example. Program logic may allow the platform 3202 to stream content to media adaptors or other content services device(s) 3230 or content delivery device(s) 3240 when the platform is turned "off." In addition, chipset 3205 may comprise hardware and/or software support for (5.1) surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 3200 may be integrated. For example, the platform 3202 and the content services device(s) 3230 may be integrated, or the platform 3202 and the content delivery device(s) 3240 may be integrated, or the platform 3202, the content services device(s) 3230, and the content delivery device(s) 3240 may be integrated, for example. In various embodiments, the platform 3202 and the display 3220 may be an integrated unit. The display 3220 and content service device(s) 3230 may be integrated, or the display 3220 and the content delivery device(s) 3240 may be integrated, for example. These examples are not meant to limit the embodiments.

In various embodiments, system 3200 may be implemented as a wireless system, a wired system, or a combination of both. When implemented as a wireless system, system 3200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 3200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 3202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 33.

Figure 33:
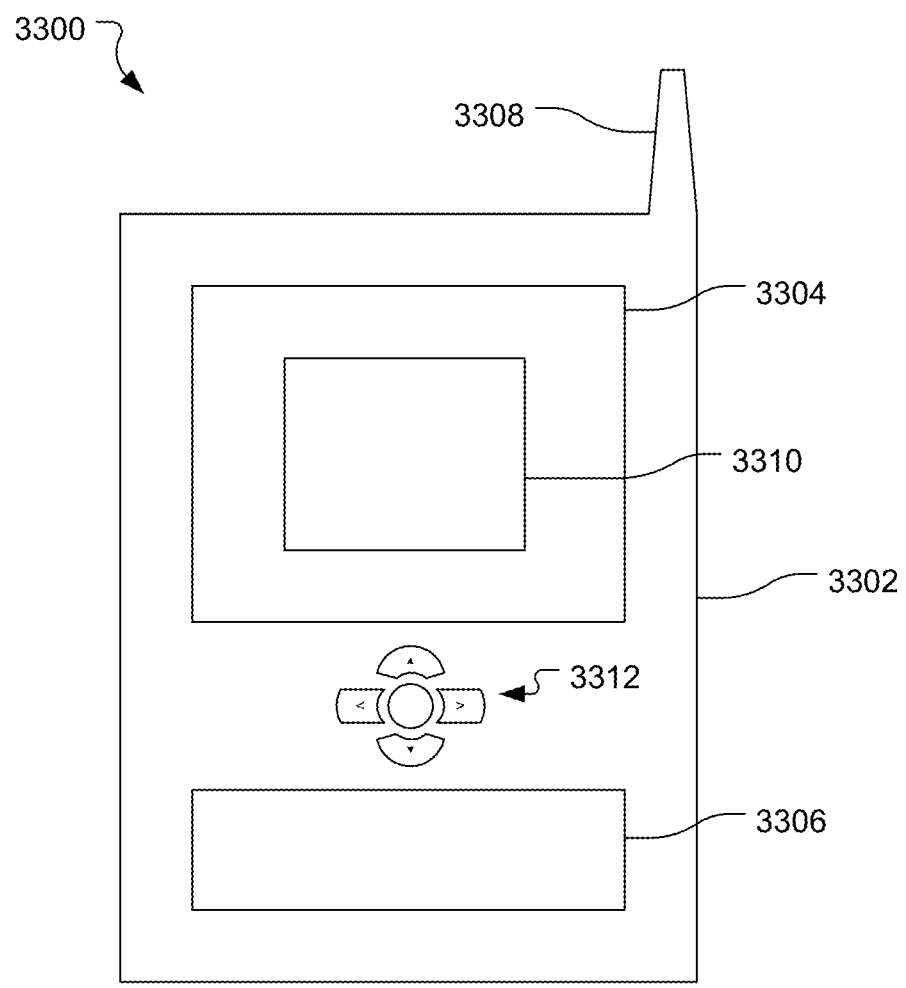
FIG. 33 is an illustrative diagram of an example of a system having a small form factor according to an embodiment.

As described above, the system 3200 may be embodied in varying physical styles or form factors. FIG. 33 illustrates embodiments of a small form factor device 3300 in which the system 3200 may be embodied. In embodiments, for example, the device 3300 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 33, the device 3300 may comprise a housing 3302, a display 3304, an input/output (I/O) device 3306, and an antenna 3308. The device 3300 also may comprise navigation features 3312. The display 3304 may comprise any suitable display unit for displaying information appropriate for a mobile computing device. The I/O device 3306 may comprise any suitable I/O device for entering information into a mobile computing device. Examples for the I/O device 3306 may include an alphanumeric keyboard, a numeric keypad, a touch pad, input keys, buttons, switches, rocker switches, microphones, speakers, voice recognition device and software, and so forth. Information also may be entered into the device 3300 by way of microphone. Such information may be digitized by a voice recognition device. The embodiments are not limited in this context.

Additional Notes and Examples

Example 1 may include a system to apply an adaptive Long Term Reference to a video sequence, including: one or more substrates and logic coupled to the one or more substrates, where the logic is to: receive content analysis of stability of the video sequence; receive coding condition of the video sequence; and automatically toggle Long Term Reference operations between an on setting mode and an off setting mode based at least in part on the received content analysis and coding condition information, where no frames of the video sequence are assigned as Long Term Reference frames and any previously assigned Long Term Reference frames are unmarked when in the off setting mode; and a power supply to provide power to the logic.

Example 2 may include the system of Example 1, where the logic is further to: determine a spatial complexity, a temporal complexity, and a ratio of temporal complexity to spatial complexity for each frame of the video sequence; and generate content analysis of the stability of the video sequence the based on the spatial complexity, the temporal complexity, and the ratio of temporal complexity to spatial complexity.

Example 3 may include the system of Example 1, where the logic is further to: automatically toggle Long Term Reference operations between the on setting mode and the off setting mode in an AVC encoder.

Example 4 may include the system of Example 1, where the logic is further to: automatically toggle Long Term Reference operations between an the on setting mode and the off setting mode in a HEVC encoder.

Example 5 may include the system of Example 1, where the logic is further to: determine when a scene transition has occurred with respect to a current frame and a previous frame of the video sequence; and assign the current frame to be a current Long Term Reference frame based on the determination of the scene transition.

Example 6 may include the system of Example 5, where the logic is further to: receive a fixed default interval between assignments of Long Term Reference frames; assign the current frame to be a current Long Term Reference frame based on the fixed default interval; determine when a scene transition has occurred with respect to the current frame and a previous frame of the video sequence; and assign the current frame to be the current Long Term Reference frame based on the determination of the scene transition.

Example 7 may include the system of Example 5, where the logic is further to: determine an ongoing prediction quality with respect to a current frame and a previous frame of the video sequence; and assign the previous frame to be a current Long Term Reference frame based on the determination of the ongoing prediction quality exceeding a prediction quality with respect to the current frame and a previous Long Term Reference frame.

Example 8 may include the system of Example 5, where the logic is further to: receive a fixed default interval between assignments of Long Term Reference frames; assign the current frame to be a current Long Term Reference frame based on the fixed default interval; determine an ongoing prediction quality with respect to the current frame and a previous frame of the video sequence; and assign the previous frame to be the current Long Term Reference frame based on the determination of the ongoing prediction quality exceeding a prediction quality with respect to the current frame and a previous Long Term Reference frame.

Example 9 may include the system of Example 5, where the logic is further to: determine an ongoing prediction quality with respect to the current frame and the previous frame of the video sequence; and assign the previous frame to be a current Long Term Reference frame based on the determination of the ongoing prediction quality falling under a threshold value; determine when a scene transition has occurred with respect to the current frame and a previous frame of the video sequence; and assign the current frame to be a current Long Term Reference frame based on the determination of the scene transition.

Example 10 may include the system of Example 5, where the logic is further to: receive a fixed default interval between assignments of Long Term Reference frames; assign the current frame to be a current Long Term Reference frame based on the fixed default interval; determine an ongoing prediction quality with respect to the current frame and the previous frame of the video sequence; assign the previous frame to be the current Long Term Reference frame based on the based on the determination of the ongoing prediction quality falling under a threshold value; determine when a scene transition has occurred with respect to the current frame and a previous frame of the video sequence; and assign the current frame to be the current Long Term Reference frame based on the determination of the scene transition.

Example 11 may include the system of Example 1, where the logic is further to: determine when a scene change has occurred with respect to a current frame and a previous frame of the video sequence; assign the current frame to be a Long Term Reference based on the determination of the scene change.

Example 12 may include the system of Example 11, where a quantization parameter is based on a type of I-Frame instance of a reference frame of the video sequence, where the type of I-Frame instance one of a Long Term Reference frame type, a scene change detection reference frame type, and a regular I-frame reference frame type; where the scene change detection reference frame type is a frame that has been be determined to be the beginning frame from a scene change of the video sequence.

Example 13 may include the system of Example 11, where the logic is further to: receive a fixed default interval between assignments of Long Term Reference frames; assign a current frame to be a current Long Term Reference frame based on the fixed default interval; determine when a scene transition has occurred with respect to the current frame and a previous frame of the video sequence; and assign the current frame to be a current Long Term Reference frame based on the determination of the scene transition; where a quantization parameter is based on a type of P-Frame instance of a reference frame of the video sequence, where the type of P-Frame instance one of a Long Term Reference frame type, a scene change detection reference frame type, a scene transition detection reference frame type, and a regular P-frame reference frame type; where the scene change detection reference frame type is a frame that has been be determined to be the beginning frame from a scene change of the video sequence.

Example 14 may include the system of Example 1, where the logic is further to: bring a current Long Term Reference frame to an index one position two of a reference list zero in an AVC encoder.

Example 15 may include the system of Example 1, where the logic is further to: bring a current Long Term Reference frame to an index zero position one of a reference list one in an HEVC encoder.

Example 16 may include the system of Example 1, where the logic coupled to the one or more substrates includes transistor channel regions that are positioned within the one or more substrates Example 17 may include an adaptive Long Term Reference method for a video sequence, including: receiving content analysis of a stability of the video sequence; determining when a scene transition has occurred with respect to a current frame and a previous frame of the video sequence; and assigning the current frame to be a current Long Term Reference frame based on the determination of the scene transition.

Example 18 may include the method of Example 17, further including: receiving a fixed default interval between assignments of Long Term Reference frames; assigning the current frame to be a current Long Term Reference frame based on the fixed default interval; determining when a scene transition has occurred with respect to the current frame and a previous frame of the video sequence; and assigning of the current frame to be the current Long Term Reference frame based on the determination of the scene transition.

Example 19 may include the method of Example 17, further including: determining an ongoing prediction quality with respect to a current frame and a previous frame of the video sequence; and assigning the previous frame to be a current Long Term Reference frame based on the determination of the ongoing prediction quality exceeding a prediction quality with respect to the current frame and a previous Long Term Reference frame.

Example 20 may include the method of Example 17, further including: receiving a fixed default interval between assignments of Long Term Reference frames; assigning the current frame to be a current Long Term Reference frame based on the fixed default interval; determining an ongoing prediction quality with respect to the current frame and a previous frame of the video sequence; and assigning the previous frame to be the current Long Term Reference frame based on the determination of the ongoing prediction quality exceeding a prediction quality with respect to the current frame and a previous Long Term Reference frame.

Example 21 may include the method of Example 17, further including: determining an ongoing prediction quality with respect to the current frame and the previous frame of the video sequence; assigning the previous frame to be a current Long Term Reference frame based on the determination of the ongoing prediction quality falling under a threshold value; determining when a scene transition has occurred with respect to the current frame and a previous frame of the video sequence; and assigning the current frame to be a current Long Term Reference frame based on the determination of the scene transition.

Example 22 may include the method of Example 17, further including: receiving a fixed default interval between assignments of Long Term Reference frames; assigning the current frame to be a current Long Term Reference frame based on the fixed default interval; determining an ongoing prediction quality with respect to the current frame and the previous frame of the video sequence; assigning of the previous frame to be the current Long Term Reference frame based on the based on the determination of the ongoing prediction quality falling under a threshold value; determining when a scene transition has occurred with respect to the current frame and a previous frame of the video sequence; and assigning of the current frame to be the current Long Term Reference frame based on the determination of the scene transition.

Example 23 may include at least one computer readable storage medium including a set of instructions, which when executed by a computing system, cause the computing system to: receive content analysis of a stability of the video sequence; determine when a scene transition has occurred with respect to a current frame and a previous frame of the video sequence; and assign the current frame to be a current Long Term Reference frame based on the determination of the scene transition.

Example 24 may include the at least one computer readable storage medium of Example 23, where the instructions, when executed, cause the computing system to: receive a fixed default interval between assignments of Long Term Reference frames; assign the current frame to be a current Long Term Reference frame based on the fixed default interval; determine an ongoing prediction quality with respect to the current frame and the previous frame of the video sequence; assign of the previous frame to be the current Long Term Reference frame based on the based on the determination of the ongoing prediction quality falling under a threshold value; determine when a scene transition has occurred with respect to the current frame and a previous frame of the video sequence; and assign of the current frame to be the current Long Term Reference frame based on the determination of the scene transition.

Example 25 may include means for performing a method as described in any preceding Example.

Example 26 may include machine-readable storage including machine-readable instructions which, when executed, implement a method or realize an apparatus as described in any preceding Example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually include one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

We claim:

1. A system to apply an adaptive Long Term Reference to a video sequence, comprising:
one or more substrates and logic coupled to the one or more substrates, wherein the logic is to:
receive content analysis of stability of the video sequence;
receive coding condition of the video sequence;
automatically toggle Long Term Reference operations between an on setting mode and an off setting mode based at least in part on the received content analysis and coding condition information, wherein no frames of the video sequence are assigned as Long Term Reference frames and any previously assigned Long Term Reference frames are unmarked when in the off setting mode, and wherein a Long Term Reference assign action is signaled that unmarks a previous Long Term Reference frame and marks a current frame as a current Long Term Reference frame in response to detection of a scene transition when in the on setting mode; and a power supply to provide power to the logic.

2. The system of claim 1, wherein the logic is further to:
determine a spatial complexity, a temporal complexity, and a ratio of temporal complexity to spatial complexity for each frame of the video sequence; and
generate content analysis of the stability of the video sequence based on the spatial complexity, the temporal complexity, and the ratio of temporal complexity to spatial complexity.

3. The system of claim 1, wherein the logic is further to: automatically toggle Long Term Reference operations between the on setting mode and the off setting mode in an Advanced Video Coding (AVC) encoder.

4. The system of claim 1, wherein the logic is further to: automatically toggle Long Term Reference operations between the on setting mode and the off setting mode in a High Efficiency Video Coding (HEVC) encoder.

5. The system of claim 1, wherein the logic is further to:
determine when the scene transition has occurred with respect to the current frame and a reference long term reference frame of the video sequence; and
assign the current frame to be a current Long Term Reference frame based on the determination of the scene transition.

6. The system of claim 5, wherein the logic is further to:
receive a fixed default interval between assignments of Long Term Reference frames;
assign the current frame to be the current Long Term Reference frame based on the fixed default interval;
determine an ongoing prediction quality with respect to the current frame and a previous frame of the video sequence; and
assign the previous frame to be the current Long Term Reference frame based on the determination of the ongoing prediction quality exceeding a prediction quality with respect to the current frame and the previous Long Term Reference frame.

7. The system of claim 1, wherein the logic is further to:
receive a fixed default interval between assignments of Long Term Reference frames;
assign the current frame to be the current Long Term Reference frame based on the fixed default interval;
determine when the scene transition has occurred with respect to the current frame and a reference long term reference frame of the video sequence; and
assign the current frame to be the current Long Term Reference frame based on the determination of the scene transition.

8. The system of claim 1, wherein the logic is further to:
determine an ongoing prediction quality with respect to the current frame and a previous frame of the video sequence; and
assign the previous frame to be the current Long Term Reference frame based on the determination of the ongoing prediction quality exceeding a prediction quality with respect to the current frame and the previous Long Term Reference frame.

9. The system of claim 1, wherein the logic is further to:
determine an ongoing prediction quality with respect to the current frame and the previous frame of the video sequence;
assign the previous frame to be the current Long Term Reference frame based on the determination of the ongoing prediction quality falling under a threshold value;
determine when the scene transition has occurred with respect to the current frame and a reference long term reference frame of the video sequence; and
assign the current frame to be the current Long Term Reference frame based on the determination of the scene transition.

10. The system of claim 1, wherein the logic is further to:
receive a fixed default interval between assignments of Long Term Reference frames;
assign the current frame to be the current Long Term Reference frame based on the fixed default interval;
determine an ongoing prediction quality with respect to the current frame and the previous frame of the video sequence;
assign the previous frame to be the current Long Term Reference frame based on the determination of the ongoing prediction quality falling under a threshold value;
determine when the scene transition has occurred with respect to the current frame and a reference long term reference frame of the video sequence; and
assign the current frame to be the current Long Term Reference frame based on the determination of the scene transition.

11. The system of claim 1, wherein the logic is further to:
determine when a scene change has occurred with respect to the current frame and a previous frame of the video sequence; and
assign the current frame to be the Long Term Reference based on the determination of the scene change.

12. The system of claim 11,
wherein a quantization parameter is based on a type of I-Frame instance of a reference frame of the video sequence; wherein the type of I-Frame instance is one of a Long Term Reference frame type, a scene change detection reference frame type, and a regular I-frame reference frame type; wherein the scene change detection reference frame type is a frame that has been be determined to be the beginning frame from a scene change of the video sequence.

13. The system of claim 11, wherein the logic is further to:
receive a fixed default interval between assignments of Long Term Reference frames;
assign the current frame to be the current Long Term Reference frame based on the fixed default interval;
determine when the scene transition has occurred with respect to the current frame and a reference long term reference frame of the video sequence; and
assign the current frame to be the current Long Term Reference frame based on the determination of the scene transition;
wherein a quantization parameter is based on a type of P-Frame instance of a reference frame of the video sequence, wherein the type of P-Frame instance one of a Long Term Reference frame type, a scene change detection reference frame type, a scene transition detection reference frame type, and a regular P-frame reference frame type; wherein the scene change detection reference frame type is a frame that has been be determined to be the beginning frame from a scene change of the video sequence.

14. The system of claim 1, wherein the logic is further to:
bring the current Long Term Reference frame to an index one position two of a reference list zero in an Advanced Video Coding (AVC) encoder.

15. The system of claim 1, wherein the logic is further to: bring the current Long Term Reference frame to an index zero position one of a reference list one in an High Efficiency Video Coding (HEVC) encoder.

16. The system of claim 1, wherein the logic coupled to the one or more substrates includes transistor channel regions that are positioned within the one or more substrates.

17. An adaptive Long Term Reference method for a video sequence, comprising:
determining, via a scene change detector, when a scene change has occurred based on a comparison of a current frame to a previous frame of a video sequence;
determining, via a scene transition detector, when a scene transition has occurred based on a comparison of the current frame and a reference Long Term Reference frame of the video sequence, wherein the comparison of the current frame and the reference Long Term Reference frame is based on temporal feature values and spatial feature values; and
assigning, via a Long Term Reference decider, the current frame to be a current Long Term Reference frame based on the determination of the scene change and the determination of the scene transition.

18. The method of claim 17, further comprising:
receiving a fixed default interval between assignments of Long Term Reference frames;
assigning the current frame to be a current Long Term Reference frame based on the fixed default interval;
determining when a scene transition has occurred with respect to the current frame and a reference long term reference frame; and
assigning of the current frame to be the current Long Term Reference frame based on the determination of the scene transition.

19. The method of claim 17, further comprising:
determining an ongoing prediction quality with respect to a current frame and a previous frame of the video sequence; and
assigning the previous frame to be a current Long Term Reference frame based on the determination of the ongoing prediction quality exceeding a prediction quality with respect to the current frame and a previous Long Term Reference frame.

20. The method of claim 17, further comprising:
receiving a fixed default interval between assignments of Long Term Reference frames;
assigning the current frame to be a current Long Term Reference frame based on the fixed default interval;
determining an ongoing prediction quality with respect to the current frame and a previous frame of the video sequence; and
assigning the previous frame to be the current Long Term Reference frame based on the determination of the ongoing prediction quality exceeding a prediction quality with respect to the current frame and a previous Long Term Reference frame.

21. The method of claim 17, further comprising:
determining an ongoing prediction quality with respect to the current frame and the previous frame of the video sequence;
assigning the previous frame to be a current Long Term Reference frame based on the determination of the ongoing prediction quality falling under a threshold value;
determining when a scene transition has occurred with respect to the current frame and a reference long term reference frame of the video sequence; and
assigning the current frame to be a current Long Term Reference frame based on the determination of the scene transition.

22. The method of claim 17, further comprising:
receiving a fixed default interval between assignments of Long Term Reference frames;
assigning the current frame to be a current Long Term Reference frame based on the fixed default interval;
determining an ongoing prediction quality with respect to the current frame and the previous frame of the video sequence;
assigning of the previous frame to be the current Long Term Reference frame based on the determination of the ongoing prediction quality falling under a threshold value;
determining when a scene transition has occurred with respect to the current frame and a reference long term reference frame of the video sequence; and
assigning of the current frame to be the current Long Term Reference frame based on the determination of the scene transition.

23. At least one non-transitory computer readable storage medium comprising a set of instructions, which when executed by a computing system, cause the computing system to:
determine, via a scene change detector, when a scene change has occurred based on a comparison of a current frame to a previous frame of a video sequence;
determine, via a scene transition detector, when a scene transition has occurred based on a comparison of the current frame and a reference Long Term Reference frame of the video sequence, wherein the comparison of the current frame and the reference Long Term Reference frame is based on temporal feature values and spatial feature values; and
assign, via a Long Term Reference decider, the current frame to be a current Long Term Reference frame based on the determination of the scene change and the determination of the scene transition.

24. The at least one non-transitory computer readable storage medium of claim 23, wherein the instructions, when executed, cause the computing system to:
receive a fixed default interval between assignments of Long Term Reference frames;
assign the current frame to be a current Long Term Reference frame based on the fixed default interval;
determine an ongoing prediction quality with respect to the current frame and the previous frame of the video sequence;
assign of the previous frame to be the current Long Term Reference frame based on the determination of the ongoing prediction quality falling under a threshold value;
determine when a scene transition has occurred with respect to the current frame and a reference long term reference frame of the video sequence; and
assign of the current frame to be the current Long Term Reference frame based on the determination of the scene transition.

* * * * *